US012616208B2

(12) United States Patent (10) Patent No.: US 12,616,208 B2

Vernon et al. (45) Date of Patent: *May 5, 2026

(54) LIQUID DISPENSING SYSTEM, COMPONENTS AND FEATURES THEREOF, AND METHODS OF USE THEREOF

(71) Applicant: THE PROCTER & GAMBLE COMPANY, Cincinnati, OH (US)

(72) Inventors: Paul John Edward Vernon, West Chester, OH (US); Keven James Walter, Cincinnati, OH (US); Michael Anthony Majher, Cincinnati, OH (US); Christy Jiayi Zhang, Cincinnati, OH (US); Hannah Paige Tatman, Cincinnati, OH (US); Joseph Frank Clear, III, Cincinnati, OH (US); Mitchell Messenger, Fredericktown, OH (US)

(73) Assignee: THE PROCTER & GAMBLE COMPANY, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/252,680

(22) Filed: Jun. 27, 2025

(65) Prior Publication Data

US 2025/0318534 A1 Oct. 16, 2025

Related U.S. Application Data

(63) Continuation of application No. 18/360,766, filed on Jul. 27, 2023.

(60) Provisional application No. 63/418,413, filed on Oct. 21, 2022, provisional application No. 63/392,707, filed on Jul. 27, 2022, provisional application No. 63/392,704, filed on Jul. 27, 2022, provisional application No. 63/392,700, filed on Jul. 27, 2022, provisional application No. 63/392,703, filed on Jul. 27, 2022, provisional application No. 63/392,699, filed on Jul. 27, 2022, provisional application No. 63/392,702, filed on Jul. 27, 2022.

(51) Int. Cl.
*A01N 65/08* (2009.01)
*A01M 7/00* (2006.01)
*A01M 25/00* (2006.01)
*A01N 33/08* (2006.01)
*A01N 41/04* (2006.01)

(52) U.S. Cl.
CPC ........... *A01N 65/08* (2013.01); *A01M 7/0046* (2013.01); *A01M 25/006* (2013.01); *A01N 33/08* (2013.01); *A01N 41/04* (2013.01); *A01M 2200/01* (2013.01)

(58) Field of Classification Search
None
See application file for complete search history.

(56) References Cited

U.S. PATENT DOCUMENTS

| | | | |
|---|---|---|---|
| 2,026,234 A | 12/1935 | Knuutila | |
| 3,717,579 A | 2/1973 | Hofmann et al. | |
| 3,933,915 A | 1/1976 | Bordenca et al. | |
| 5,651,908 A * | 7/1997 | Mansfield ............. | B05B 9/0426 |
| | | | 222/530 |
| 6,083,994 A | 7/2000 | Mccue | |
| 6,231,865 B1 | 5/2001 | Hsu | |
| 6,969,521 B1 | 11/2005 | Gonzalez et al. | |
| 8,857,776 B2 | 10/2014 | Chang | |
| 2003/0194454 A1 | 10/2003 | Bessette et al. | |
| 2005/0032668 A1 | 2/2005 | Pedersen et al. | |
| 2010/0324308 A1 | 12/2010 | Hassan et al. | |
| 2016/0338362 A1 | 11/2016 | Neigel | |
| 2017/0112126 A1* | 4/2017 | Rettori ..................... | C09J 11/06 |
| 2019/0127201 A1* | 5/2019 | O'Brien ............. | B65D 51/1622 |
| 2023/0189810 A1 | 6/2023 | Van Der Krieken et al. | |
| 2024/0041052 A1 | 2/2024 | Vernon | |
| 2024/0041053 A1 | 2/2024 | Vernon | |

FOREIGN PATENT DOCUMENTS

| | | |
|---|---|---|
| CN | 111184004 A | 5/2020 |
| GB | 1363696 A | 8/1974 |
| WO | 9206793 A1 | 4/1992 |
| WO | 2010075506 A1 | 7/2010 |
| WO | 2012128908 A2 | 9/2012 |

OTHER PUBLICATIONS

Wellcalm, 6 pages, 2025.*
Search Report and Written Opinion for PCT/US2023/071159 dated Nov. 20, 2023, 16 pages.
All Office Actions; U.S. Appl. No. 18/360,785, filed on Jul. 27, 2023; See Patent Center.
All Office Actions; U.S. Appl. No. 18/360,766, filed on Jul. 27, 2023; See Patent Center.

* cited by examiner

*Primary Examiner* — Michael V Meller
(74) *Attorney, Agent, or Firm* — Amanda Herman Berghauer

(57) ABSTRACT

A pesticide product having a liquid dispensing system and a pesticidal composition contained within a bottle. The liquid dispensing system includes a bottle having an interior volume and a neck terminating in a rim circumscribing and defining a main opening through the neck to the interior volume. The neck has a first retaining feature. The liquid dispensing fixture includes a housing, a carry handle, an electric motor configured to drive a pump, a dispensing nozzle in fluid communication with the pump, and a spray actuator operatively connected to the pump. The liquid dispensing fixture is configured to engage the first retaining feature of the bottle. The pesticidal composition includes from about 0.5% to about 10% clove oil; from about 0.01% to about 1.5% citric acid; an anionic surfactant; and water.

15 Claims, 45 Drawing Sheets

40

70

26

28

25o

29

29a

20

25

25i

29b

22

508, 508b

100a

100c

LIQUID DISPENSING SYSTEM, COMPONENTS AND FEATURES THEREOF, AND METHODS OF USE THEREOF

CROSS REFERENCE TO RELATED APPLICATIONS

This application is a continuation of and claims priority under 35 U.S.C. § 120 to U.S. patent application Ser. No. 18/360,766 filed on Jul. 27, 2023, which claims the benefit, under 35 U.S.C. § 119(e), of U.S. Provisional Patent Application Ser. No. 63/418,413 filed Oct. 21, 2022, and, 63/392,707, 63/392,704, 63/392,703, 63/392,702, 63/392,700 and 63/394,699, each filed Jul. 27, 2022, the entire disclosure of which is fully incorporated by reference herein.

FIELD

The present disclosure relates generally to liquid dispensing systems and more specifically to liquid dispensing systems having a reusable dispensing fixture and a reusable spray dispenser.

BACKGROUND

Various configurations of reusable container bottles or vessels, coupled with reusable delivery systems, for carrying and dispensing liquid compositions, particularly pest control compositions, such as insecticides, insect repellents, fungicides and/or herbicides, designed for easy manual portability and non-commercial/consumer use, are known.

Older technology has included a generally cylindrical container vessel coupled with a removable/replaceable top fixture. The top fixture scalingly fits about a top opening in the vessel, and is equipped with a hand-operated air pump and check valve system, configured to pump air into the vessel and thereby pressurize it. The top fixture also typically includes an attached dip tube configured to extend from an inside opening in the top fixture, to a distal intake end. The dip tube typically has a length such that the intake end will be disposed proximate the bottom of the interior of the vessel, when the top fixture is completely installed on the vessel. The proximal end of the dip tube is connected to an underside of the top fixture, and a further liquid passageway goes from the connection, through and out the fixture, to and through a suitably convenient length of flexible delivery hose or tube, and then to a dispensing wand having a hand-operable liquid release valve and a rigid spray tube, ending at a dispensing nozzle. Upon pressurization of the vessel via operation of the hand air pump, liquid is forced under pressure up the dip tube, through and out the top fixture, and out to the wand.

Variations of newer technology have included a non-pressurized bottle coupled with a dispensing fixture and a liquid pump. The liquid pump may be operably fluidly connected with a dispensing fixture, or alternatively, with a dispensing wand. The dispensing fixture may include a trigger and dispensing nozzle, or may be connected to a dispensing wand by a suitably convenient length of flexible delivery hose or tube. In some examples the liquid pump is disposed inside a handle of the dispensing wand. In some examples the pump is manually operated; in other examples it is driven by an electric motor. The liquid pump may be activated to pump liquid from the bottle, by a control mechanism such as a trigger, button or switch, disposed on the dispensing fixture or on the wand.

Although these known systems can be useful and effective for dispensing liquid compositions, such as liquid pest control compositions, they also have shortcomings, leaving room for improvements.

Figure 1:
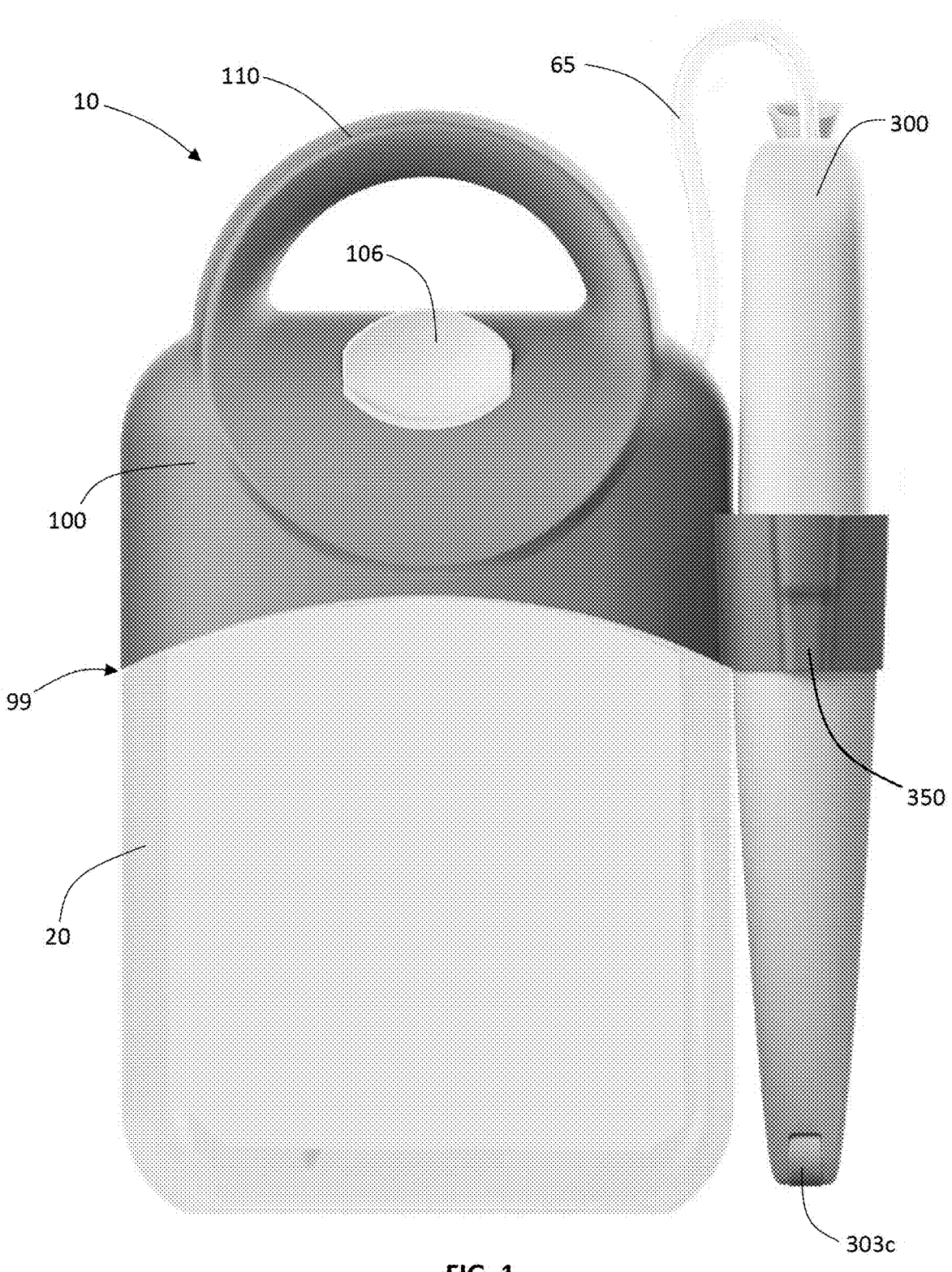
FIG. 1 is an elevation view of a non-limiting example of a liquid dispensing system.

The numbering of functionally similar features identified herein is intended to be consistent throughout the drawings and views.

DESCRIPTION

Definitions

For purposes herein, the following terms have the following meanings:

"Fluid" includes gas (e.g., air) and liquid.

As used herein, "pest control" means the management of a pest species, including any animal, such as insects and other arthropods, plant, or fungus that adversely impacts human activities or the environment, where management includes controlling, killing, eliminating, repelling, or attracting the pest species. The terms "pest control" and "pesticide" are used interchangeably herein.

"Insecticide" and "insect repellent" includes compositions that are provided liquid form, and include formulations thereof containing components that are toxic or repellent to insects and arachnids, including eggs, larvae or other immature forms thereof.

A "liquid leaf surface active herbicide composition" is liquid herbicide composition adapted for use and maximum effectiveness via application to plant leaf surfaces, above ground. It is distinguishable from compositions adapted for use and maximum effectiveness via application to soil, e.g., root active herbicide compositions.

A "pump" is any mechanical or electro-mechanical device, including any manually driven device or motor-driven device, effectively configured in line with a conduit system, to drive fluid within the conduit system from a first location upstream of the device, to a second downstream of the device.

Vertical positioning references such as "up," "down," "top," "bottom," "above," "below" and similar terms and forms thereof, unless context indicates otherwise, relate to vertical positioning of features of a liquid dispensing system including a bottle configured to rest stably on a base structure thereof, on a level horizontal surface.

It is understood that the terms "front" and "rear" are relative terms and could easily be interchanged.

Description of Examples of Features

Referring to FIGS. 1, 2, and 34A-G, a liquid dispensing system as contemplated herein may include a bottle 20, a removable/reattachable dispensing fixture 100 and a spray wand 300 or some other type of spray dispenser, such as a trigger spray dispenser 500. The dispensing fixture 100 may comprise a front wall 100a, a rear wall 100b opposite the front wall, and side walls 100c extending between the front wall 100a and the rear wall 100b, where at least one of the side walls 100c comprises a protrusion 130.

Either the bottle or the dispensing fixture may be provided with a carry handle 110, configured to allow a user to carry the system conveniently with one hand. The carry handle may be separately formed and attached, or may be integrally formed with the bottle or the dispensing fixture. In another example, the bottle may be devoid or free of a carry handle. Spray wand 300 or trigger spray dispenser 500 may be fluidly connected to the dispensing fixture by a flexible outflow tube 65 of a suitably convenient length, whereby a user may carry the bottle with one hand and use the spray wand 300 or trigger spray dispenser 500, to dispense liquid drawn from the bottle to surrounding application sites within a reasonably convenient distance therefrom, with the other hand. The spray wand 300 may include a substantially rigid spray tube 305 terminating in a distal spray nozzle end structure 311, which receives liquid supplied through the wand housing via supply from the outflow tube 65. The trigger spray dispenser 500 may include a spray nozzle 504, which receives liquid supplied through the trigger spray dispenser housing 502 via supply from the outflow tube 65, a trigger spray actuator 506, and a handle 508 comprising a front wall 508a, a rear wall 508b opposite the front wall, and side walls 508c extending between the front wall 508a and the rear wall 508b. The trigger spray dispenser housing 502 may comprise a pump.

The spray dispenser need not be a trigger spray dispenser 500, as shown in FIGS. 34A-34G. The spray dispenser may be any other suitable spray dispenser available in the art. Similarly, the spray dispenser may comprise any type of spray actuator (not just a trigger spray actuator), such as a button (e.g., push-button) actuator, a lever actuator, a toggle actuator, or a knob actuator.

Figure 2:
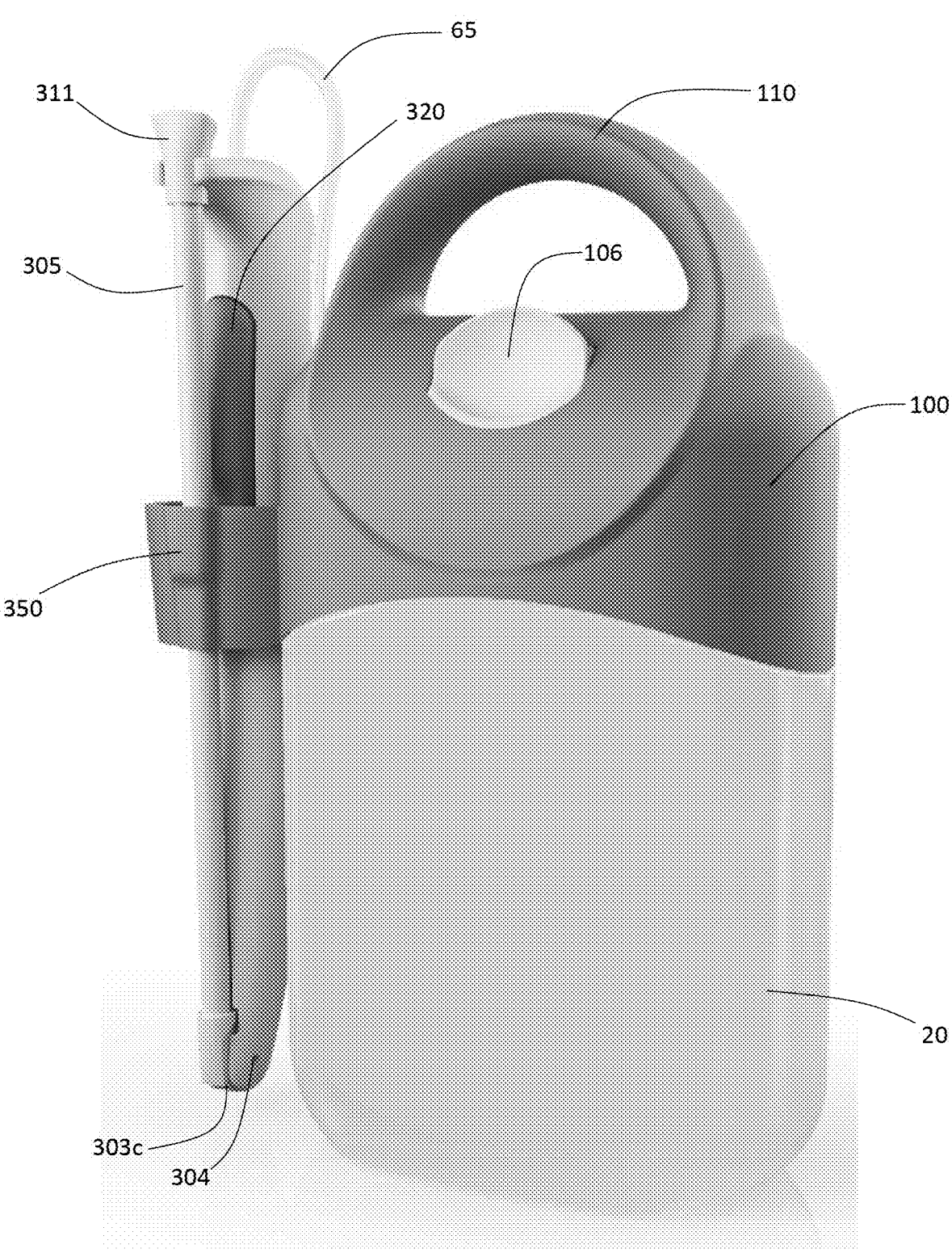
FIG. 2 is a perspective view of a non-limiting example of a liquid dispensing system, viewed from a predominately front or rear, angled perspective.
Figure 26:
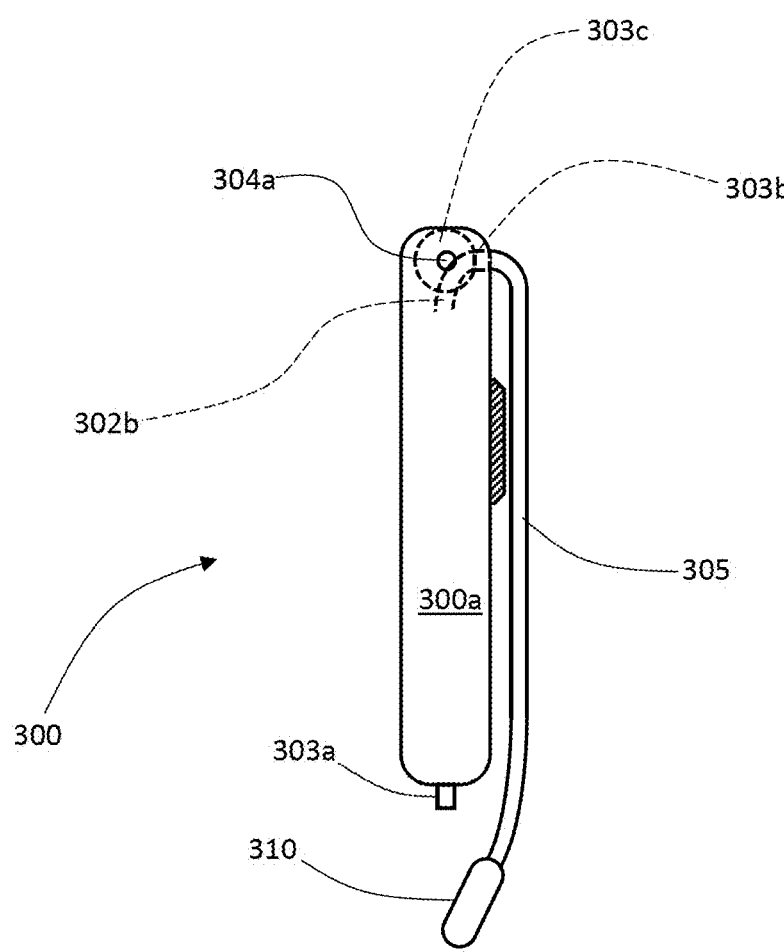
FIG. 26 is a schematic view of a non-limiting example of components of a spray wand, in a folded/stowed configuration.
Figure 27:
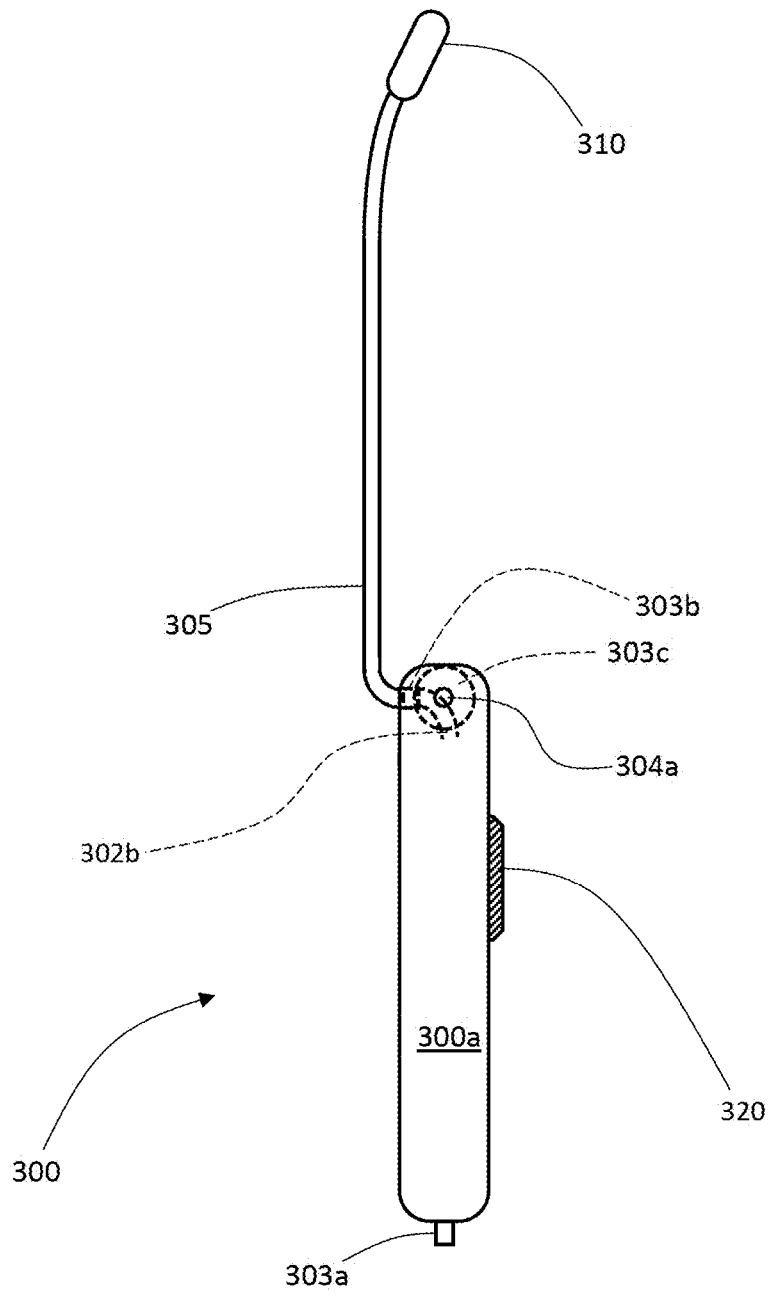
FIG. 27 is a schematic view of a non-limiting example of components of a spray wand, in an extended/deployed configuration.
Figure 28A:
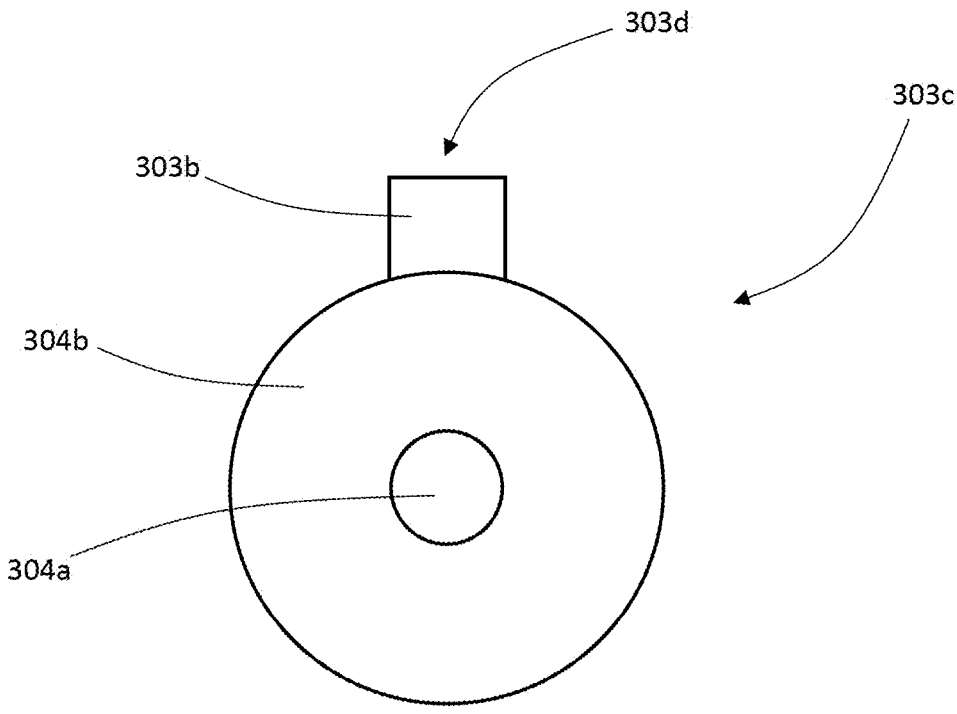
FIG. 28A is a schematic side view of a non-limiting example of an exit fitting component of a spray wand.
Figure 28B:
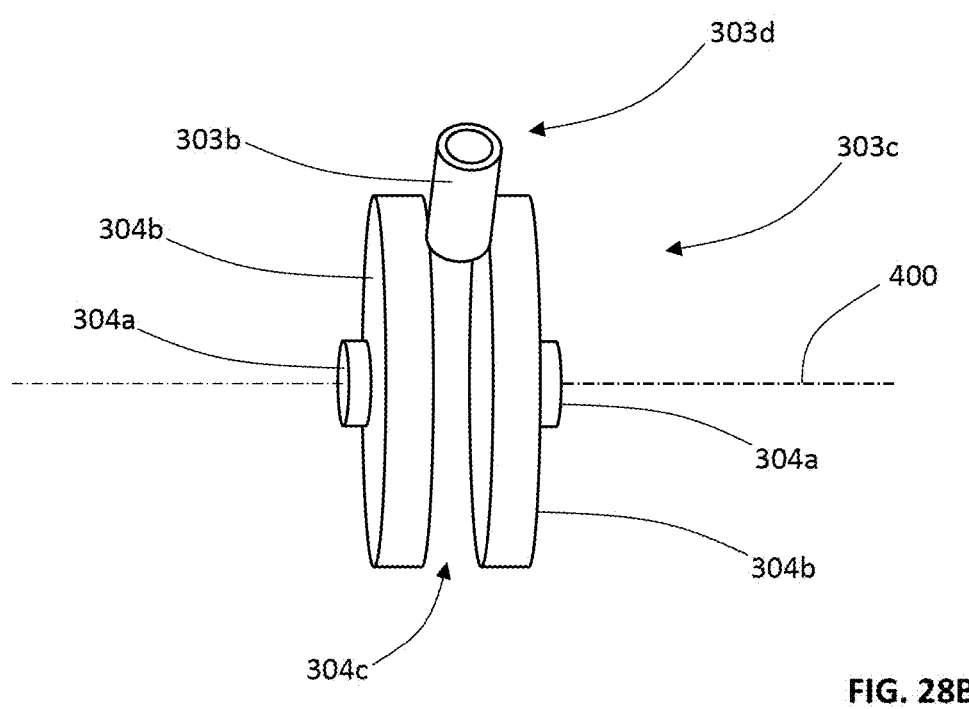
FIGS. 28B and 28C are two schematic perspective views of a non-limiting example of an exit fitting component of a spray wand, shown from differing perspectives.
Figure 28C:
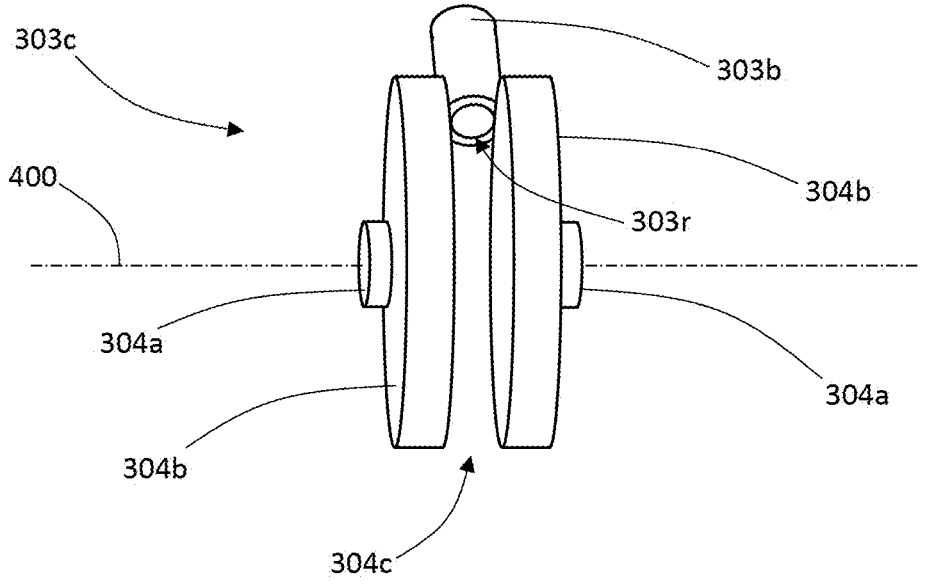

As reflected in FIGS. 2, 26 and 27, the wand 300 and spray tube may be configured such that spray tube 305 may be placed in folded/stowed (e.g., as shown in FIGS. 2, 26) and extended/deployed (e.g., as shown in FIG. 27) positions. The dispensing fixture 100 and/or the bottle 20 may be provided with an attached wand stowing fixture 350 configured to hold and store the wand 300 closely thereto when the system is not in use. The wand 300 may be provided with a spray button, switch or trigger 320, wherein the wand 300 and/or dispensing fixture 100 is/are configured to be activated to deliver liquid from the bottle to the nozzle, upon engagement/operation of the button, switch or trigger 320 by a user.

As reflected in FIGS. 34A-34G, the dispensing fixture 100 and/or the bottle 20 (not shown) may be provided with a protrusion 130 configured to hold and store the trigger spray dispenser 500 closely thereto when the system is not in use. The dispensing fixture 100 may comprise a front wall 100a, a rear wall 100b opposite the front wall, and side walls 100c extending between the front wall 100a and the rear wall 100b, where at least one of the side walls 100c comprises a protrusion 130. The handle 508 of the trigger spray dispenser 500 may comprise a front wall 508a, a rear wall 508b opposite the front wall, and side walls 508c extending between the front wall 508a and the rear wall 508b, where at least one of the side walls 508c comprises a recess 512 complementary to the protrusion 130 in at least one of the side walls 100c of the dispensing fixture 100. The recess 512 in the at least one side wall 508c of the trigger spray dispenser 500 handle 508 and the protrusion 130 in the at least one side wall 100c of the dispensing fixture 100 may be any shape or size, provided that the recess 512 is of complementary shape and size to the protrusion 130. The complementary shape and size of the recess and the protrusion allows for an intuitive, user-friendly, and secure way to store the trigger spray dispenser close to the bottle. The protrusion 130 and the recess 512 may also be configured such that the trigger spray dispenser 500 may be placed and stored in a number of different orientations. As such, the user need not precisely and painstakingly orient the trigger spray dispenser in order to securely store it with the bottle. In order to further prevent the trigger spray dispenser from shifting during storage or shipment, the surface of the recess and the surface of the protrusion may be provided with cooperating mating features to limit separation between the recess and the protrusion.

The cross section (taken parallel to the side walls 508c) of the recess 512 may be a circle, an ellipse, an oval, a star, a square or other polygon, or an irregular shape. Similarly, the cross section (taken parallel to the side wall 100c) of the protrusion 130 may be a circle, an ellipse, an oval, a star, a square or other polygon, or any other suitable shape. The recess 512 may be a through opening extending through the handle 508, as shown in FIGS. 34A-34G. The shape of the through opening may also be circular, elliptical, oval, triangular, square, rectangular, or other polygonal shape, or any other suitable shape. The recess 512 and the protrusion 130 may have symmetrical shapes. Preferably, the recess 512 and the protrusion 130 have a symmetrical, elliptical shape, as shown in FIGS. 34A-34G. The shape of the recess 512 and the protrusion may be same as the shape of the handle 110 of the dispensing fixture 100.

Alternatively (not shown), the protrusion may be provided on at least one side wall 508c of the trigger spray dispenser 500 handle 508. At least one side wall 100c of the dispensing fixture 100 may then be provided with a recess complementary to and configured to receive the protrusion.

The bottle 20 may be formed or molded from any suitable material including but not limited to metal (e.g., brass, copper, stainless steel), glass, or polymer/plastic. For reasons of material cost, manufacturing efficiency, durability and avoidance of fouling, corrosion and/or reactivity with liquid compositions contemplated herein, it may be preferred that the bottle be manufactured from plastic, preferably a plastic formulated predominantly, or entirely, of a polyethylene such as HDPE (high density polyethylene), or a polyester such as polyethylene terephthalate (PET), modified extrusion-grade PET (EPET), or polypropylene (PP), or combinations thereof. Where high clarity and transparency are desired, PET or EPET may be preferred.

The bottle 20 may be formed of a substantially colorless, translucent or transparent material (for example, PET or EPET) to allow a user to visually ascertain the quantity of liquid product remaining in the bottle 20. In some examples, a substantially colorless, translucent and/or transparent bottle may be desired for the purpose of implying a message of transparency to the consumer/user, with respect to disclosure and/or safety of contents, particularly when the liquid product is also substantially colorless and/or clear. For purposes herein, there term "substantially colorless," with respect to a plastic bottle, means that that plastic from which the bottle is formed has less than 1 percent by weight, to, preferably, substantially 0 percent by weight, inorganic pigmenting agent(s) added to the plastic resin formulation from which the bottle is formed. For purposes herein, the terms "clear" and "substantially colorless," with respect to a liquid product, have the meanings ascribed to those terms in co-pending U.S. provisional patent application Ser. No. 63/355,134, the disclosure of which is incorporated herein by reference.

The bottle 20 may have an interior volume 22 configured to contain from about 800 g to about 4,500 g, or from about 1,000 g to about 2,500 g or from about 1,500 g to about 2,000 g of a liquid composition. The bottle 20 may have a maximum width from about 80 mm to about 250 mm, or from about 100 mm to about 200 mm or from about 140 mm to about 180 mm. The bottle 20 may have a maximum depth from about 50 mm to about 150 mm, or from about 60 mm to about 120 mm, or from about 60 mm to about 100 mm. The bottle 20 may have a width to depth ratio from about 4:1 to about 1.1:1, or form about 3:1 to about 1.25:1, or from about 2:1 to about 1.5:1. The bottle 20 may have a height from about 150 mm to about 400 mm, from about 175 mm to about 350 mm, or from about 225 mm to about 275 mm. The dimensions of the bottle may be selected to hold a sufficient amount/weight of liquid composition (enough composition to treat one or multiple target areas/surfaces of varying sizes, once or multiple times, e.g., multi-use product), while still being easily manipulated by a consumer, especially when the bottle is devoid of a handle or through hole.

Figure 20:
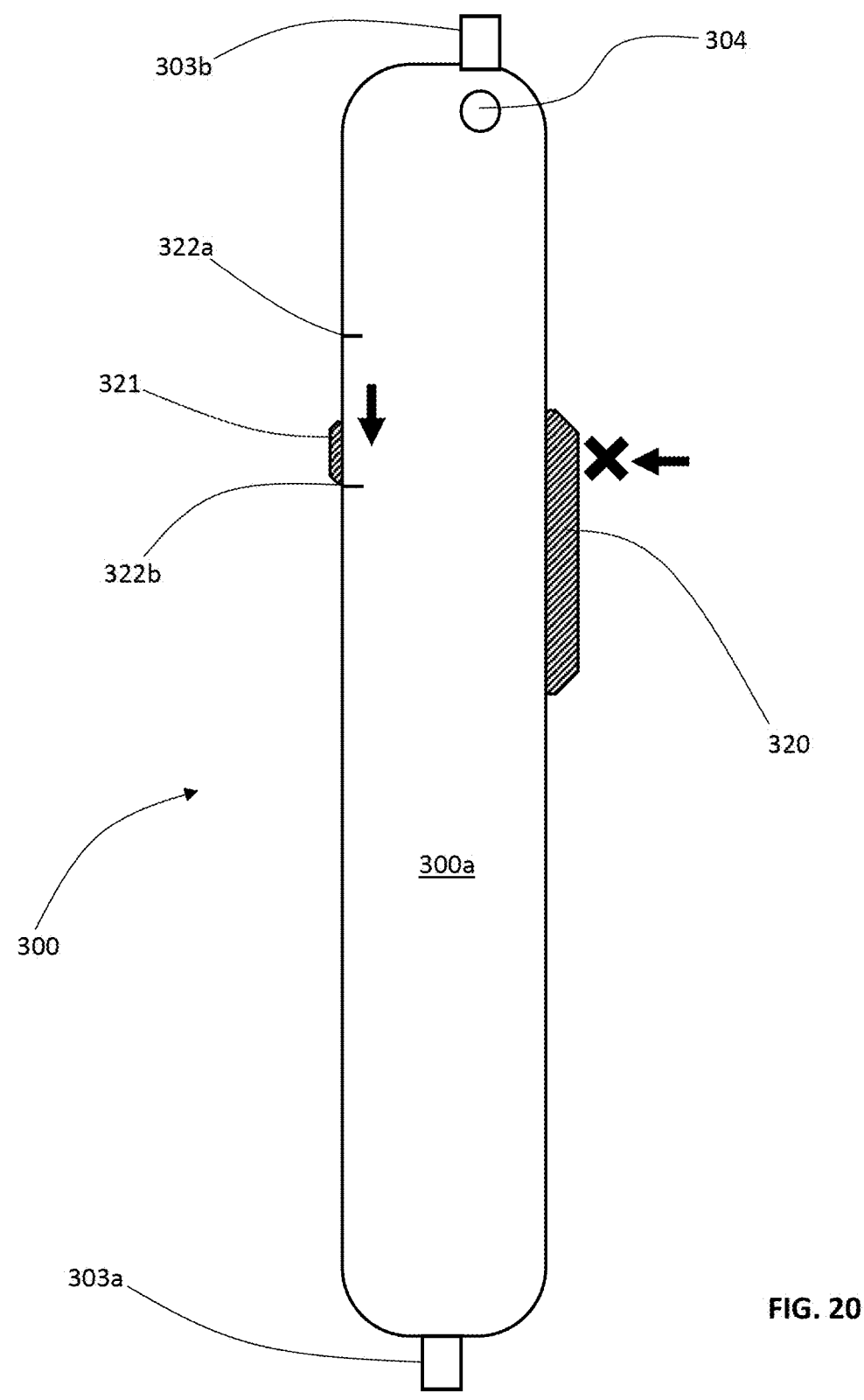
FIG. 20 is a schematic view of components of a non-limiting example of a spray wand, in an un-activated, locked configuration.
Figure 21:
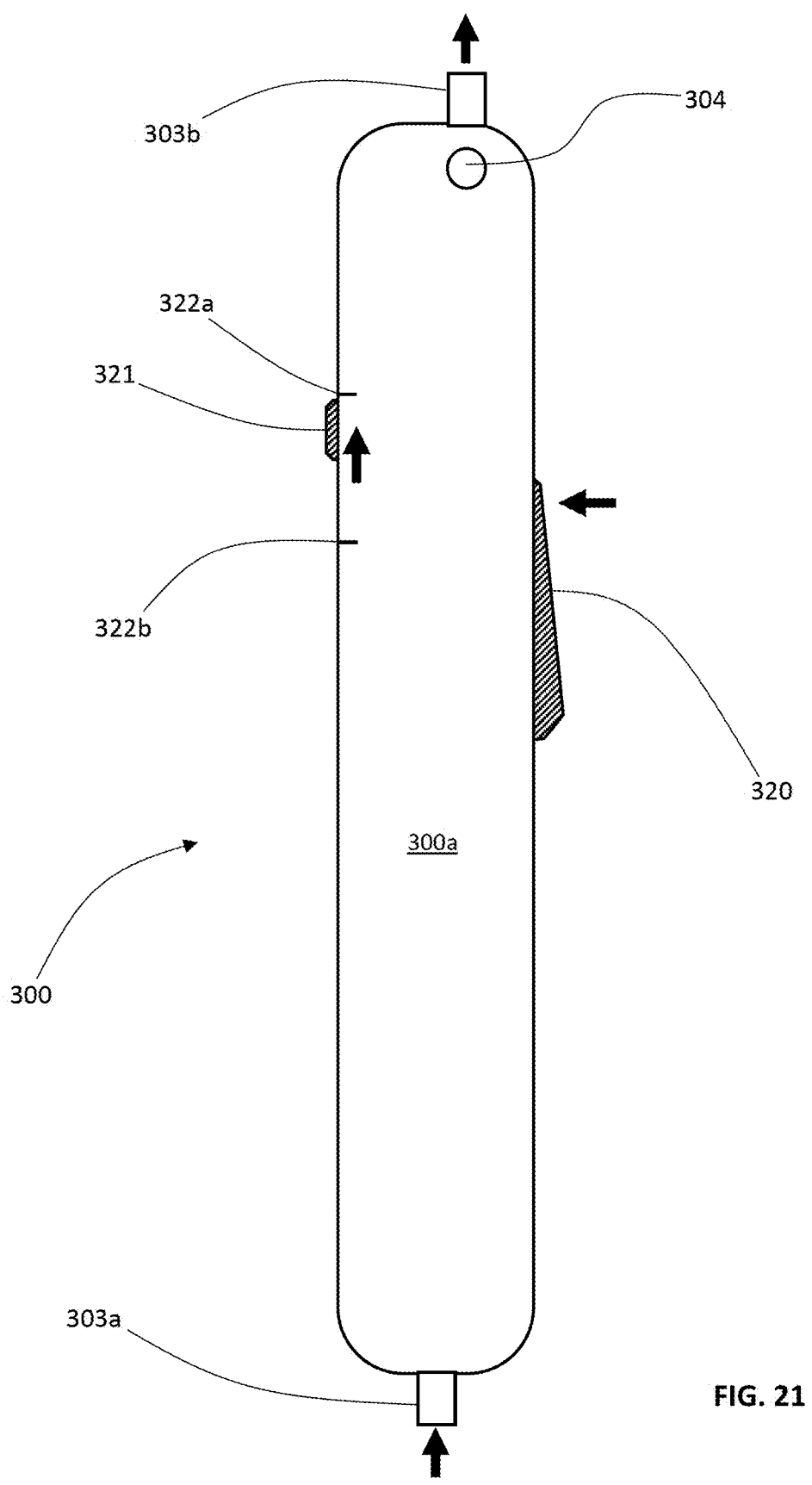
FIG. 21 is a schematic view of components of a non-limiting example of a spray wand, in an unlocked, activated configuration.

The dispensing fixture 100 may include a main housing 101 (see, e.g., FIG. 6), and the wand 300 may include a wand housing 300a (see, e.g., FIGS. 20, 21), each being formed to hold, and accommodate any required constrained movement, of other operable components of the respective dispensing fixture 100 and spray wand 300, in suitable positions with respect thereto. It may be preferred that the main housing 101 and wand housing 300a also be made of plastic, for reasons identified above. For greater rigidity, toughness and retention of structural integrity through extended and repeated use, it may be preferred that these housings be formed from a more rigid, tougher plastic such as acrylonitrile butadiene styrene (ABS), polypropylene, polycarbonate, and mixtures thereof, and preferably ABS.

Starter Package Security, and Convenient Bottle Replacement Features

It has been learned to be desirable that a liquid dispensing system provided with a filled bottle 20, dispensing fixture 100 and spray wand 300 or other type of spray dispenser (e.g., trigger spray dispenser 500) that are protected from accidental or unintended activation, or leakage of liquid product in the bottle, prior to consumer purchase. Accordingly, a starter package may be configured and assembled as described below.

Figure 3:
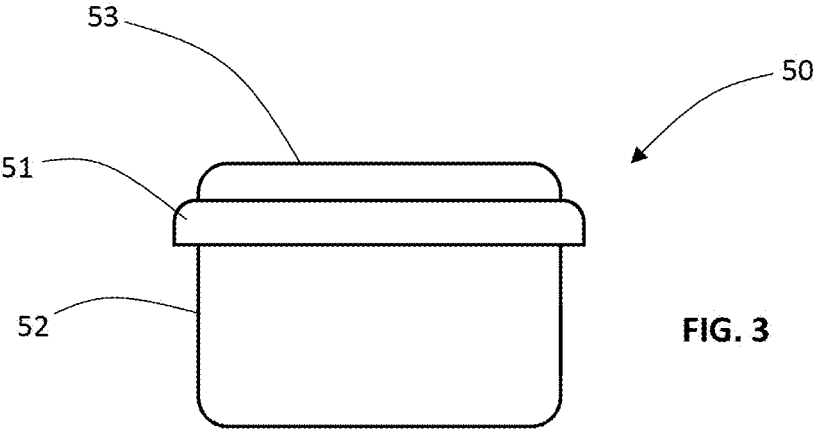
FIG. 3 is a schematic elevation view of a non-limiting example of a cap.
Figure 4:
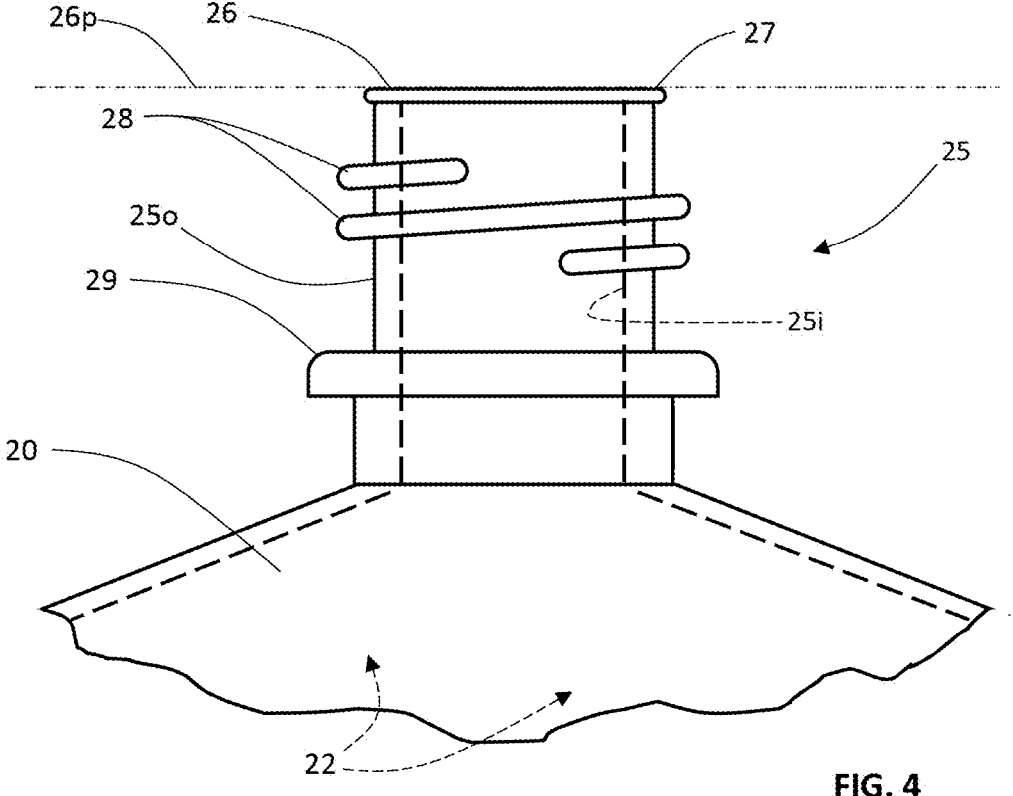
FIG. 4 is a schematic elevation view of a non-limiting example of a portion of a bottle with a neck.
Figure 5:
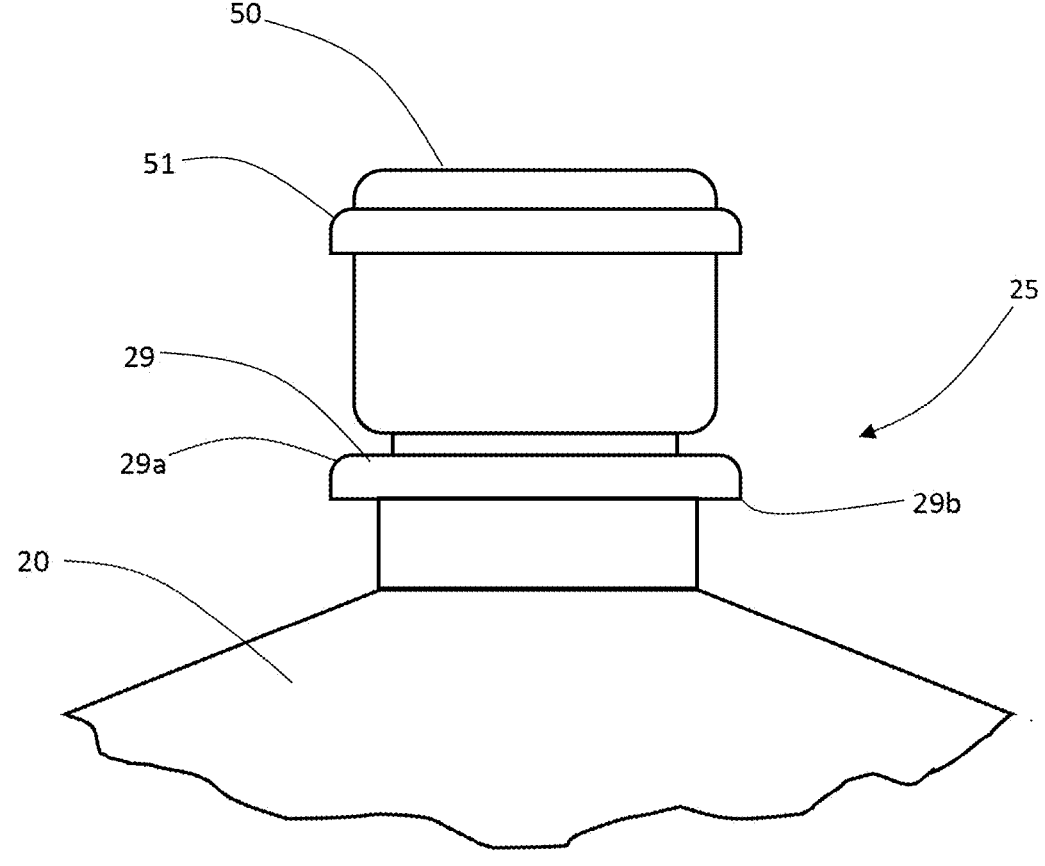
FIG. 5 is a schematic elevation view of a non-limiting example of a portion of a bottle with a neck, with a cap installed thereon.

Referring to FIGS. 3-5, a bottle 20 defining and enclosing an interior volume 22 may be provided and filled with liquid product/composition. A main portion of bottle 20 may have extending therefrom a neck 25, which terminates with a rim 26. The neck may have an inner diameter of from about 25 mm to about 60 mm, or from about 30 mm to about 55 mm, or from about 35 mm to about 50 mm. The neck may have an outer diameter of from about 25 mm to about 60 mm, or from about 30 mm to about 55 mm, or from about 35 mm to about 50 mm. The neck may have a height from about 10 mm to about 35 mm, from about 15 mm to about 30 mm or from about 18 mm to about 25 mm. Rim 26 substantially occupies a single plane 26p to facilitate efficient sealing thereagainst, and circumscribes and defines a main opening in the bottle, to the interior volume 22. The main opening and/or the rim 62 may have a circular configuration (e.g., when viewed from above in the non-limiting examples depicted) to facilitate efficient sealing thereagainst, and to accommodate and facilitate operation/fastening/removal of a screw-on or snap-on cap, where desired.

Below or spaced from the rim 26 the neck may have a first retaining feature 28. In some examples, first retaining feature 28 may be a configuration of outwardly projecting helical screw threads 28 formed about the neck, as suggested in the figures. Alternatively, first retaining feature 28 may be one or more outward projections adapted to cooperate, e.g., with a snap-on cap or fitted cap, e.g., a single circumferential ridge structure, or a series of circumferentially arranged ridge or projecting structures (not shown). In other examples, first retaining feature 28 may be a configuration of inward grooves, in the form of negative screw thread grooves or other circumferentially arranged grooves. In other examples, first retaining feature(s) 28 may be disposed inside the neck, spaced from the rim, and have the form of helical threads projecting radially inwardly from internal neck profile 25i, circumferentially-arranged ridge or projecting structures projecting radially inwardly from internal neck profile 25i, or even negative threads in the form of helical grooves projecting radially outwardly from inner neck profile 25i, or circumferentially-arranged grooves or cavities projecting radially outwardly from internal neck profile 25i. These arrangements, and others not specifically described but contemplated herein, may be configured to cooperate with cooperating/mating features of a suitable cap, to hold the cap in place in scaling configuration over the rim 26 and/or within the main opening, and seal the main opening such that liquid contents of the bottle are securely retained therein without leakage, even when the bottle is laid on its side or inverted.

As suggested above, the filled bottle may be provided with a cap 50 configured to scalingly fit and/or be secured over the rim and/or within the main opening. In the particular non-limiting example shown, cap 50 may be provided with interior, inwardly projecting helical threads (not specifically shown) adapted to cooperate with first retaining feature 28 (as shown, in the form of outwardly projecting helical threads), such that cap 50 may be screwed onto the neck, over the rim. If needed or desired, cap 50 may be provided with an inside gasket (not shown) to facilitate scaling against rim 26. In the configuration shown in FIG. 5, the cap may be uncrewed to open the bottle. In other configurations, as suggested above, first retaining feature 28 and cap 50 may be configured to seal and close the main opening via other features, such as a ring-snap configuration, etc.

As reflected in FIGS. 4 and 5, neck 25 may be provided with a second retaining feature 29. Second retaining feature 29 may have the form of a circumferential ridge, or circumferentially arranged series of formations, projecting radially outwardly from outer neck profile 25o. The second retaining feature 29 may have a height measured along the longitudinal axis of the bottle 20 of from about 1 mm to about 4 mm, or from about 1.25 mm to about 3 mm or from about 1.5 mm to about 2.5 mm. The second retaining feature 29 may project from about 2 mm to about 8 mm, or from about 2.5 mm to about 6 mm, or from about 3 mm to about 5 mm radially outward from the neck. The second retaining feature 29 may be from about 1.5 mm to about 6 mm, or from about 2 mm to about 5 mm, or from about 2.5 mm to about 4 mm above the bottom of the neck 25. The second retaining feature 29 may be from about 10 mm to about 35 mm, or from about 15 mm to about 30 mm, or from about 18 mm to about 25 mm below the rim 26. Cap 50 may be provided with an effectively similarly shaped and size third retaining feature 51, projecting radially outwardly from the main outer side surfaces of the cap. In some examples, the third retaining feature 51 and the second retaining feature 29 have identical shapes and/or dimensions. In other examples, second retaining feature 29 and third retaining feature 51 may be radially inwardly-projecting grooves or cavities, rather than outwardly-projecting ridges or formations.

The functions of second retaining feature 29 and third retaining feature 51 will become apparent now as follows, with reference to FIGS. 6-9. In a starter package, the liquid dispensing system may be provided with a suitably shaped and sized spacer 120, disposed between the bottle 20 and a dispensing fixture 100. The dispensing fixture 100 may be provided with one or more latching jaws 105, positioned and configured to latchably engage third retaining feature 51, when a cap 51 is present, and thereby hold the dispensing fixture 100 to the bottle via latching to the cap 50. The spacer 120 may be made of any material sufficient to provide suitable structural integrity and may be formed to be a visual extension of or visual complement to the shapes of the bottle and the dispensing fixture 100. It may be formed of a material that is tinted, pigmented or printed in one or more colors selected to visibly contrast with color(s) of the bottle and/or the dispensing fixture, to make it visually distinct from the bottle and dispensing fixture. It may be made of paper, paperboard, cardboard or other cellulose pulp-based material, for purposes of manufacturing and cost efficiency and also for purposes of conveying an implicit message to the consumer that it is disposable upon setup/activation of the system.

The one or more latching jaws 105 may be housed and held within main body 101 of dispensing fixture 100, which may have tracks 108 or other features therein that provide for suitably constrained movement of latching jaws 105 between latched and unlatched positions. One or more latching jaws 105 may be biased in a latched position by one or more latch spring(s) 107, acting directly or indirectly on the latching jaw 105 and on the main body 101. The dispensing fixture may be further provided with actuators 106 for one or more, or all, of the latching jaws included, by which a user may cause a latching jaw 105 to move from a latched position to an unlatched position. As suggested in FIG. 8, the dispensing fixture may be provided with at least two substantially opposing latching jaws 105, operably linked to two opposing latch actuators 106 via latch actuator connectors 106a, whereby a user may conveniently opposingly press or squeeze actuators 106 toward each other with a single hand, to move corresponding opposing latching jaws 105 away from each other, to unlatched positions, and if needed, using the other hand to hold or steady bottle 20 and/or wand 300.

Figure 6:
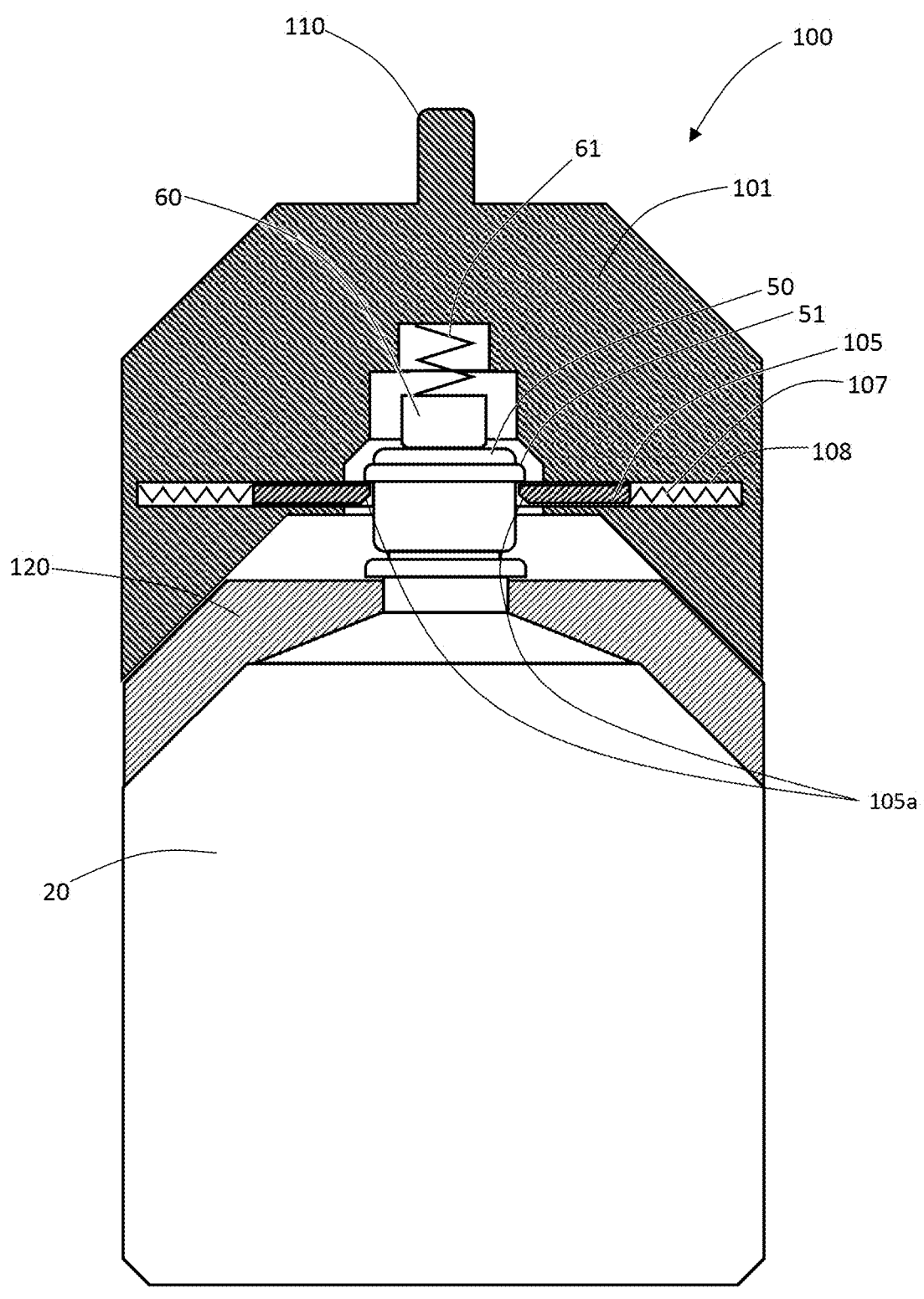
FIG. 6 is a schematic elevation view of a non-limiting example of a bottle with a neck, with a cap installed thereon, with a schematic vertical section view of portions of a non-limiting example of a dispensing fixture and spacer installed thereon.
Figure 7:
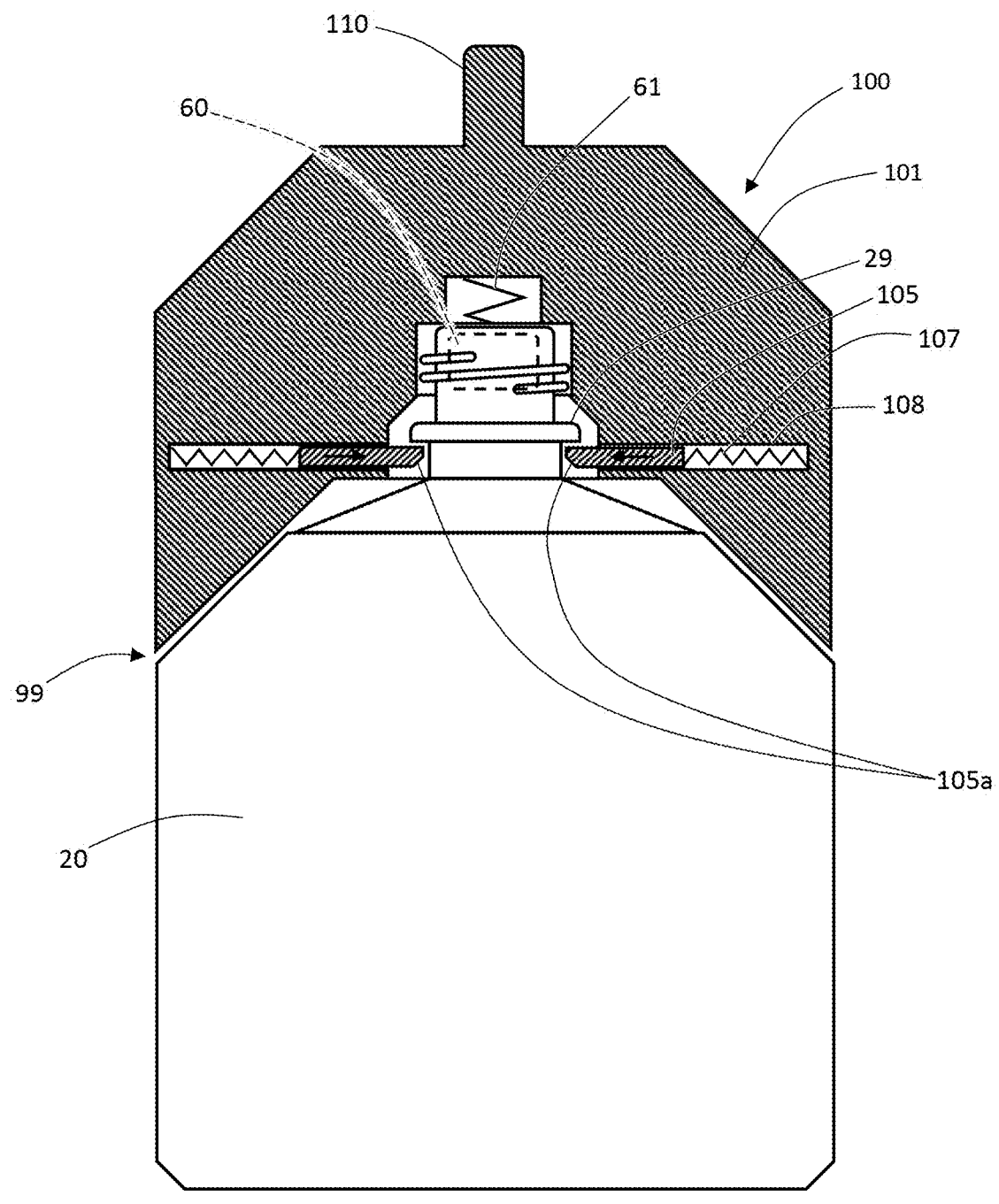
FIG. 7 is a schematic elevation view of a non-limiting example of a bottle with a neck, with a schematic vertical section view of portions of a non-limiting example of a dispensing fixture installed thereon.
Figure 8:
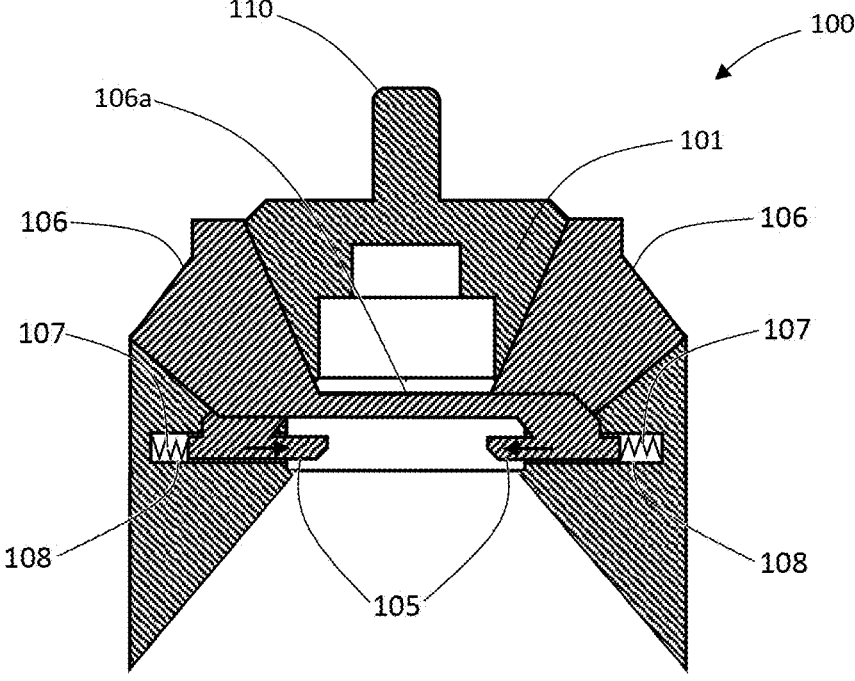
FIG. 8 is a schematic vertical section view of portions of a non-limiting example of a dispensing fixture.
Figure 9:
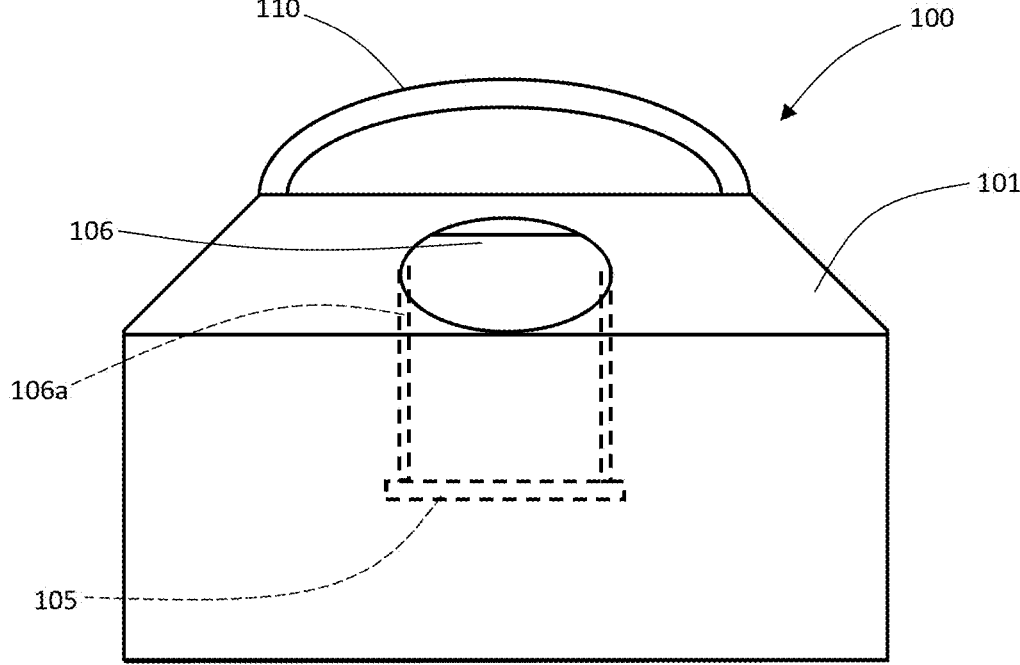
FIG. 9 is a schematic elevation view of portions of a non-limiting example of a dispensing fixture. (The views shown in FIGS. 8 and 9 are rotated 90 degrees from each other along a horizontal plane.)

Referring to FIG. 6, thus, a user may move latching jaw(s) 105 to unlatched position(s) to enable the dispensing fixture to be lifted and removed from the bottle 20 and cap 50 in a simple and easy way. The user may then lift and remove spacer 120 and remove cap 50 from bottle 20 (in that order, or alternatively, remove the cap first, and then the spacer). Referring to FIG. 7, the user may then lower dispensing fixture 100 over the neck and urge it downwardly, whereupon latching jaws 105 may be urged open to unlatched positions (if e.g., they are biased in closed/latched positions as described above) via engagement of second retaining feature 29 with radiused lower edges, or chamfers 105a, on latching jaws 105. Urging of latching jaw(s) 105 to unlatched positions upon downward force and movement, with respect to bottle 20, may be facilitated by inclusion of a rounded/radiused and/or chamfered upper edge 29a on second retaining feature 29 (illustrated in, e.g., FIG. 5.) Where the latching jaw(s) 105 are biased toward a latching position, e.g., by spring(s), once they are urged down over a retaining feature 29 on the neck of the bottle, with an appropriately shaped retaining feature 29 they will emit an audible snap or click sound as they move to the latching position(s), indicating to the user that latching has been accomplished. To provide or enhance this function, as well as to provide more secure latching, second retaining feature 29 may be formed with a non-graduating or abrupt/sharp lower transition 29b at a lower edge thereof, to a lower surface of the retaining feature, such that once the upper edges of latching jaw(s) 105 are moved downwardly and clear lower transition 29b, they are free to snap to the latched position toward which they are biased, similar to the manner in which an ordinary spring-biased door latch bolt snaps into latched position when an ordinary door in a house is pushed into its frame without turning the door knob, and the latch bolt clears the proximate edge of the opening in the strike plate.

After dispensing fixture 100 is lowered to a position in which latching jaw(s) 105 may cooperate with and clear second retaining feature 29 and move to latched position(s), dispensing fixture 100 is latched to bottle 20, as suggested in FIG. 7. The dispensing fixture and the bottle may be formed with cooperating/mating features that facilitate accurate alignment and secure positioning and seating of the dispensing fixture on the bottle and neck.

Utilizing a system having the features described above, a user may conveniently affix the dispensing fixture to a first bottle that is new and filled with liquid product, in a simple and easy way. When the first bottle is emptied of liquid product through operation of the dispensing system, the user may unlatch the dispensing fixture from the bottle in the same manner it was first unlatched from the cap 50 as described above, procure a second (replacement) bottle filled with liquid product and having a neck configuration that is provided with a retaining feature identical or substantially similar to that of the first bottle, remove a cap therefrom, and latch the dispensing fixture to the second bottle (e.g., refill bottle) in a convenient and easy way, with minimized chance that the user will be required to have hand or skin contact with the liquid product.

As suggested in FIGS. 1, 2 and 7, it may be desired that dispensing fixture main body 101 and bottle 20 be imparted with cooperating mating features and outer shape profiles that provide substantial shape profile continuity where the two components meet at and along surface abutment 99, when they are assembled together, over a majority of the path of abutment 99 along/about the outer surface of the assembled package. This may be desired for reasons of esthetics, ergonomics, intuitive non-verbal guidance to a user concerning how the dispensing fixture and bottle are designed to fit together, and/or efficient package volume/use of shipping and storage space. "Substantial shape profile continuity" means that there is no substantial step change in surface contour at the surface abutment 99, other than a minor ridge or groove thereat, having a width less than 5 mm, resulting from variations within manufacturing tolerances and/or minor fit imperfections.

As will be explained in more detail below, the dispensing fixture 100 may be provided with a liquid outlet coupling 60 that is configured to engage the bottle and neck about the main opening. In a starter package prior to removal of spacer 120 and cap 50, liquid outlet coupling 60 is prevented from engaging the bottle neck, by cap 50. After removal of spacer 120 and cap 50 as described above, however, upon proper alignment and seating, liquid outlet coupling 60 may engage the bottle neck at the main opening, as reflected in FIG. 7.

Vacuum Relief Features

As liquid product is removed from the interior volume 22 of bottle 20 through use of the dispensing system by a user, a vacuum will develop inside the bottle, unless the system includes a vacuum relief system. A vacuum inside the bottle will reduce the ability of a pump to draw liquid from the bottle.

Referring now to FIGS. 10A-10C, 11A-11B, 12, 13, 14A-14B, bottle 20 may be provided with a vacuum relief system that allows ambient air to be drawn into the bottle, to occupy the portion of the interior volume 22 vacated by withdrawn liquid product. A vacuum relief system may include a vacuum relief port 41, providing fluid communication between the interior volume 22 and the outside environment, optionally accompanied by an automatic one-way valve such as a check valve. The optional automatic one-way valve may be located so as to be operably associated with the vacuum relief port and be configured to automatically permit air to flow from the outside environment, through the vacuum relief port 41, into the interior volume, upon development of a vacuum (i.e., pressure within the interior volume 22 that is lower than ambient pressure). At the same time, the optional automatic one-way valve may be configured to automatically restrict or prevent fluid flow from the interior volume 22 out through the vacuum relief port 41, in the event that pressure at the valve is greater at the interior side than at the outside of the automatic one-way valve and/or port 41, as might occur when for example, bottle 22 is overturned such that liquid within the bottle and under pressure of its weight contacts the valve and/or port 41. In some examples, the optional automatic one-way valve may have the form of a gravity- or spring-operated check valve (not shown). In some examples, the automatic one-way valve may have the form of a flap check valve, including a movable flap disposed over the port 41 at its interior opening. The vacuum relief port 41 may be provided in the bottle 20 itself, e.g., through a wall thereof, preferably a wall along a top or upper region where the interior opening of the port will not be below the level of liquid in the filled, upright bottle.

A vacuum relief port 41 or system of ports and/or an optional associated automatic one-way valve (e.g., check valve) can be provided with, in and/or through any component(s) of the system where a port or ports can be configured to provide fluid communication between the interior volume 22 of bottle 20, and the outside environment. To ensure proper functioning of each, the fluid pathway of the vacuum relief port 41 or system of ports is separate and distinct from, i.e., not in fluid communication with, liquid passageway(s) provided to convey liquid product out of the bottle via activation of a pump (with the exception, however, that vacuum relief port(s) 40 and liquid dispensing passage 43 may each be in fluid communication with the interior volume 22 of bottle 20).

In some examples, a vacuum relief and/or optional check valve system may be provided in a component provided with the bottle. For example, a filled bottle 20 may be supplied with a fluid passage fitting 40. A fluid passage fitting 40 may be adapted and formed to fit over the rim and/or within the main opening of the bottle (i.e., within the neck). Fluid passage fitting 40 may be adapted to screw onto the neck 25, to press/friction fit within the neck and main opening, or (as shown in FIG. 13) to snap fit over the rim via e.g., engagement of a rim attachment structure 45 on fitting 40, with a rim lip 27 on the neck.

Fluid passage fitting 40 may be provided with a fluid inhibiting element 70, which may be disposed on top of the liquid dispensing passage 43 of the fluid passage fitting 40. The fluid inhibiting element may inhibit the (vertical) expulsion of fluid through the liquid dispensing passage 43 and out of the bottle, when the bottle 20 is uncapped and squeezed by a consumer-user, e.g., as the consumer-user grips the bottle 20 to pick it up (particularly a bottle that is devoid of a carry handle). A fluid inhibiting element 70 is particularly preferred for liquid pesticide products, to minimize the chances of accidental contact with a consumer-user.

Fluid passage fitting 40 may be provided with a coupling receptacle 40*a* in fluid communication with a liquid dispensing passage 43 through a draw bib 46. The fluid passage fitting 40 may be provided with one or more vacuum relief ports 41 with interior openings 42, providing for fluid communication between the interior volume 22 of the bottle 20 and the outside environment. As suggested above, the one or more vacuum relief ports 41 may each be operably associated with a check valve. In a more particular example, a check valve structure may be provided in the form of a flexible sealing gasket 30*a*.

Figure 13:
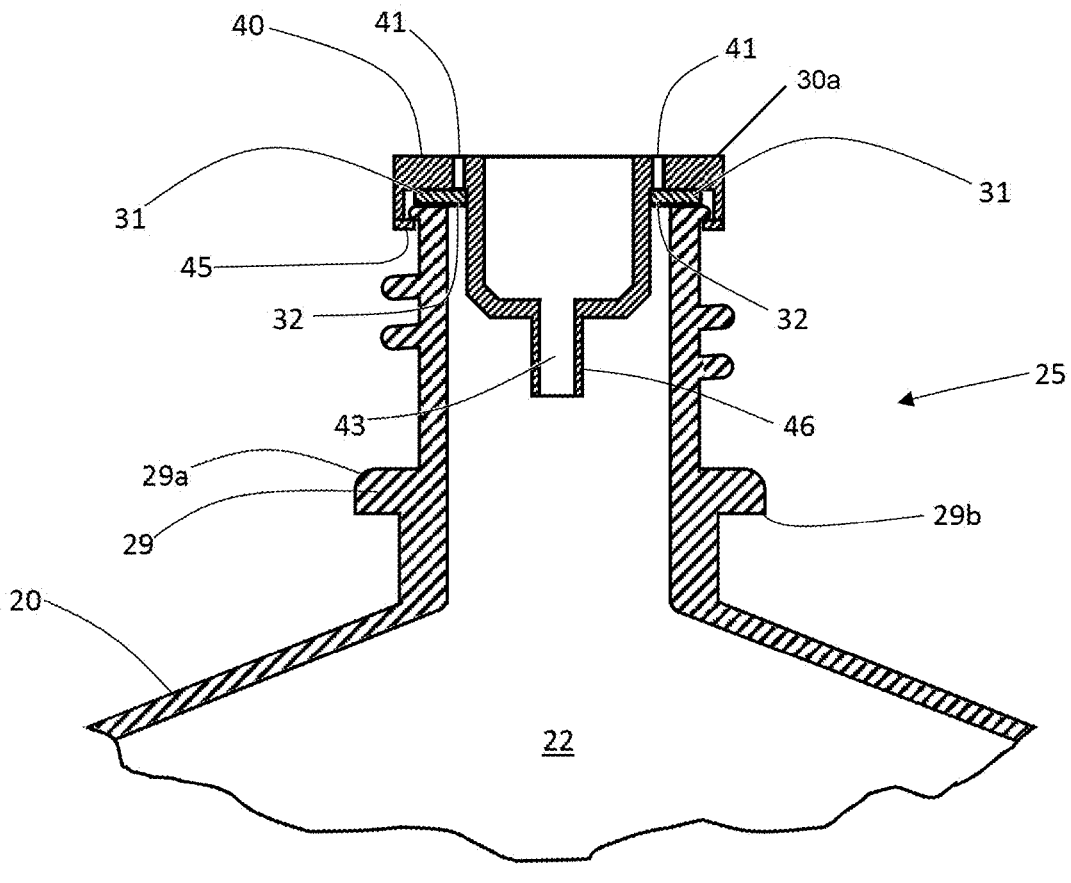
FIG. 13 is a schematic vertical section view of the components shown in FIGS. 10A-10C, shown assembled together.

Gasket 30*a* may be formed of or include a flexible, elastic, resilient material and have a first portion 31 effectively disposed so as to provide for sealing between fluid passage fitting 40 and neck 25 about the main opening, and a second portion 32 suitably sized, shaped and configured to cover the interior openings 42 of vacuum relief ports 41, as suggested in FIG. 13. As suggested in FIG. 14A, gasket 30*a* and/or second portion 32 thereof, may be configured to be flexible, and thereby flex inwardly (i.e., toward the interior volume 22) upon development of a vacuum within interior volume 22, and thereby allow ambient air to enter interior volume 22 through vacuum relief ports 41, as suggested by the dotted-line arrows in FIG. 14A. When the vacuum is relieved, the elasticity of the gasket material will cause it to return to its original position covering the openings 42, where it will prevent outflow of fluid through ports 41.

Figure 15:
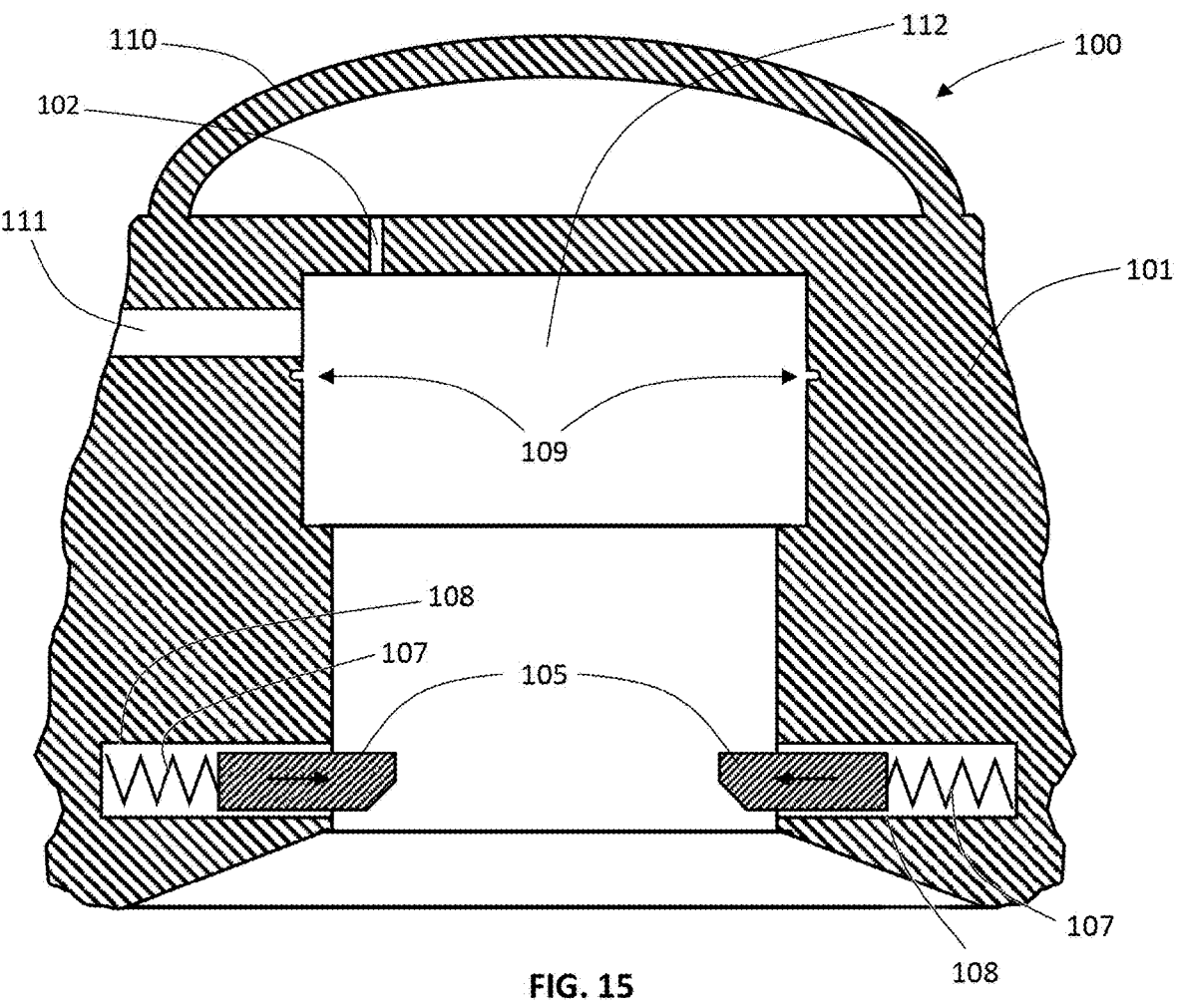
FIG. 15 is a schematic vertical section view of portions of a non-limiting example of a dispensing fixture.
Figure 16A:
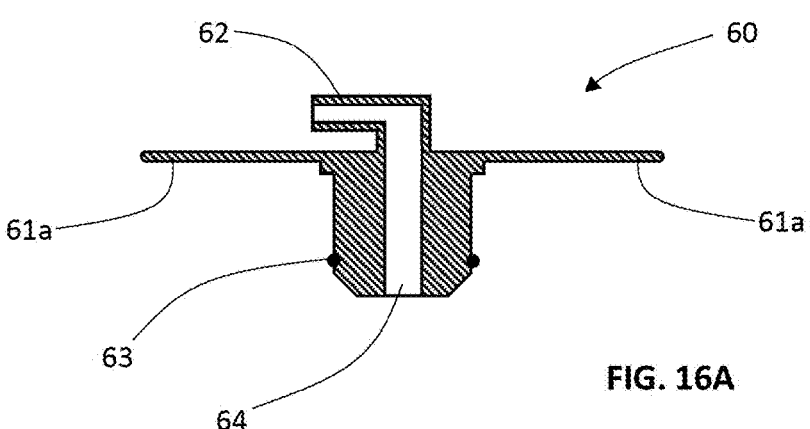
FIG. 16A is a schematic vertical section view of portions of a non-limiting example of a liquid outlet coupling.
Figure 16B:
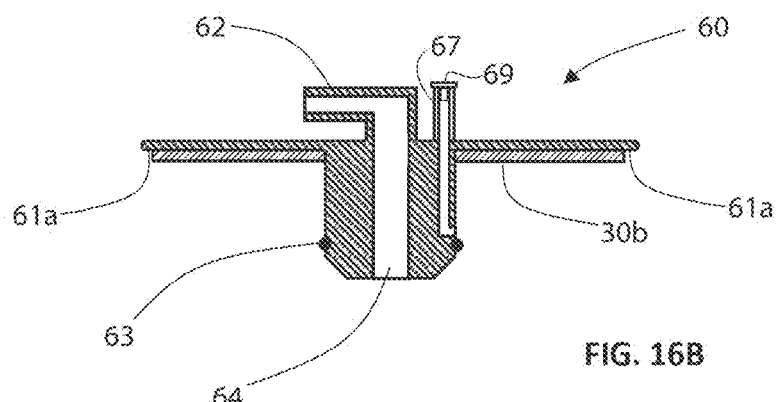
FIG. 16B is a schematic vertical section view of portions of a non-limiting example of a liquid outlet coupling.
Figure 17:
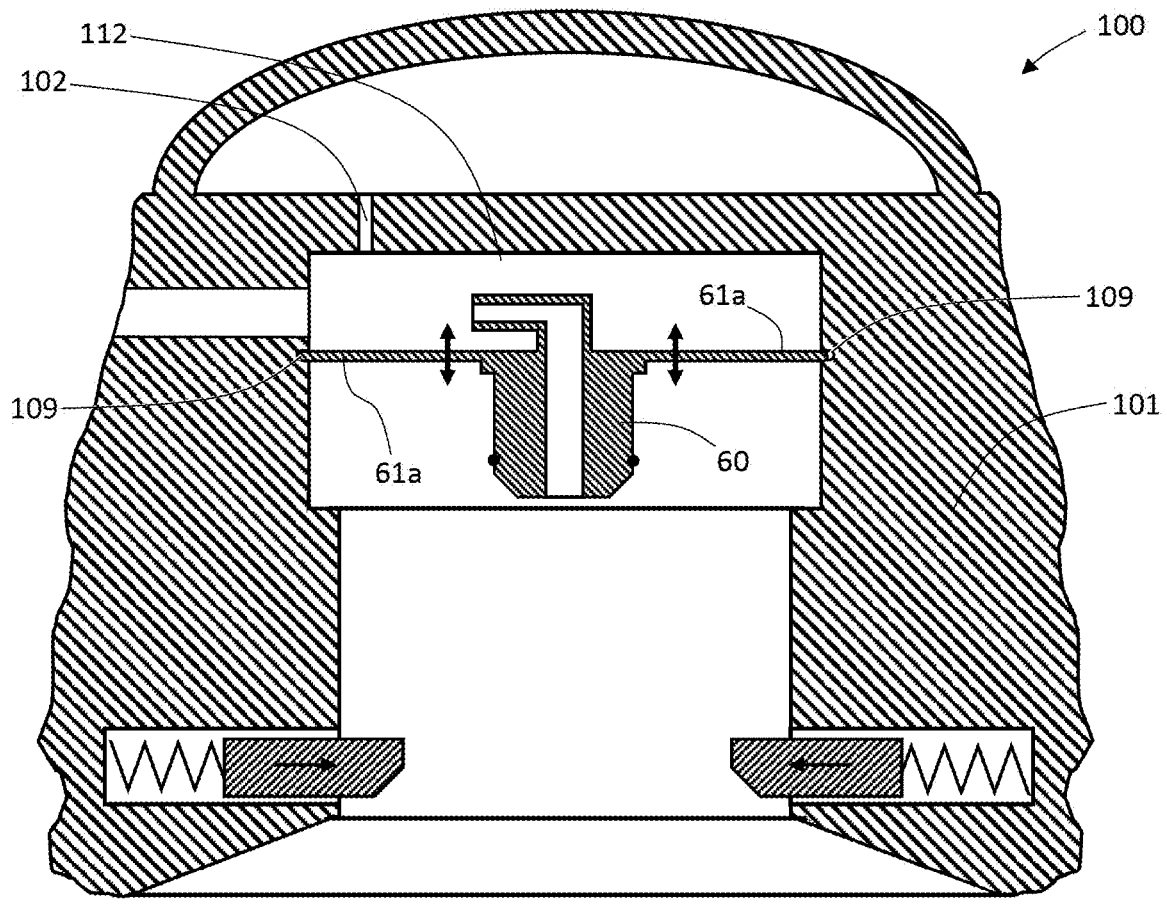
FIG. 17 is a schematic vertical section view of portions of a non-limiting example of a dispensing fixture with a non-limiting example of a liquid outlet coupling.

In some examples, the vacuum relief and/or an optional check valve system may be provided in a component(s) provided with the top fixture 100. The main body 101 of dispensing fixture 100 may be formed with a coupling cavity 112 to accommodate and retain in position a liquid outlet coupling 60. In some examples, the liquid outlet coupling 60 of the dispensing fixture 100 may be provided with one or more vacuum relief ports 67 having interior openings, as shown in FIG. 16B. When the top fixture 100 (shown in FIG. 15) is affixed to the bottle 20, the vacuum relief port 67 (shown in FIG. 16B) of liquid outlet coupling 60 may be in fluid communication with the interior openings 42 of the vacuum relief 41 port of the fluid passage fitting 40, providing fluid communication between the interior volume 22 of the bottle 20 and the outside environment. The one or more vacuum relief ports 67 of the liquid outlet coupling 60 may each be operably associated with a check valve 69, such as a duck bill valve, which may be disposed on top of the vacuum relief port 67.

Figure 18:
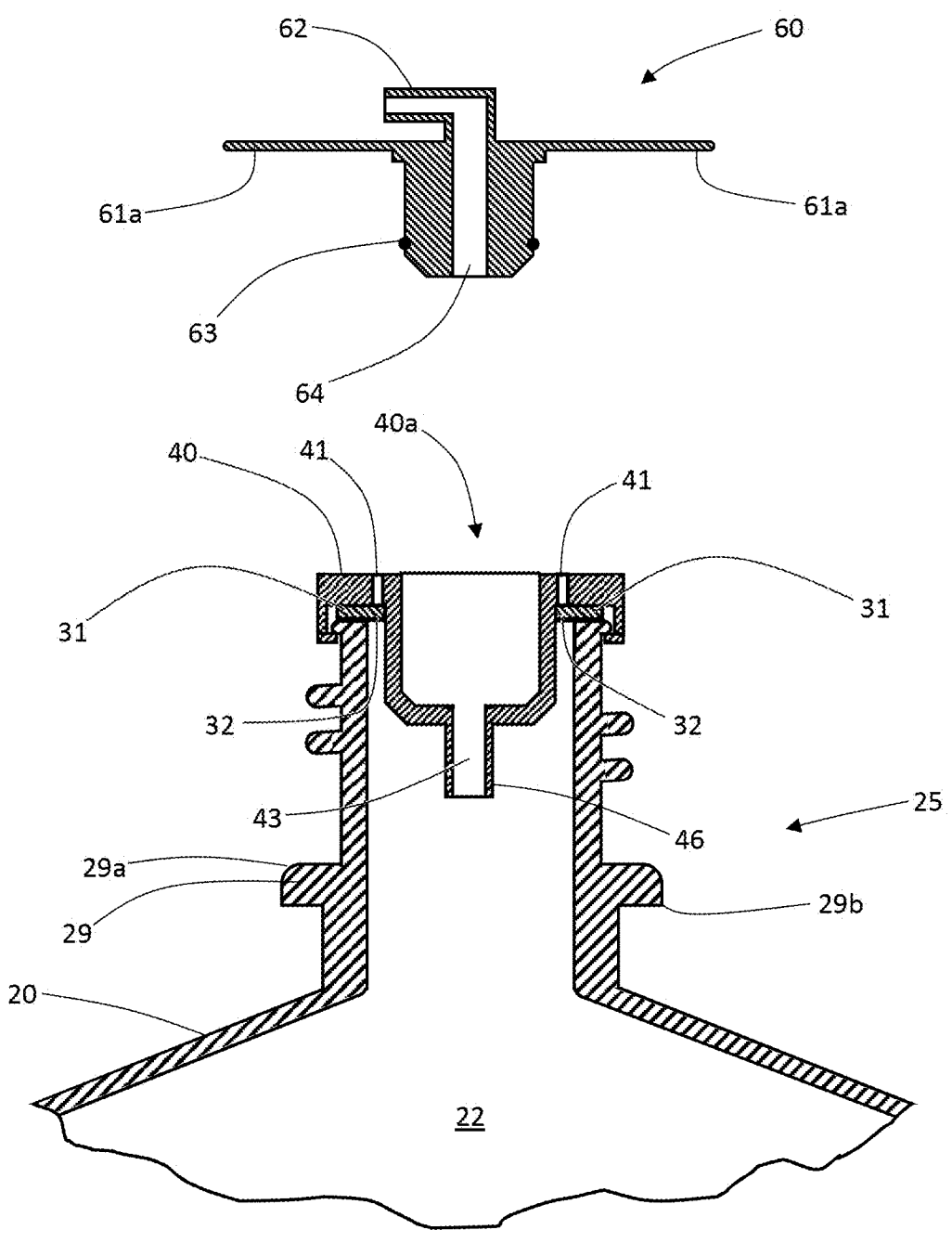
FIG. 18 is schematic vertical section views of a non-limiting example of a liquid outlet coupling, positioned over the assembly of components as shown in FIG. 13.

A flexible sealing gasket 30*b* may be disposed on the bottom surface of the liquid outlet coupling 60, e.g., the bottom surface of the bending springs 61*a* of the liquid outlet coupling 60. The gasket 30*b* may be formed of or include a flexible, elastic, resilient material. When the dispensing fixture 100 is affixed to the bottle 20 (e.g., latch to the second retaining feature 29), a fluid seal may be formed between the rim 26 of the bottle 20 and the flexible sealing gasket 30*b* of the liquid outlet coupling 60. Preferably, in such embodiments, the fluid passage fitting 40 may be adapted to press/friction fit within the neck 25 and main opening of the bottle (rather than over the rim 26 of the bottle 20 as shown in FIG. 18), the fluid passage fitting 40 need not have a rim attachment structure 45, and/or the bottle 20 need not have a rim lip 27. The liquid outlet coupling 60 and fluid passage fitting 40 may be formed and adapted to cooperatively fit together upon assembly of the complete dispensing fixture onto the bottle 20, as reflected in FIG. 19B.

The liquid outlet coupling 60 may be provided with an O-ring 63 or any other suitable gasketing/scaling mechanism to cause it to have effectively scaled fluid communication and connection with fluid passage fitting 40, when the two are assembled together. Liquid outlet coupling 60 may have outlet passage 64 therethrough, continuing from an inlet opening out through an outlet bibb 62. The draw tube 47/liquid dispensing passage 43 may fluidly communicate with the outlet passage 64 of the liquid outlet coupling 60. The O-ring 63 or any other suitable gasketing/scaling mechanism of the liquid outlet coupling 60 may prevent fluid communication (either air or liquid composition) between the draw tube 47/liquid dispensing passage 43 and the interior openings 42 of the vacuum relief 41 port of the fluid passage fitting 40. Preferably, the draw tube 47/liquid dispensing passage 43 only fluidly communicates with the outlet passage 64 of the liquid outlet coupling 60, when the dispensing fixture 100 is affixed to the bottle 20.

When the bottle 20 is capped, the interior openings 42 of the vacuum relief port 41 of the fluid passage fitting 40 may be in fluid communication with the draw tube 47/liquid dispensing passage 43. When the cap 50 is removed and the top fixture 100 is affixed to the bottle 20, the O-ring 63 (or any other suitable gasketing/sealing mechanism) of the liquid outlet coupling 60 forms a fluid seal with the interior wall of the coupling receptacle 40a of the fluid passage fitting 40, thereby preventing fluid communication (either air or liquid composition) between the draw tube 47/liquid dispensing passage 43 and the interior openings 42 of the vacuum relief 41 port of the fluid passage fitting 40.

As discussed above, the liquid outlet coupling 60 of the dispensing fixture 100 may be provided with one or more vacuum relief ports 67 having interior openings. When the top fixture 100 is affixed to the bottle 20, the vacuum relief port 67 is in fluid communication with the interior openings 42 of the vacuum relief 41 port of the fluid passage fitting 40, providing fluid (air) communication between the interior volume 22 of the bottle 20 and the outside environment. As discussed above, the top fixture 100 may include a gasket 30b that forms a fluid seal with the rim 26 of the neck 25 of the bottle 20, when the top fixture 100 is affixed to the bottle 20. When the gasket 30b forms a fluid seal with the rim 26 of the neck 25 of the bottle 20, the interior openings 42 of the vacuum relief port 41 of the fluid passage fitting 40 are preferably only in fluid communication with the interior openings of the one or more vacuum relief ports 67. This may prevent or reduce leakage of the liquid composition out through the interior openings 42 of the vacuum relief port 41 of the fluid passage fitting 40.

It may be appreciated that the examples described and depicted provides a simple, effective and inexpensively manufactured vacuum relief system. The fluid passage fitting 40 may be formed of any suitable polymeric/plastic material such as polypropylene or HDPE. The scaling gasket 30a/30b may be formed of a suitably resilient and elastic polymeric or cellulose-based plastic material suitable for gasket scaling applications, such as, by way of non-limiting example, polyethylene foam, silicone rubber, other natural or synthetic rubbers, cork, pulp/cellulose-based materials, etc.

Figure 10A:
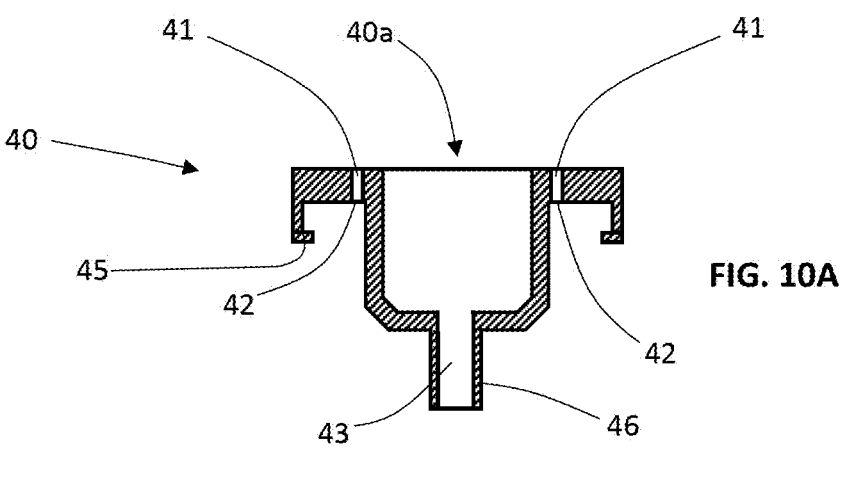
FIG. 10A is a schematic vertical section view of a non-limiting example of a fluid passage fitting.
Figure 10B:
FIG. 10B is a schematic vertical section view of a non-limiting example of a sealing gasket.
Figure 10C:
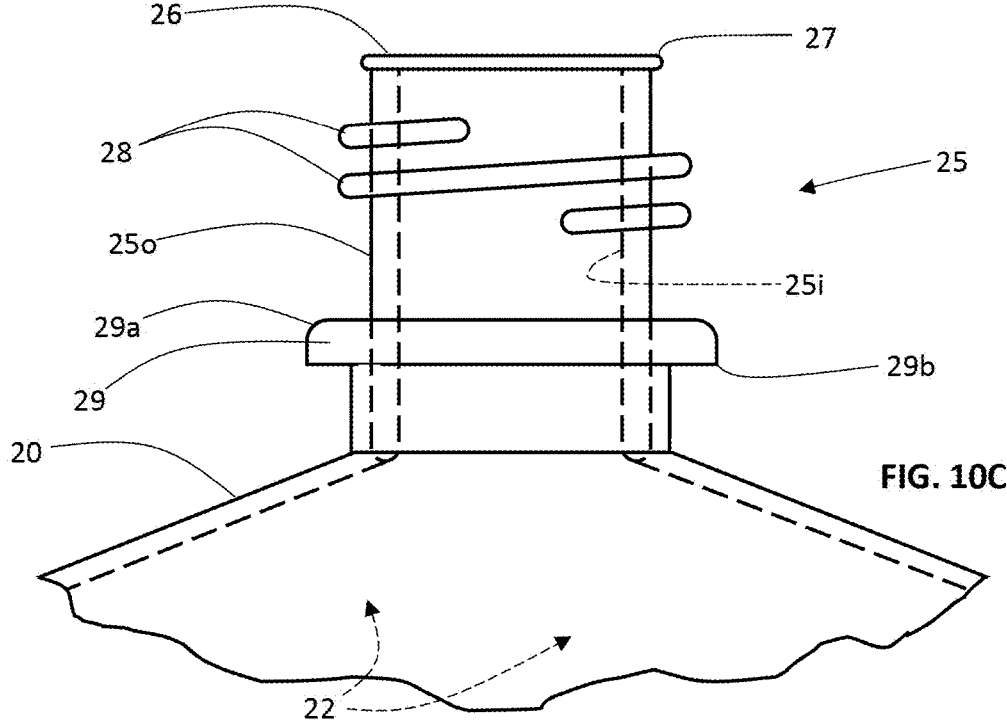
FIG. 10C is an elevation view of a non-limiting example of a portion of a bottle with a neck.
Figure 11A:
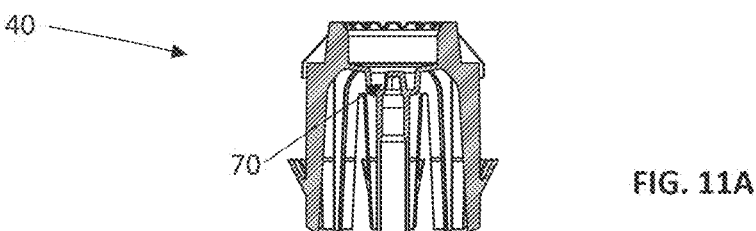
FIG. 11A is a schematic vertical section view of a non-limiting example of a fluid passage fitting.
Figure 11B:
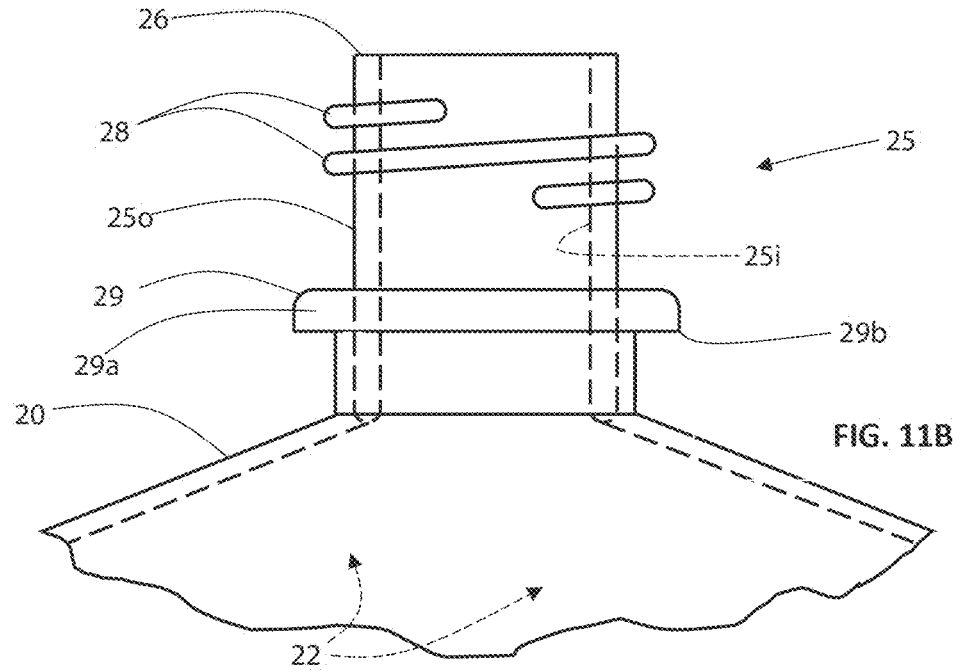
FIG. 11B is an elevation view of a non-limiting example of a portion of a bottle with a neck.
Figure 12:
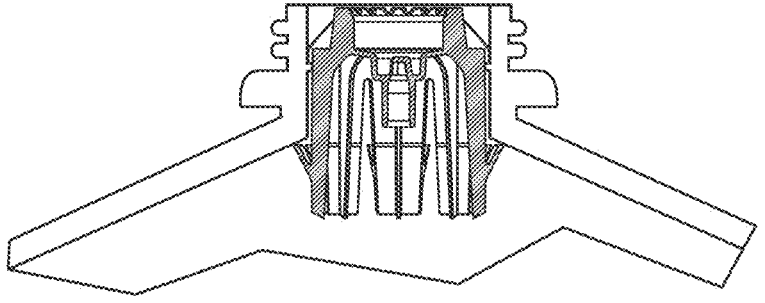
FIG. 12 is a schematic vertical section view of the components shown in FIGS. 11A-11B, shown assembled together.
Figure 14A:
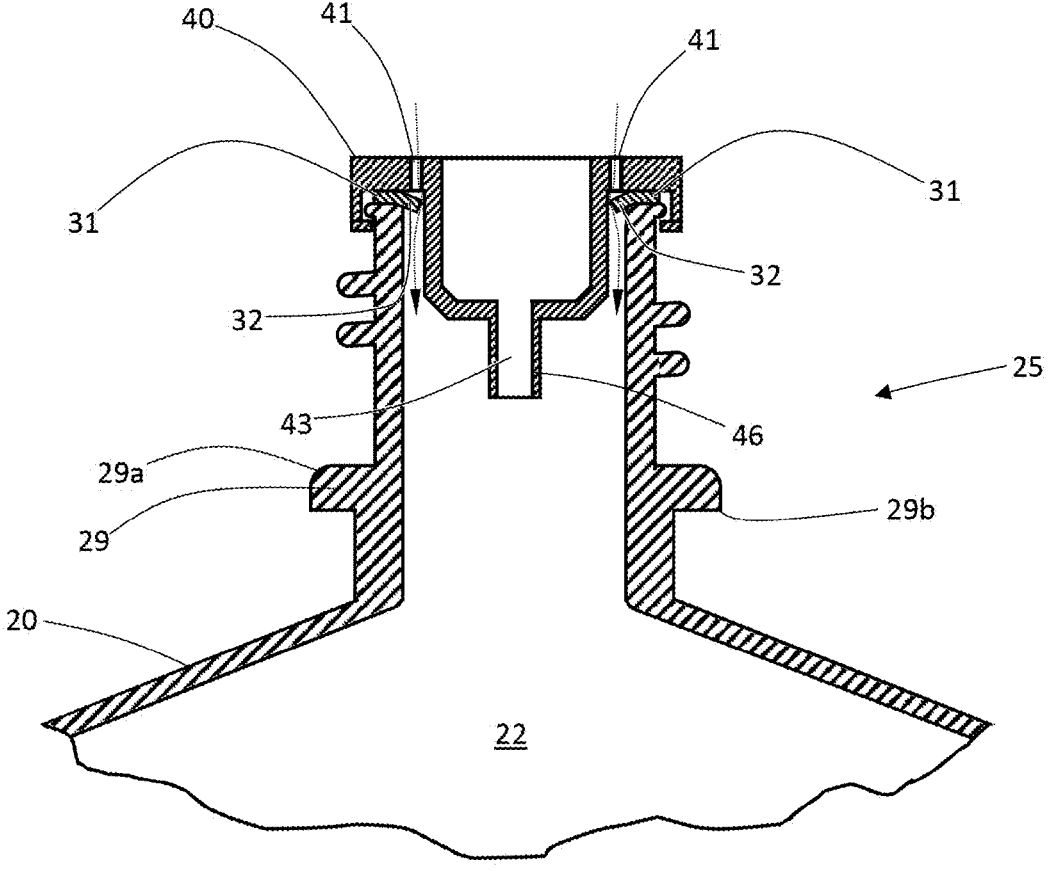
FIG. 14A is a schematic vertical section of the components shown in FIGS. 10A-10C, shown assembled together, and illustrating function and operation of an example of a vacuum relief port and check valve system.
Figure 14B:
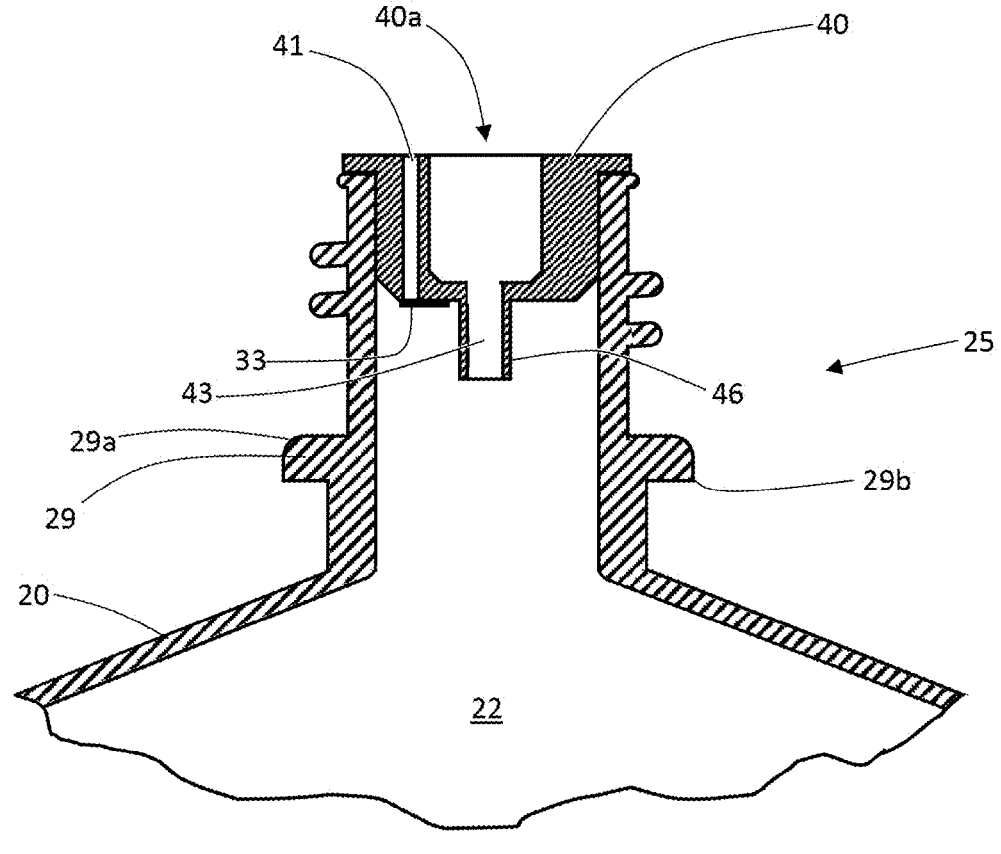
FIG. 14B is a schematic vertical section view of another example of a configuration of components including a bottle and fluid passage fitting, shown assembled together.

Referring to FIG. 14B, in other examples, a fluid passage fitting 40 may be configured (in some examples, with formed circumferential scaling fins, rings or ridges (not specifically shown) or an O-ring thereabout (not specifically shown)) to sealingly press-fit inside bottle neck 25, in the manner of a bottle stopper, without the need for a sealing gasket over the rim. In such examples, a vacuum relief port 41 may be provided through fitting 40, as noted above, separate from liquid dispensing passage 43. A check valve may be disposed and operably associated with vacuum relief may be disposed and operably associated with vacuum relief port 41, such as a flap check valve 33, configured to allow fluid (e.g., air) to flow through port 41 into the bottle, but to prevent fluid from flowing out port 41. In such examples, the fluid passage fitting 40 may be held within the bottle neck by friction alone, or alternatively or supplementally, by an included rim attachment structure 45 (for example, as shown in FIG. 10A).

Additional Features of Dispensing Fixture and Assembly

Referring now to FIGS. 15-19, main body 101 of dispensing fixture 100 may be formed with a coupling cavity 112 to accommodate and retain in position a liquid outlet coupling 60. Liquid outlet coupling 60 and fluid passage fitting 40 may be formed and adapted to cooperatively fit together upon assembly of the complete dispensing fixture onto the bottle 20, as reflected in FIG. 19. Liquid outlet coupling 60 may be provided with an O-ring 63 or any other suitable gasketing/scaling mechanism to cause it to have effectively scaled fluid communication and connection with fluid passage fitting 40, when the two are assembled together. Liquid outlet coupling 60 may have outlet passage 64 therethrough, continuing from an inlet opening out through an outlet bibb 62. An outflow tube 65 may be fluidly connected to outlet bibb 62 and lead out of the main body 101 and thereby out of the dispensing fixture. As previously noted, outflow tube 65 may be, or may be fluidly connected with, a suitably convenient length of flexible tubing, leading and connecting to a spray wand. A draw tube 47 may be provided with the bottle and/or fluid passage fitting 40, and be fluidly connected to draw bibb 46 included on or as part of fluid passage fitting 40. Draw tube 47 is preferably of a length sufficient for a distal end thereof to reach to a location proximate the bottom of the interior volume 22 of the bottle 20, so as to be positioned to continue to draw liquid product from the bottle when liquid product has been depleted to a low level (i.e., so that substantially all of the liquid product supplied in the bottle may be drawn out by the system, for use). For purposes of providing vacuum relief to the bottle, for example, as described above, it may be desired that an airflow passage or cavity 102 be provided in the main body 101 between fluid passage fitting 40 and the outside environment, to allow fluid communication (i.e., air passageway) from the outside environment to the vacuum relief system.

Dispensing fixture 100 may be provided with a suspension system that allows liquid outlet coupling 60 to move slightly within and with respect to main body 101. This feature may be desired to accommodate imperfect fit between liquid outlet coupling 60 and fluid passage fitting 40, when the two are brought together, while still ensuring sealing via a sealing member such as O-ring 63. In some examples, the suspension system may include one or more coupling springs forming a part of or all of the suspension system, which holds liquid outlet coupling 60 within main body 101. In some examples, such coupling springs may have the form of bending springs 61a, configured to flex to allow coupling 60 to move upwardly and downwardly within main body 101. In some examples bending springs 61a may be integrally formed with coupling 60, extending in a cantilever configuration, radially outwardly from the main portion of coupling 60, to spring seats 109 formed in main body. (See FIG. 17.) In such configuration, there are preferably at least two such bending springs 61a radially oppositely disposed on coupling 60. In an alternative configurations, three or more bending springs 61a may be included, and may be disposed about coupling 60 at equal angles with respect to each other. Bending springs 61a are preferably discrete, and do not form a continuous body circumscribing the main portion of coupling 60. Providing a coupling 60 with a suspension system in the form of integrally formed bending spring members as described provides for cost-effective and efficient parts manufacturing, supply and assembly, in that no discrete, separate spring members need be included. The suspension system may also be configured to permit slight horizontal direction adjusting movement as well, to accommodate imperfect vertical alignment between coupling 60 and fluid passage fitting 40 and/or the main opening of bottle neck 25.

Figure 19A:
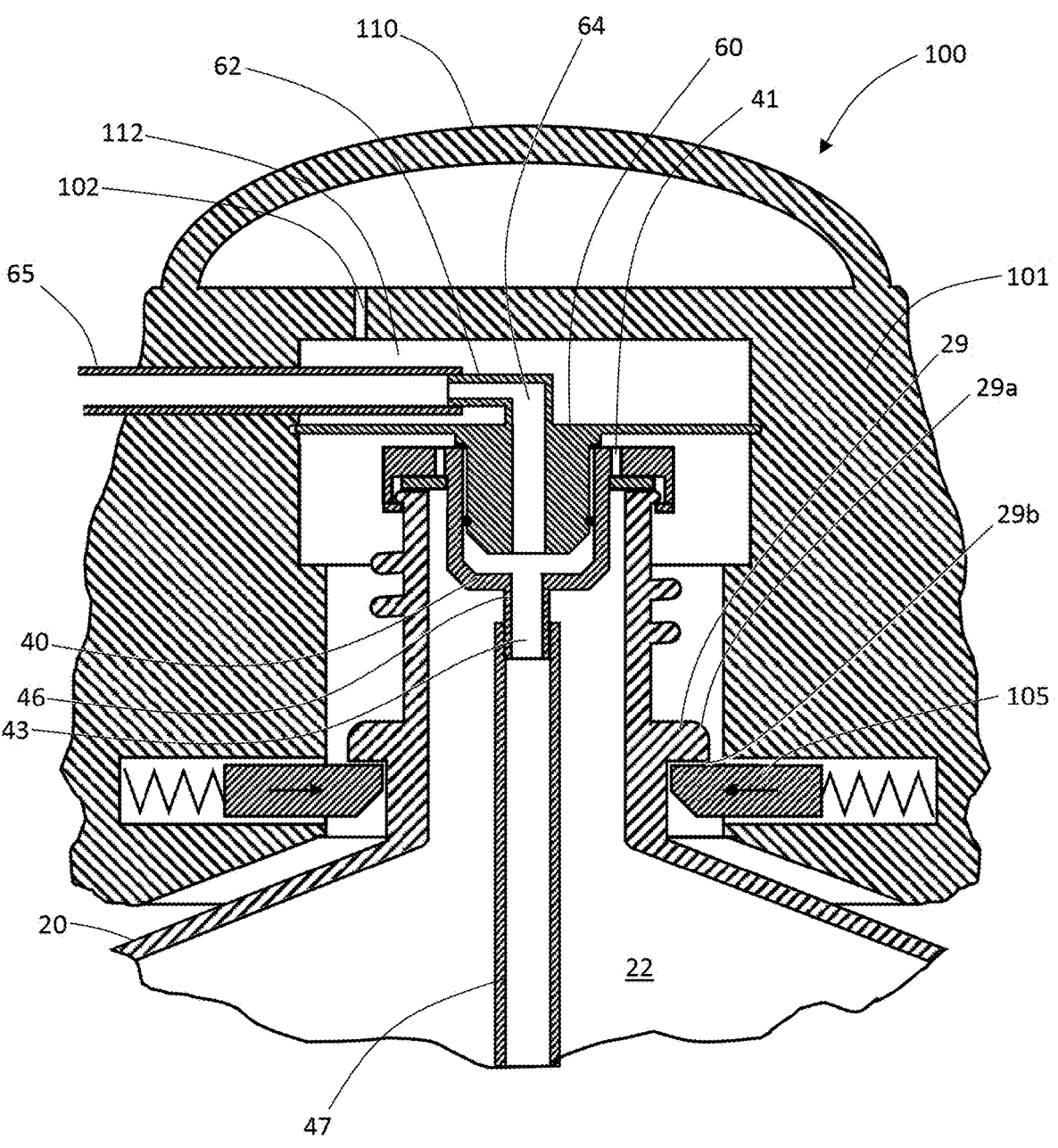
FIG. 19A is a schematic vertical section view of the components shown in FIG. 18, shown assembled together with the components shown in FIG. 15, with added draw tube and outflow tube.
Figure 19B:
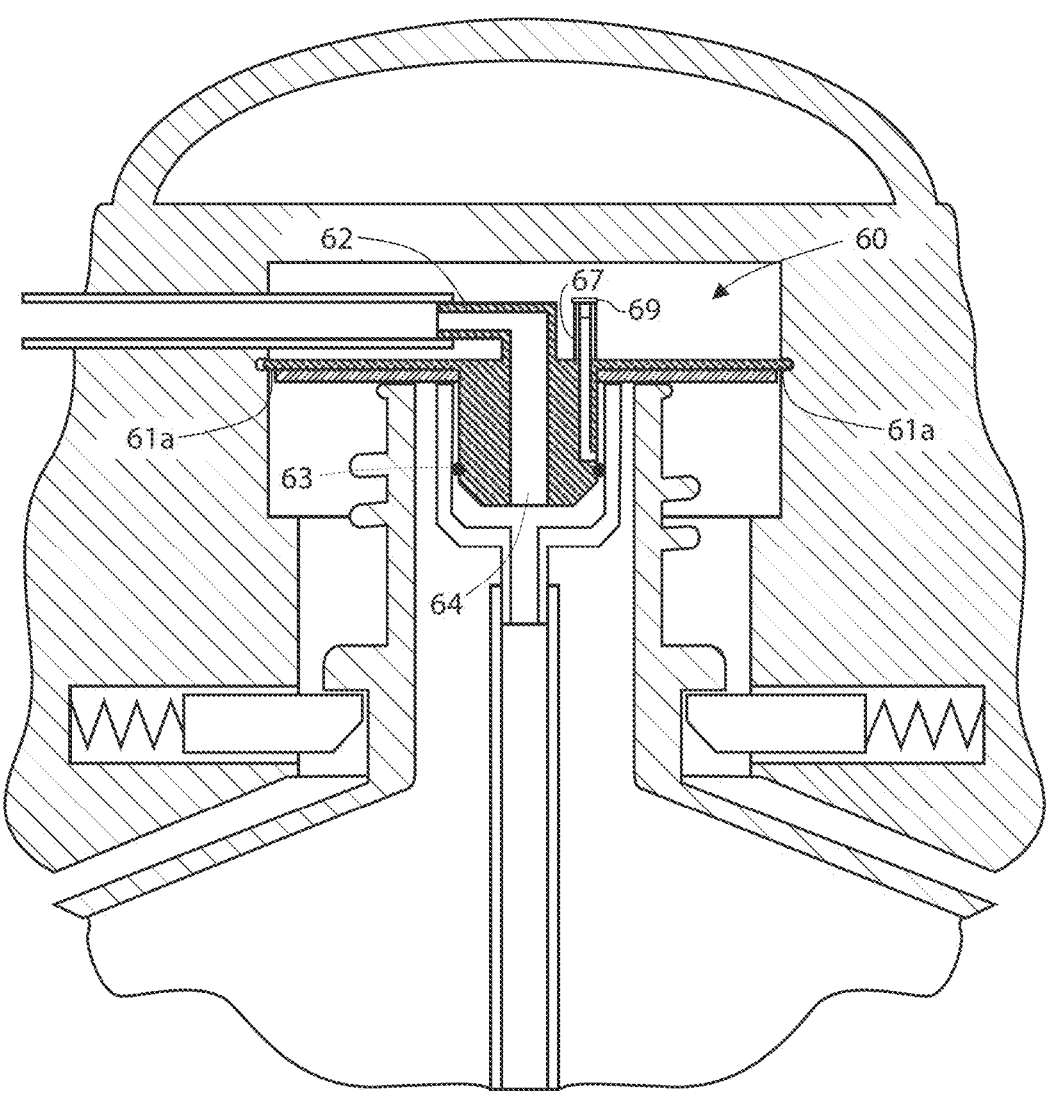
FIG. 19B is a schematic vertical section view of the components shown in FIG. 18, shown assembled together with the components shown in FIG. 15, with added draw tube and outflow tube.

It may be appreciated that, in some examples, operable features and functions of fluid passage fitting 40 and liquid outlet coupling 60 might be combined in a single-piece component or unitized combination of parts forming a single component, which includes a fluid passageway and a separate vacuum release port therethrough, wherein the single component might be scalingly press-fit into the bottle neck upon placement of dispensing fixture 100 over neck 25. Where the liquid product provided in the bottle to be dispensed, however, is a product with which consumer-users may wish to minimize chances of hand or skin contact (such as the liquid product compositions identified and contemplated herein), a two-piece coupling system including separate fluid passage fitting 40 and liquid outlet coupling 60 as described herein may be preferred. This is because a separate fluid passage fitting 40 provided with a bottle filled with product may be provided with an included and pre-connected draw tube 47 (for example, as shown in FIG. 19), and the user will not need to make any conduit/fluid connections, either on the upstream side of dispensing fixture 100, on the downstream/outlet side of the dispensing fixture 100, other than bringing dispensing fixture 100 over bottle 20 and neck 25 and pushing it downwardly to latch it onto the bottle neck, as described herein.

It will be appreciated that the components of a dispensing fixture and bottle having the features described herein enable quick, simple and easy placement and latching of the dispensing fixture onto the bottle, and simultaneously and in the same single motion, establishment of a leak-free fluid connection providing access to liquid product in the bottle by a pump and product delivery system (examples described below), with provision of a vacuum relief system that allows ambient air to enter the bottle upon removal of liquid product from the bottle by the pump and delivery system.

It will be appreciated that for case of manufacturing and assembly and effective fluid scaling, it may be preferable that cooperating features of components of the system including bottle neck 25, cap 50, bottle neck rim 26 and the main opening to bottle interior volume 22 defined thereby, fluid passage fitting 40, gasket 30a/30b, and portions of liquid outlet coupling 60 adapted to cooperatively fit with fluid passage fitting 40 and or the main opening to bottle interior volume 22 defined by the rim 26, have cross sections and/or inner and/or outer profiles that are substantially circular, when viewed along a direction orthogonal to the plane 26p along which rim 26 lies.

However, it may be further appreciated that for purposes of efficient utilization of space in packing and shipping multiple packages, and efficient utilization of shelving space, a main portion of bottle 22 may be imparted with a horizontal outer profile having a shape that accommodates close horizontal spacing of adjacent packages and efficient utilization of space, with respect to a ratio of volume of liquid product provided, to shipping or storage space utilized by multiple packages shipped or stored. Thus, it may be desired that bottle 22 be imparted with a horizontal outer profile shape that is non-circular, and has two or more sides that are substantially straight to provide for efficient horizontal space utilization, e.g., square, rounded square, rectangle, rounded rectangle, stadium-shape, triangle, rounded triangle, hexagon, rounded hexagon, etc., when a plurality of bottles/packages are shipped or stored in close proximity with each other.

Trigger Spray Dispenser Configuration

The dispensing system may be provided with a trigger spray dispenser 500 (see, e.g., FIGS. 34A-34G). The trigger spray dispenser 500 may be fluidly connected to the dispensing fixture 100 via a suitably convenient length of flexible outflow tube 65.

The trigger spray dispenser 500 may include or be operably fluidly connected with a pump configured to draw and drive liquid product from the interior volume 22 of bottle 20, through the dispensing fixture 100, out through outflow tube 65, through the trigger spray dispenser and out nozzle 504, for delivery to a desired application site.

In some examples, the pump may be a manually operated, manually driven pump, similar in operation to known spray/trigger pumps found on many household products.

In some examples, the pump may be an electromechanical device including an electric motor driving a liquid pump mechanism. In some examples, the liquid pump mechanism may be a gear or lobe pump, which may be preferred for applications contemplated herein, where simplicity, adaptability to small size/compactness, pulse-free fluid delivery and relatively robust pressure development relative to size are desired, for purposes of enabling thorough dispersion of liquid product through a spray nozzle for efficient uniform application of product to application sites, without a need for a large motor or large electrical energy input. In some examples, the electromechanical pump with a gear pump driven by an electric motor, may be powered by one or more batteries housed within the housing 502 of the trigger spray dispenser 500. For consumer convenience the pump may be configured to operate for a relatively lengthy period of time, e.g., sufficient to completely drain the liquid content from at least one filled bottle, more preferably at least two bottles, and still more preferably at least three bottles, on power supplied by commercially available, consumer-grade, replaceable batteries. In other examples the battery(ies) may be of the rechargeable type such as found in many types of consumer products, consumer electronic devices, small appliances, cordless tools, etc.

The trigger spray dispenser 500 may include a housing 502 and a handle 508, imparted with any shape deemed suitable for purposes of ergonomic gripping and actuating by the user, with one hand, while having suitable internal space and configuration to suitably house and hold in position operable internal components. The trigger spray dispenser 500 may include a trigger spray actuator 506, with operable components included therewith to effectuate activation of a pump, to pump liquid product through the wand.

Suitable trigger spray dispensers are disclosed in U.S. Pat. No. 6,367,665 and available from Silgan Dispensing under the Mixor® HP tradename.

Wand Configuration, Activation and Locking Features

The dispensing system may be provided with a spray wand 300 (see, e.g., FIG. 1). Spray wand 300 may be fluidly connected to the dispensing fixture 100 via a suitably convenient length of flexible outflow tube 65.

Spray wand 300 may include or be operably fluidly connected with a pump configured to draw and drive liquid product from the interior volume 22 of bottle 20, through the dispensing fixture 100, out through outflow tube 65, through wand 300, out through spray tube 305 (see FIGS. 2 and 26), and out nozzle 310, for delivery to a desired application site.

In some examples, the pump may be a manually operated, manually driven pump, similar in operation to known spray/trigger pumps found on many household products.

In some examples, the pump may be an electromechanical device including an electric motor driving a liquid pump mechanism. In some examples, the liquid pump mechanism may be a gear or lobe pump, which may be preferred for applications contemplated herein, where simplicity, adaptability to small size/compactness, pulse-free fluid delivery and relatively robust pressure development relative to size are desired, for purposes of enabling thorough dispersion of liquid product through a spray nozzle for efficient uniform application of product to application sites, without a need for a large motor or large electrical energy input. In some examples, the electromechanical pump with a gear pump driven by an electric motor, may be powered by one or more batteries housed within a housing 300a of wand 300. For consumer convenience the pump may be configured to operate for a relatively lengthy period of time, e.g., sufficient to completely drain the liquid content from at least one filled bottle, more preferably at least two bottles, and still more preferably at least three bottles, on power supplied by commercially available, consumer-grade, replaceable batteries. In other examples the battery(ies) may be of the rechargeable type such as found in many types of consumer products, consumer electronic devices, small appliances, cordless tools, etc.

Referring now to FIGS. 20-27, a spray wand 300 may include a housing 300a, imparted with any shape deemed suitable for purposes of ergonomic gripping and actuating by the user, with one hand, while having suitable internal space and configuration to suitably house and hold in position operable internal components. Wand 300 may include a spray trigger or switch 320, with operable components included therewith to effectuate activation of a pump, to pump liquid product through the wand.

The wand 300 may include a receiving bibb 303a to be fluidly connected to an outflow tube 65 (see e.g., FIGS. 2, 24), and an exit bibb (303b) to be fluidly connected to a spray nozzle 310, in some examples, via a relatively rigid spray tube 305 (see e.g., FIGS. 2, 27).

In some examples, wand 300 may include a discrete lock switch 321, accessible to the user and operable via a mechanism within the housing to alternately allow or prevent actuation of spray trigger 320, or otherwise operable to alternately allow or prevent activation of the pump. In some examples lock switch 321 may be a sliding switch, slidable between a locking position 322b and an unlocking position 322a. In some examples (not specifically shown), locking and unlocking functions, respectively, may be mechanically linked, within housing 300a, to positioning of exit bibb 303b and/or exit fitting 303c in folded/stowed and extended/deployed positions, respectively (the respective positions are illustrated in FIGS. 26 and 27).

Figure 22A:
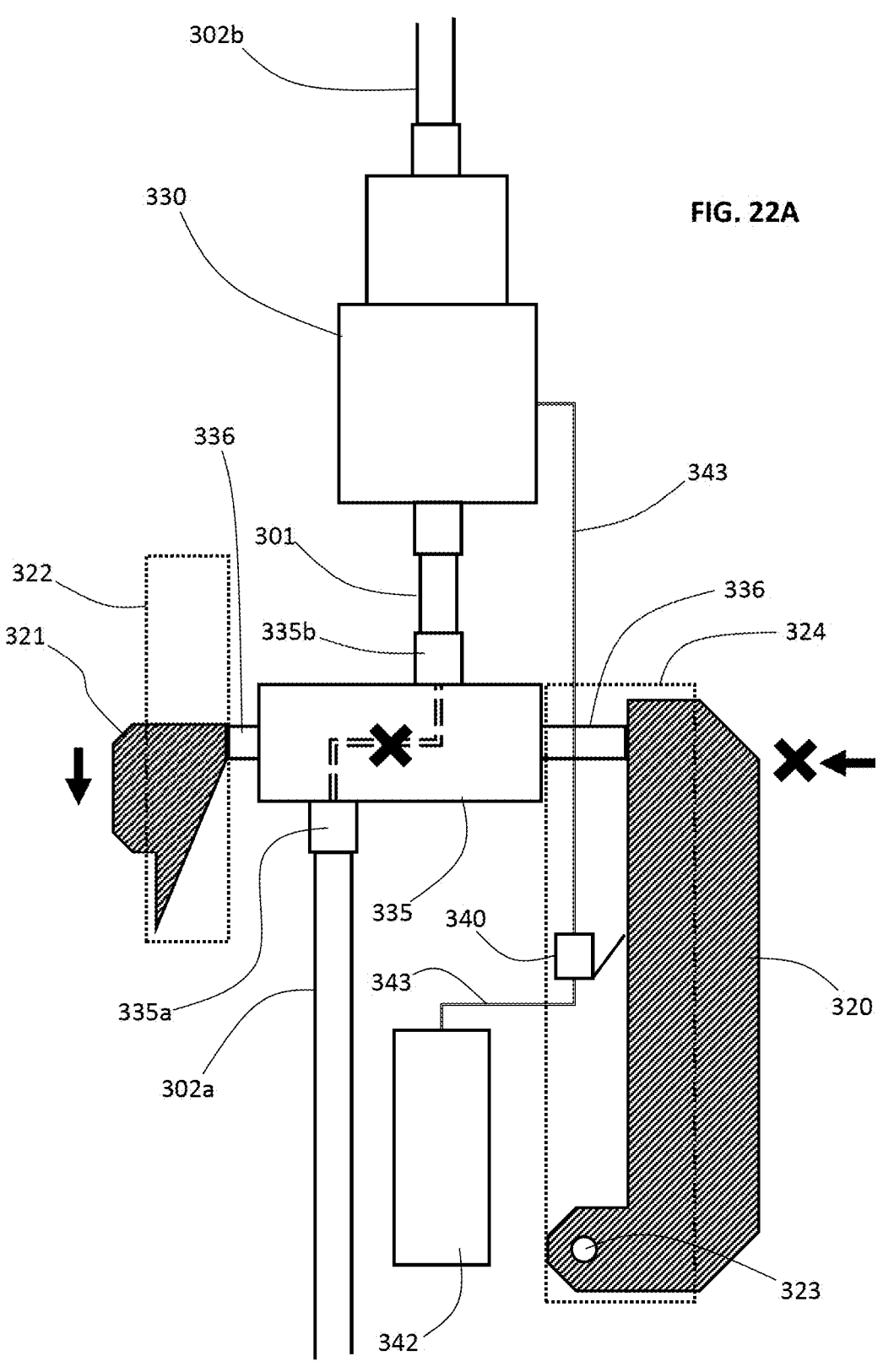
FIG. 22A is a schematic view of components of a non-limiting example of a spray wand, in a locked, un-activated configuration.
Figure 22B:
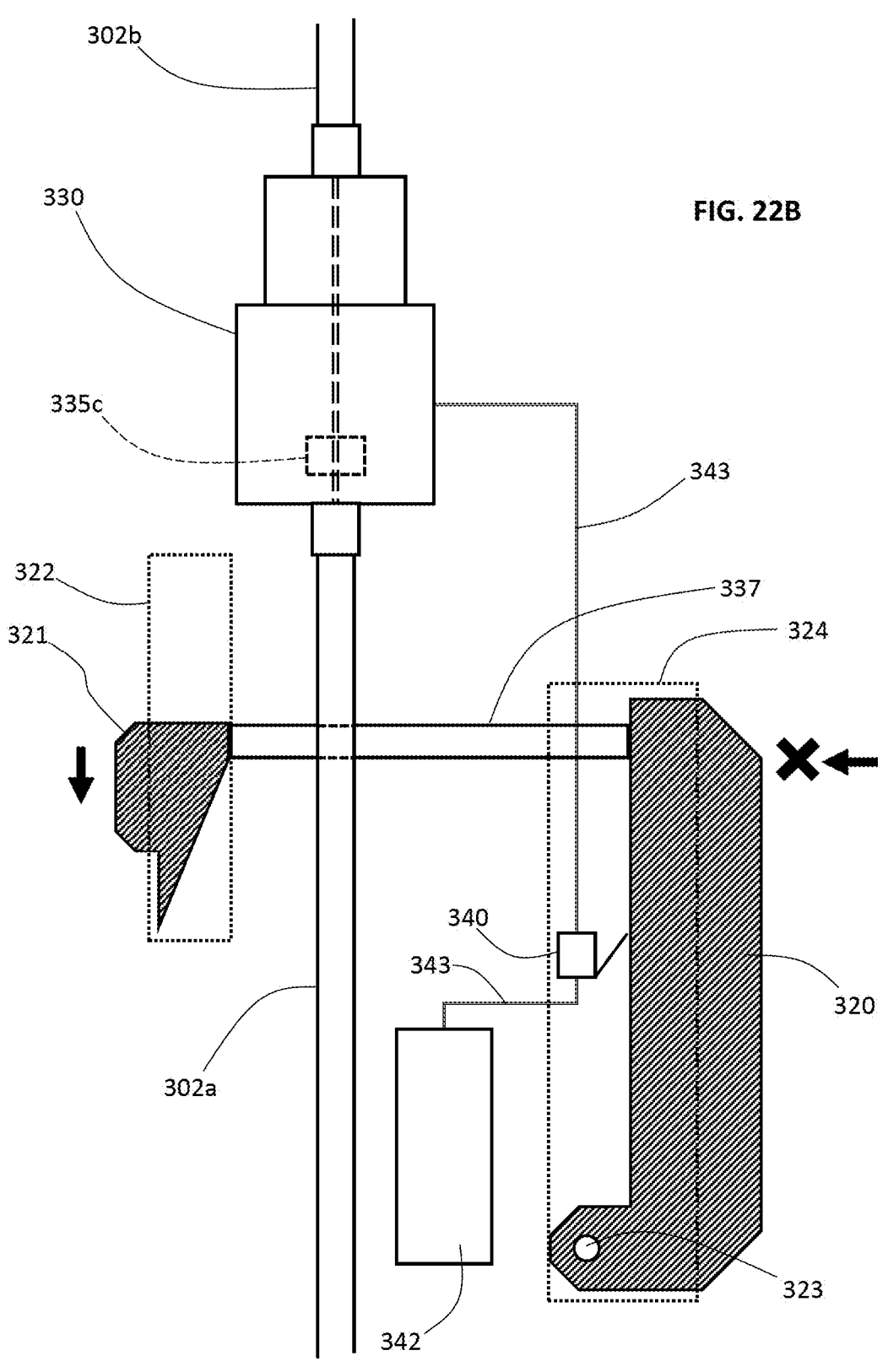
FIG. 22B is a schematic view of components of another non-limiting example of a spray wand, in a locked, un-activated configuration.
Figure 23:
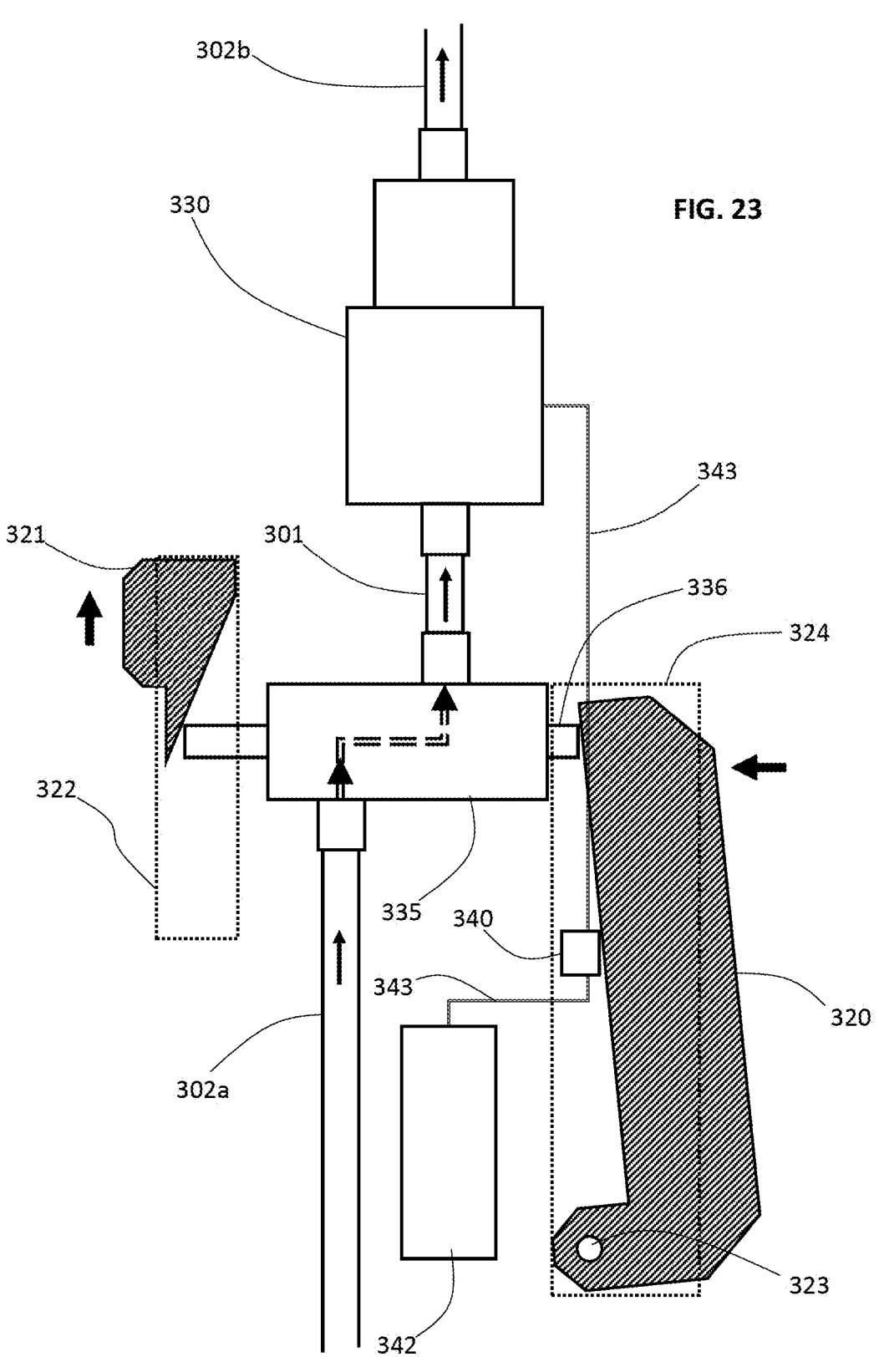
FIG. 23 is a schematic view of components of a non-limiting example of a spray wand, in an unlocked, activated configuration.

In some particular examples, the pump activation and locking functions may be provided by components schematically illustrated in FIGS. 22A and 23 (or alternatively FIG. 22B) which may be securely fitted and held in position within handle housing 300a.

FIG. 22A illustrates a non-limiting example of a configuration of components in a locked, pump-deactivated configuration. A valve 335, for example, a spool valve, having an axially sliding stem actuator 336 may be blocked in a closed configuration by direct or indirect mechanical communication with a lock switch 321, which may be configured to slide within the handle, disposed in a locking position within a lock switch track 322 formed in the housing. On the other end of the valve, valve stem actuator 336 blocks inward movement or depression of spray trigger 320, which may be configured to otherwise pivot inwardly into the wand housing about trigger pivot 323, within a trigger track 324 formed in the housing. Trigger 320 is mechanically linked to pump power switch 340 and prevented by the blocked valve stem actuator 336 from closing switch 340, and thereby prevented from causing electrical current to flow from a power source 342 to pump 330, through power supply line 343 (as previously suggested, power source 342 may be a battery or batteries). Thus, in the configuration schematically shown in FIG. 22A, valve 335 is closed, switch 340 is open, and pump 330 is deactivated, and liquid product will not pass through the wand, i.e. from inflow conduit 302a to outflow conduit 302b. In some examples, valve stem actuator 336 and/or spray trigger 320 and/or power switch 340 may be spring-biased in valve-closed, switch-open and/or un-activated positions as illustrated, by way of example, in FIG. 22A.

In some examples, such as schematically illustrated in FIG. 22B, a valving system may be simplified. Rather than having a user-operated valve such as illustrated in FIG. 22A, the system may include, for example, a simplified, automatic valve 335c. Automatic valve 335c may be configured fluidly in line with inflow conduit 302a, pump 330, and outflow conduit 302b. In some examples, automatic valve 335c may be a check valve configured to permit flow out and prevent backward/inflow, having a cracking pressure that is high enough to prevent the system from leaking liquid product via gravity or syphoning outflow during storage or otherwise when pump 330 is not activated, but low enough such that the valve may be forced open to allow outflow in response to pressure generated by pump 330 when activated. In some examples, automatic valve 335c may be a solenoid valve that is configured to open when pump 330 is connected to a power supply, e.g., via power switch 340. In such examples, a lock switch 321 preventing actuation of spray trigger 320 may be configured in direct or indirect operable mechanical communication with spray trigger via, e.g., linkage 337.

FIG. 23 illustrates the components shown in FIG. 22A in an unlocked, pump-activated configuration. Stem actuator 336 of valve 335 is permitted to slide to an open configuration when sliding lock switch 321 is disposed in an unlocking position within a lock switch track 322 formed in the housing. On the other end of the valve, because valve stem actuator 336 is not blocked by lock switch 321, it may be moved to a valve-open position via inward movement or depression of spray trigger 320. Trigger 320, being mechanically linked to pump power switch 340 and now free to be depressed, upon depression causes pump power switch 340 to be closed to allow current to flow from power source 342 to pump 330. Liquid product may now flow and pass through valve 335 from inflow conduit 302a to and out from outflow conduit 302b, being drawn and driven by operation of pump 330.

The configurations of components and combinations thereof described above enables a compact, easy-to-use, ergonomic, efficient and effective system, for preventing unwanted drawing or leakage and discharge of liquid product from wand 300, and alternately, triggering pumping and discharge of liquid product to, through and from wand 300. The components of the wand system may be cost effectively produced, procured and assembled.

Figure 24:
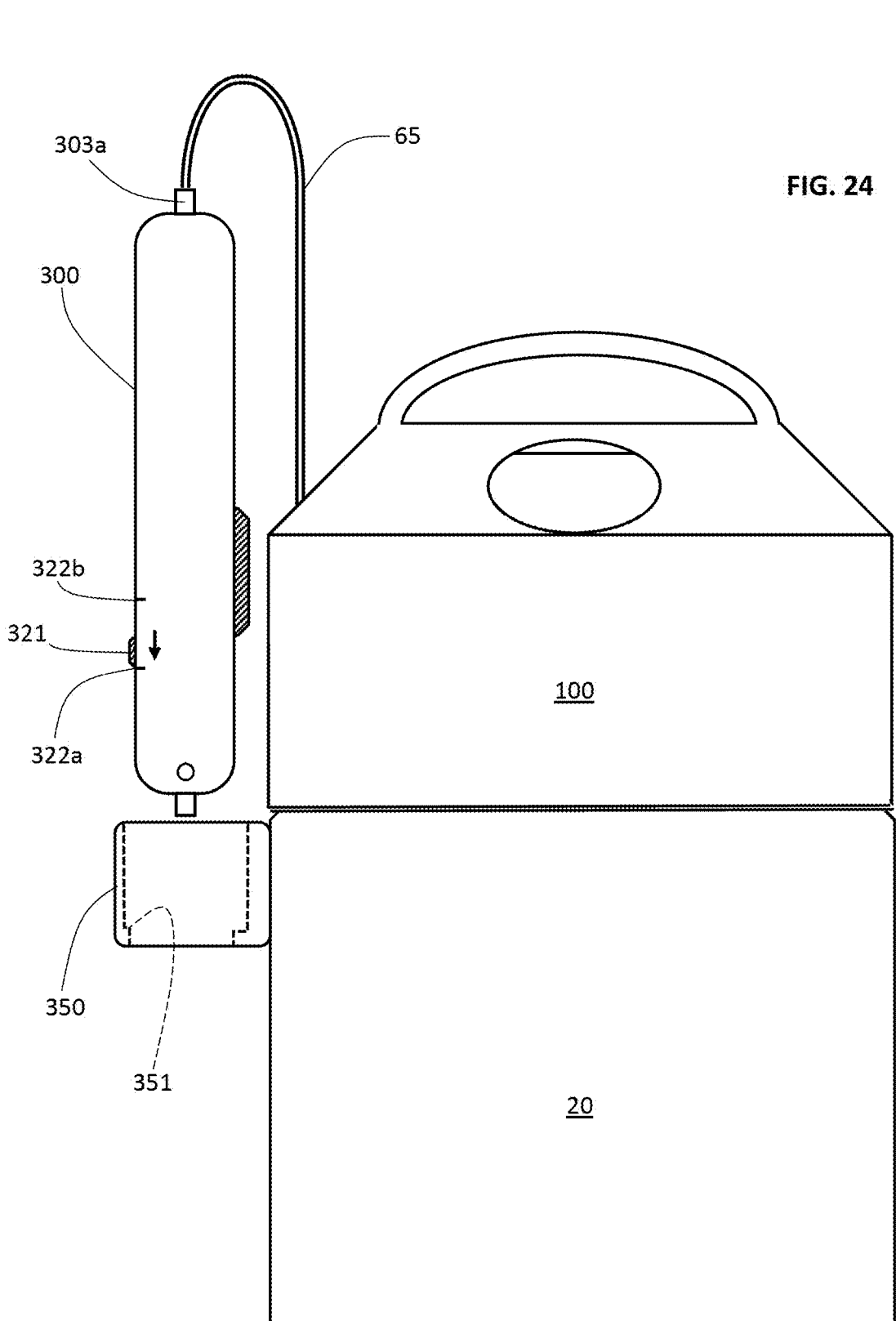
FIG. 24 is schematic elevation view of a non-limiting example of components of a liquid dispensing system with a spray wand portion thereof in an unlocked configuration.
Figure 25:
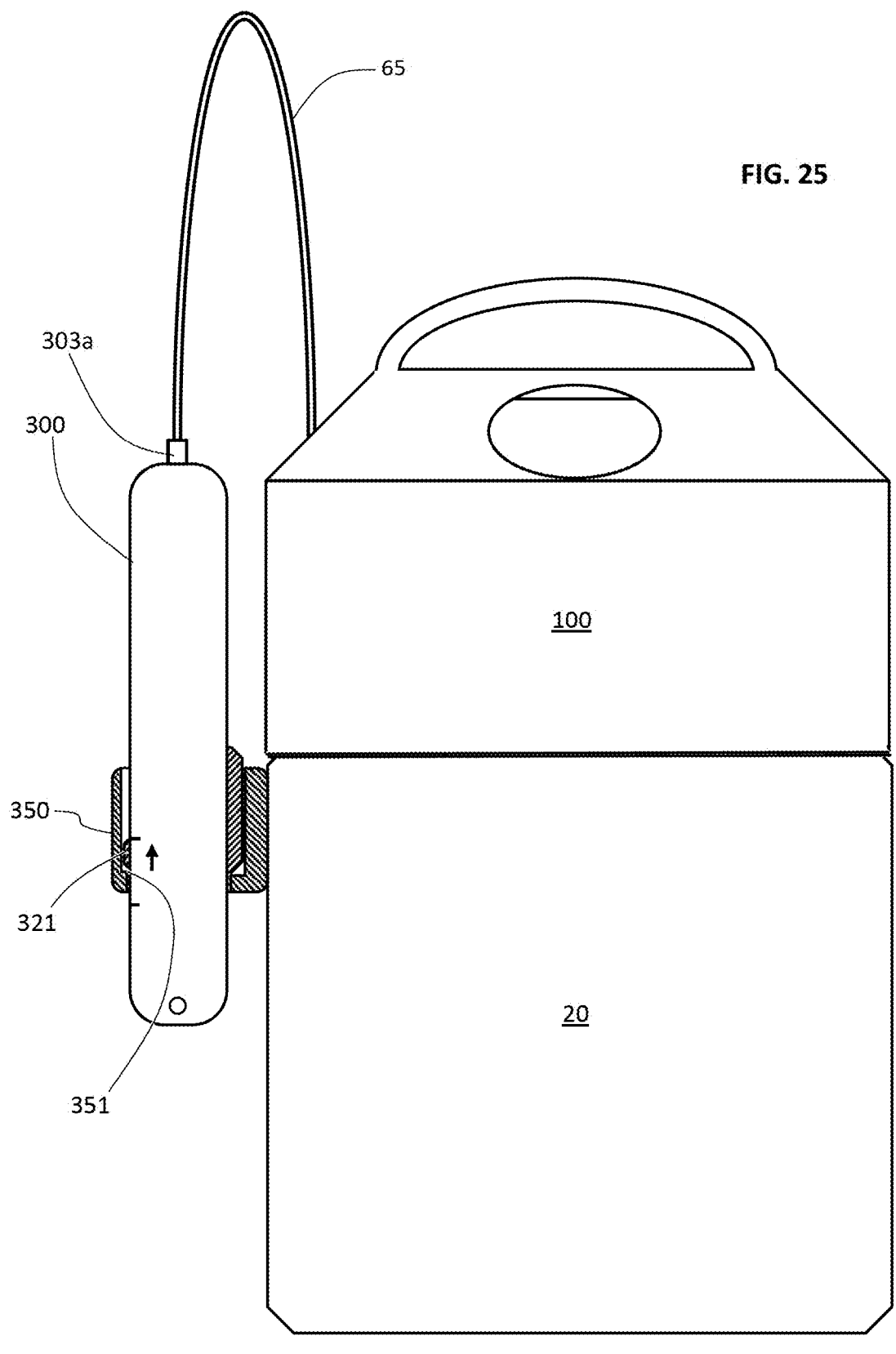
FIG. 25 is schematic elevation view of a non-limiting example of components of a liquid dispensing system with a spray wand portion thereof in a locked configuration.

Now referring to FIGS. 24 and 25, the bottle 20 or dispensing fixture 100 may be provided with a wand stowing fixture 350, which may be affixed to the bottle and/or the dispensing fixture by any suitable mechanism, or may be formed as part thereof. Wand stowing fixture 350 may be configured to hold wand 300 in its folded/stowed configuration (examples illustrated in FIGS. 2 and 26), at a suitable height such that no portion of the wand in its lowest-most stowed position lies below the bottom surface of bottle 20 (i.e., such that wand 300 in folded/stowed configuration will not interfere with or contact the surface upon which the bottle and package are to be stowed/stored.

Where a lock switch 321 is provided with wand 300, wand stowing fixture 350 may be provided with a lock switch engagement feature 351, configured to engage lock switch 321 upon stowing of wand 300 in or on stowing fixture 350, and move lock switch 321 to its locking position as the wand is placed in the stowed position in the stowing fixture.

As noted, in some examples, wand 300 may be configured such that it may be alternately placed in an extended/deployed configuration as suggested in FIG. 27, and alternately, in a folded/stowed configuration as suggested in FIG. 26. A folded/stowed configuration may be desired for purposes of more compact shipping/transport, retail display, and storage, and to protect the wand 300 and spray tube 305 from damage or separation from the system when not in use.

To enable such alternate configurations, wand 300 may be provided with a pivoting exit fitting 303c, which pivots about an axis 400 of one or a pair of pivot pins 304a that are seated at their outside ends within housing 300a. Referring to FIGS. 26, 27 and 28A-28C, exit fitting 303c may include, integrally, or by assembly, exit bibb 303b. Spray tube 305 may be fluidly connected to discharge end 303d of exit bibb 303b, and a flexible outflow conduit 302b (which may be disposed inside handle housing 300a) may be fluidly connected to receiving end 303r of exit bibb 303b. The exit fitting 303c may be configured such that a flexible outflow conduit 302b will flex and move across and back over pivot pin axis 400 as the wand is alternately placed in folded/stowed (e.g., FIG. 26) and extended/deployed (e.g. FIG. 27) configurations. Exit fitting 303c may include one or two conduit guides 304b that define a guide channel 304c in which outflow conduit 302b is constrained to flex substantially only along a plane that is orthogonal to pivot pin axis 400. This arrangement allows wand 300 to be constructed using relatively less internal conduit tubing, arranged in a relatively simpler configuration within wand housing 300a, than some current systems that provide for such folding/stowing configurations but require routing an outflow conduit around a pivot axis. Exit fitting 303c and housing 300a may be provided with a suitable latching or detent mechanism (not specifically shown) that releasably holds wand 300 in the respective alternate folded/stowed and extended/deployed configurations. In some examples exit fitting 303c may include conduit guide(s) 304b and exit bibb 303b in a single, integrally formed body; in other examples these components may be separately formed and joined together in any suitable manner to be made functionally unitary.

Nozzle Use Guide

In some examples, the system described herein is contemplated for use in applying liquid leaf surface active herbicide composition to application sites, e.g., leaves of weeds. Such compositions are typically formulated to be effective when applied to leaves; they do not work as designed when applied to lower stems or soil about weed roots, or to the roots themselves. It has been learned, however, that some consumer-users may attempt apply such liquid products by forcing the spray nozzle downwardly into the stems where they emerge from the soil, or into the soil itself, acting under a mistaken belief that such application is effective.

Figures 29, 30, 31, 32:
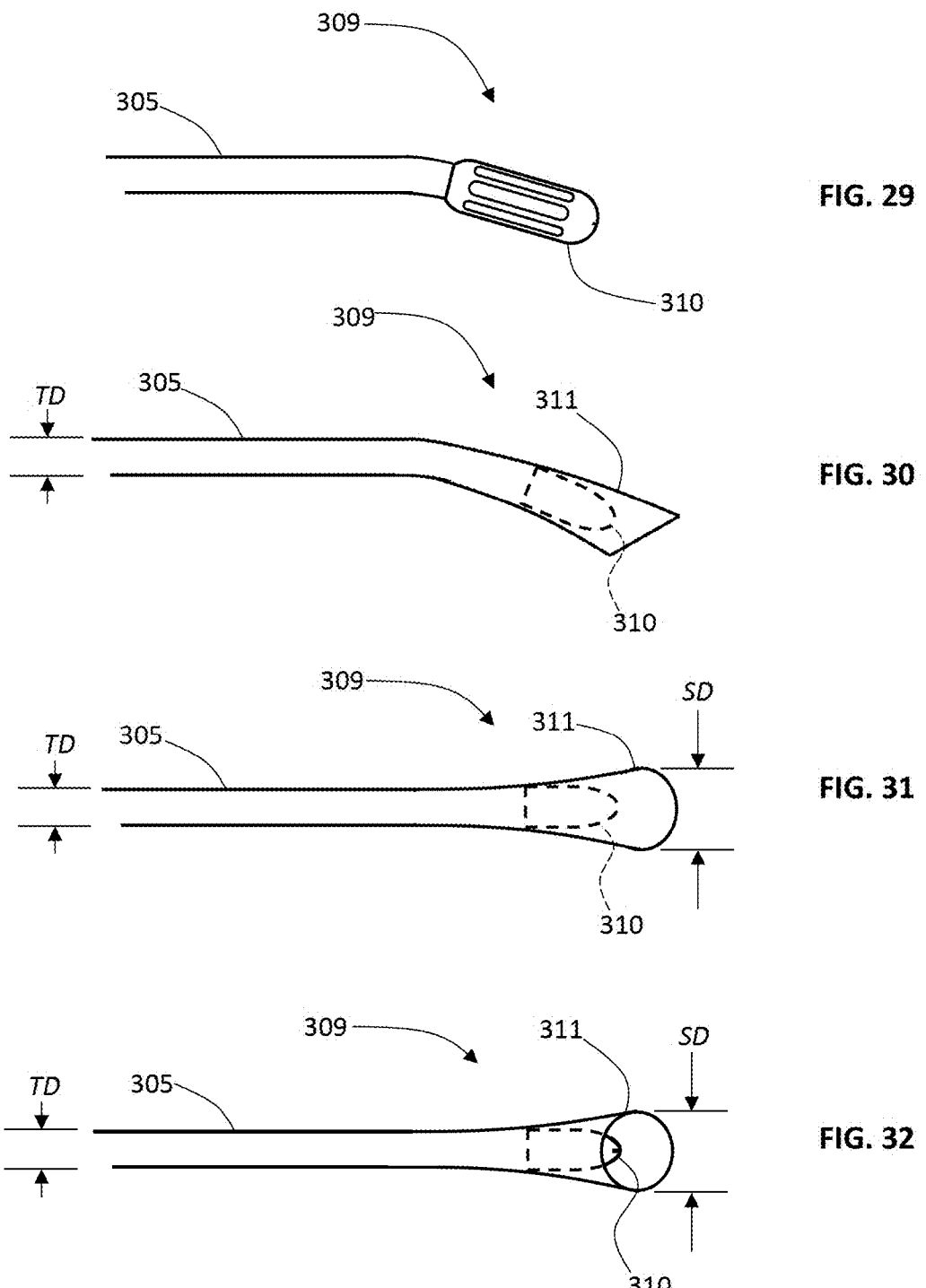
FIG. 29 is a view of a non-limiting example of a portion of spray tube, and spray nozzle, components of a spray wand.
FIGS. 30-32 are schematic side, top and bottom views of a non-limiting example of a portion of spray tube, spray nozzle and nozzle end structure, components of a spray wand.
Figure 33A:
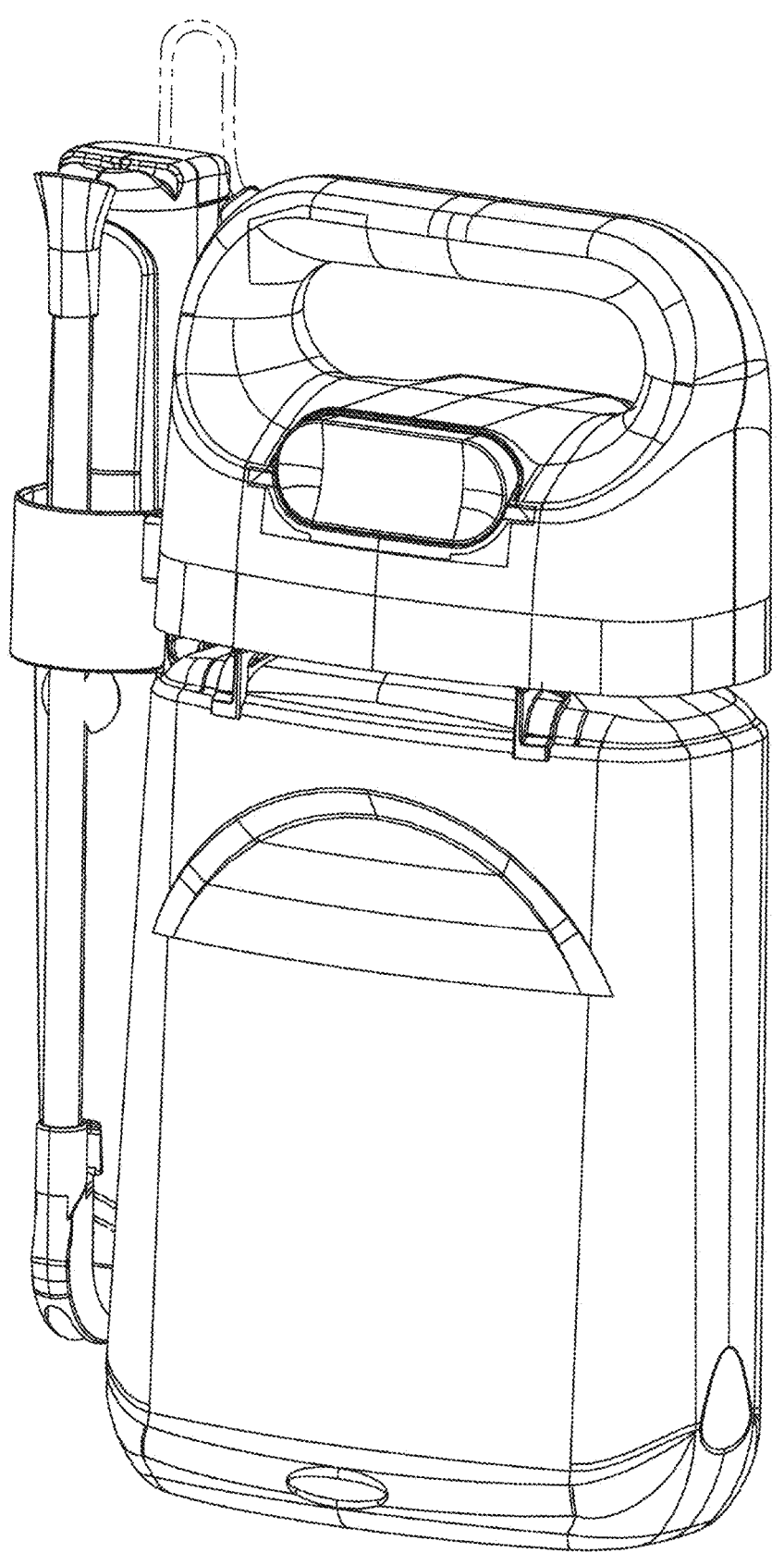
FIG. 33A is front perspective view of a non-limiting example of a liquid dispensing system.
Figure 33B:
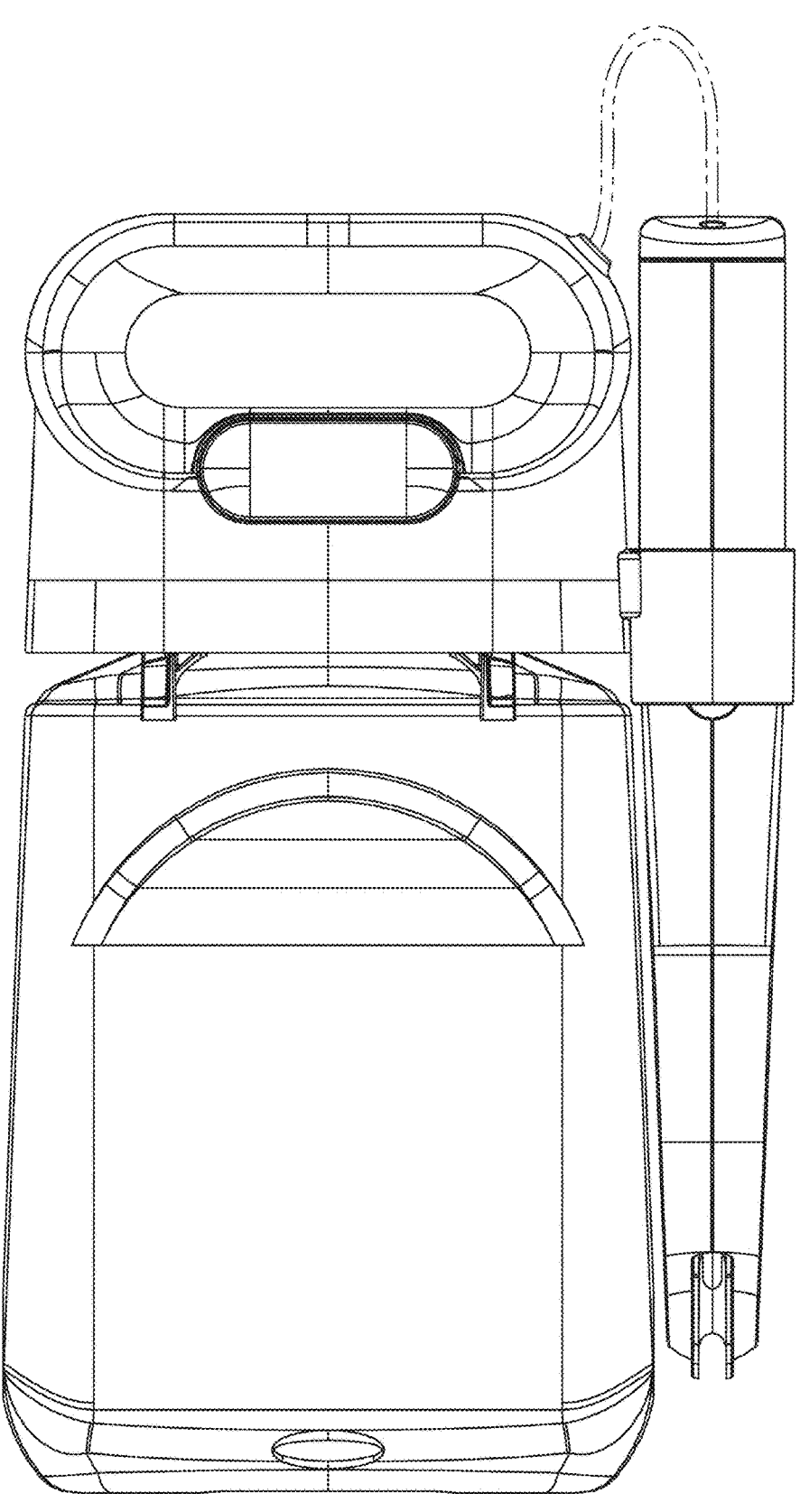
FIG. 33B is a front view of the liquid dispensing system shown in FIG. 33A.
Figure 33C:
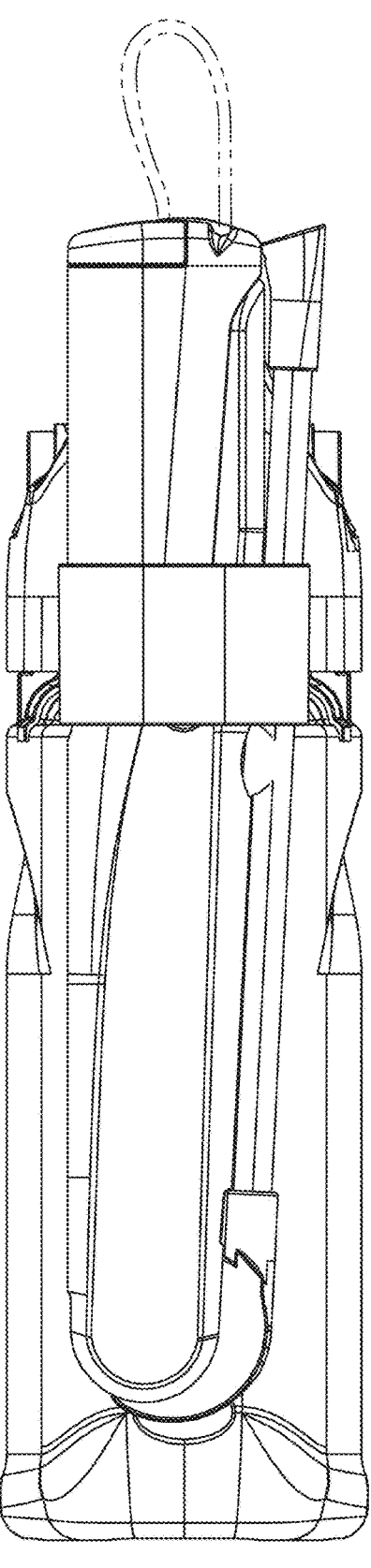
FIG. 33C is a side view of the liquid dispensing system of FIG. 33A.
Figure 33D:
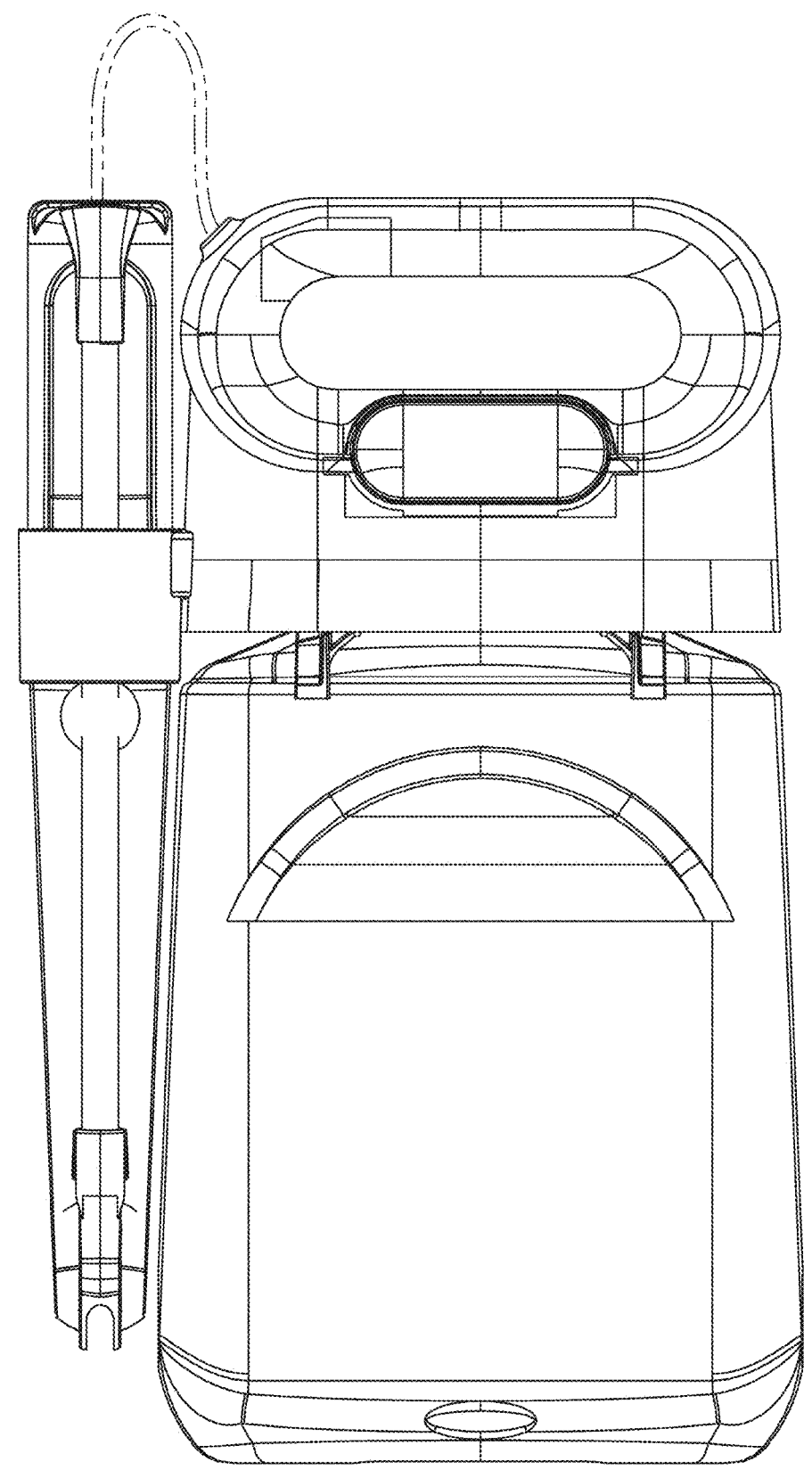
FIG. 33D is a rear view of the liquid dispensing system of FIG. 33A.
Figure 33E:
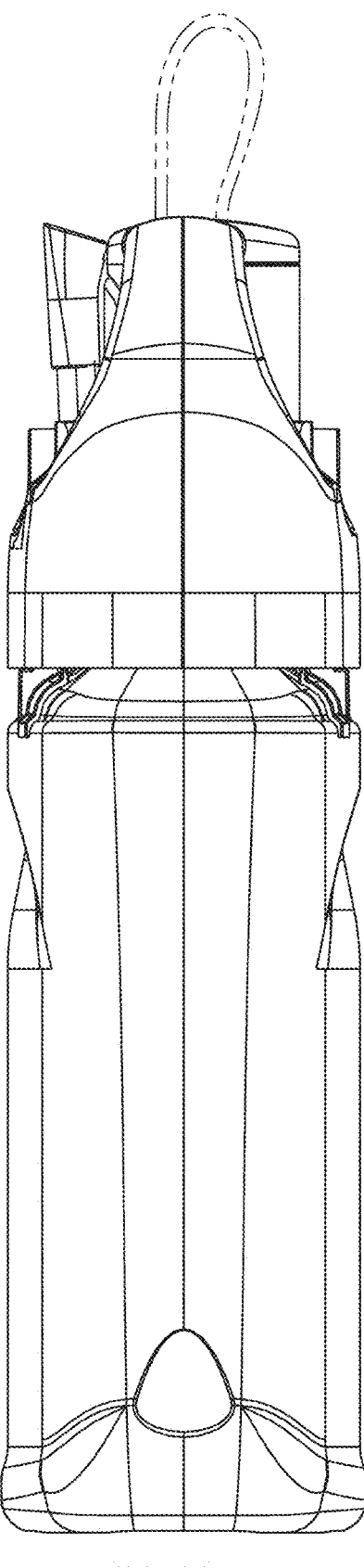
FIG. 33E is a side view of the liquid dispensing system of FIG. 33A, opposite the side view shown in FIG. 33C.
Figure 33F:
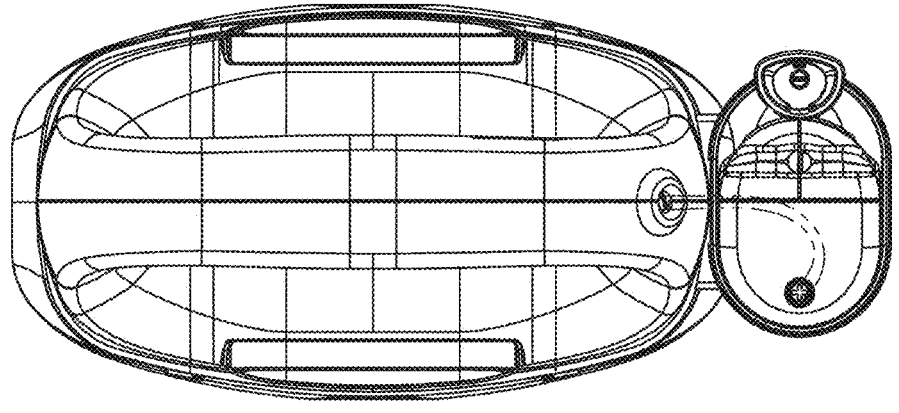
FIG. 33F is a top view of the liquid dispensing system of FIG. 33A.
Figure 33G:
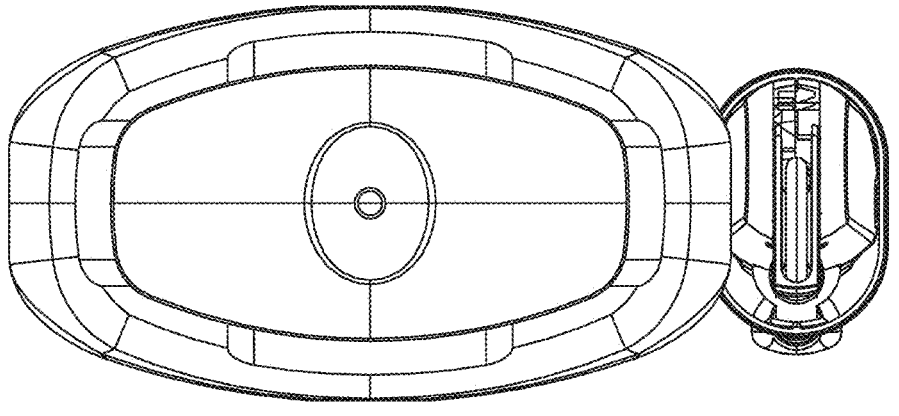
FIG. 33G is a bottom view of the liquid dispensing system of FIG. 33A.
Figure 33H:
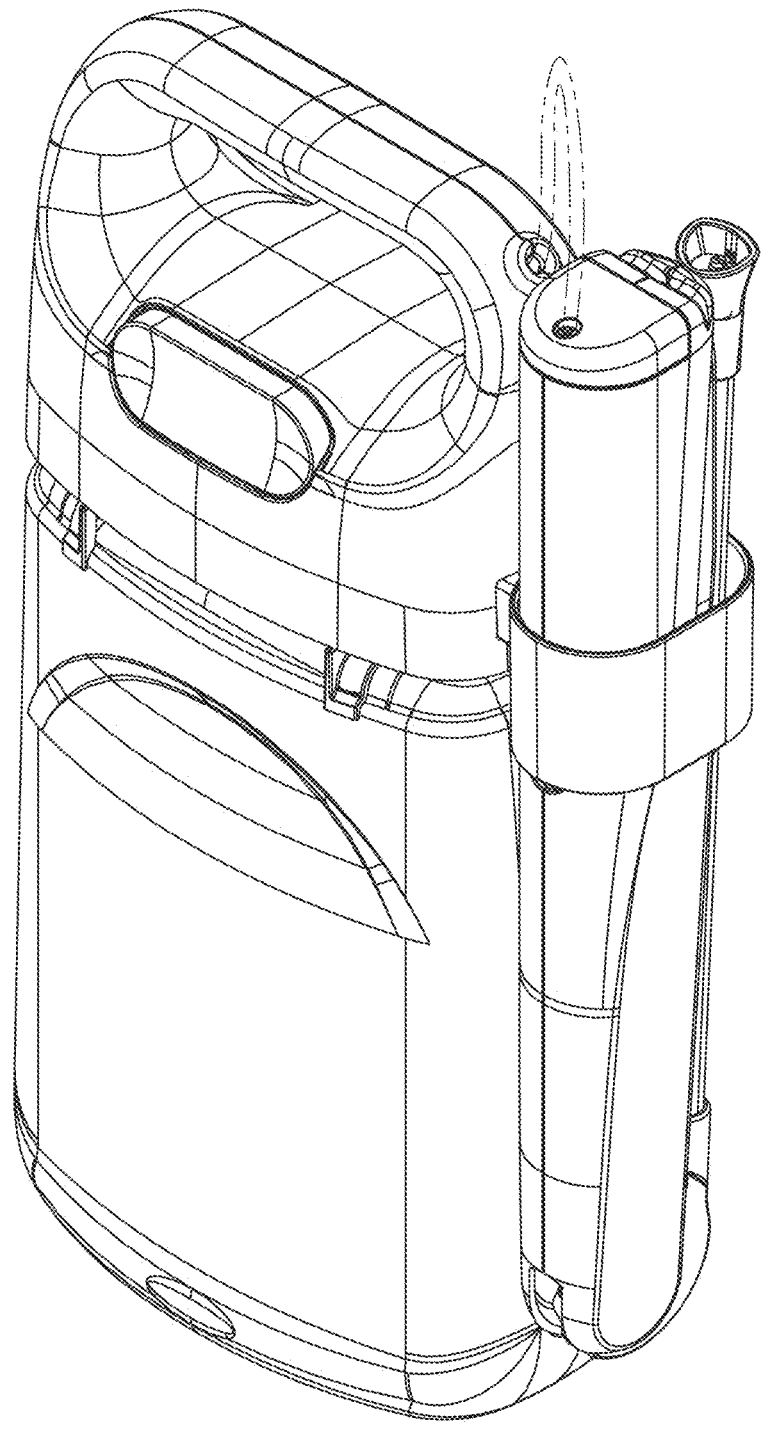
FIG. 33H is a rear perspective view of the liquid dispensing system of FIG. 33A.
Figure 34A:
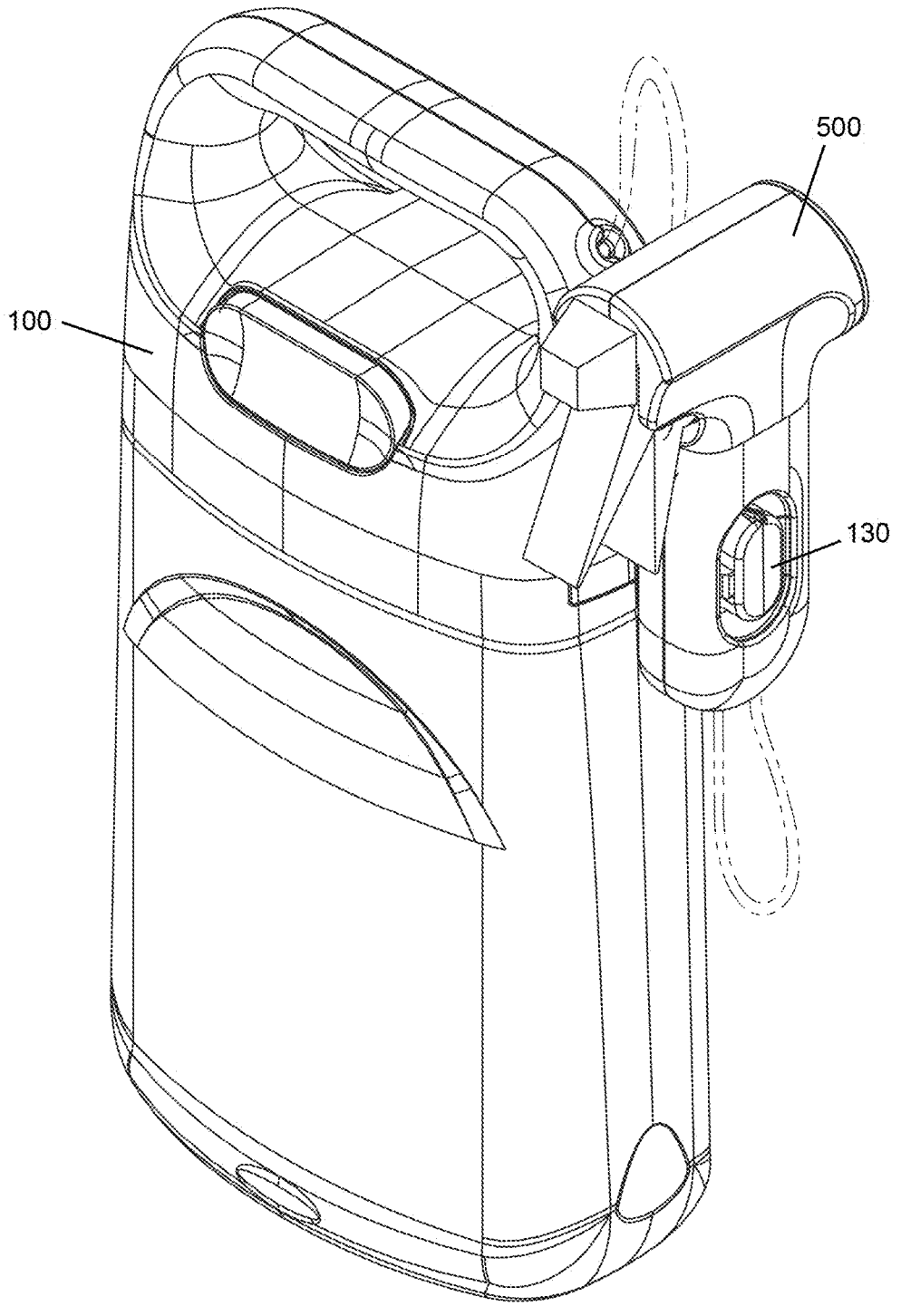
FIG. 34A is perspective view of a non-limiting example of a liquid dispensing system.
Figure 34B:
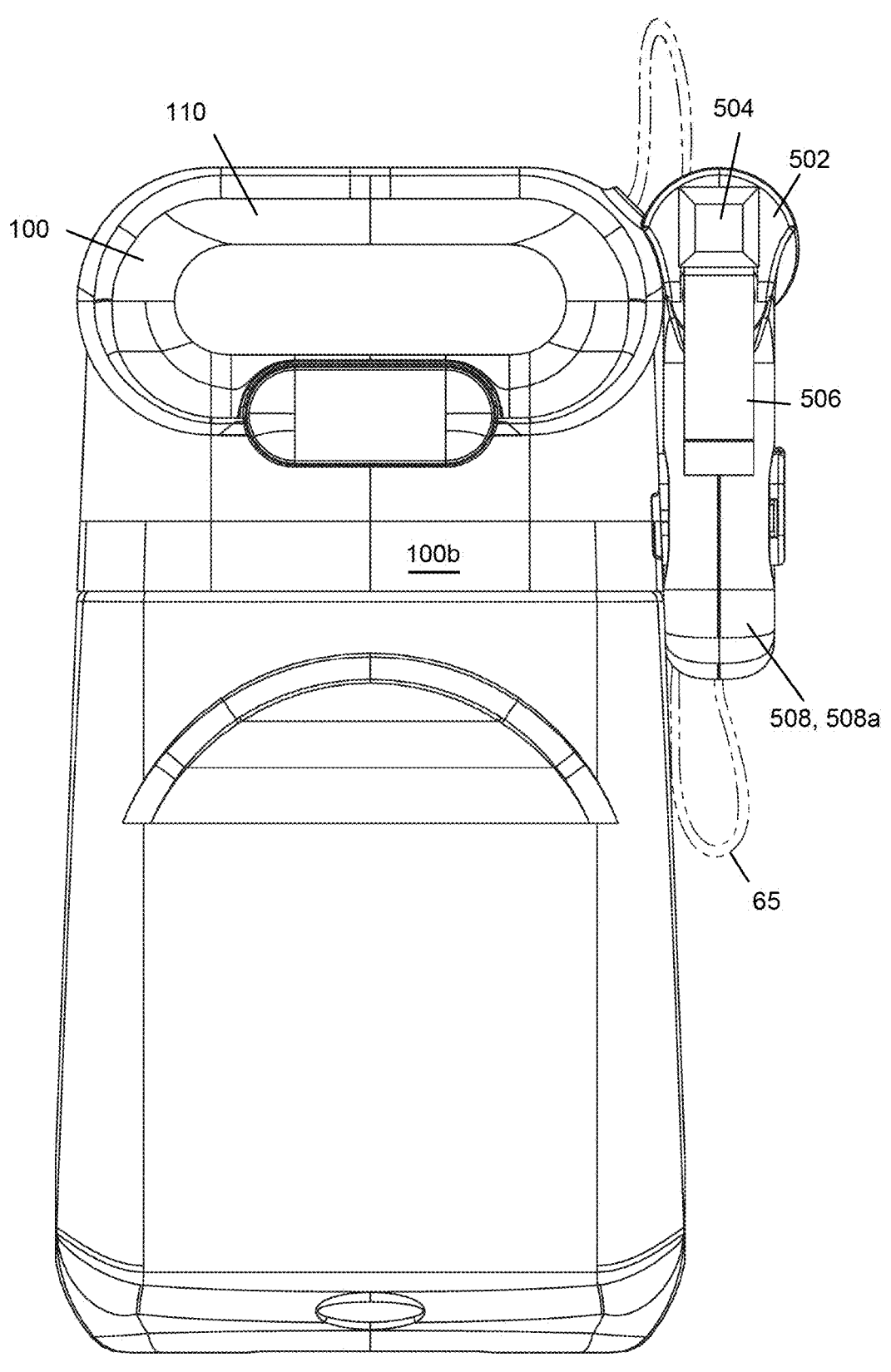
FIG. 34B is a front view of the liquid dispensing system shown in FIG. 34A.
Figure 34C:
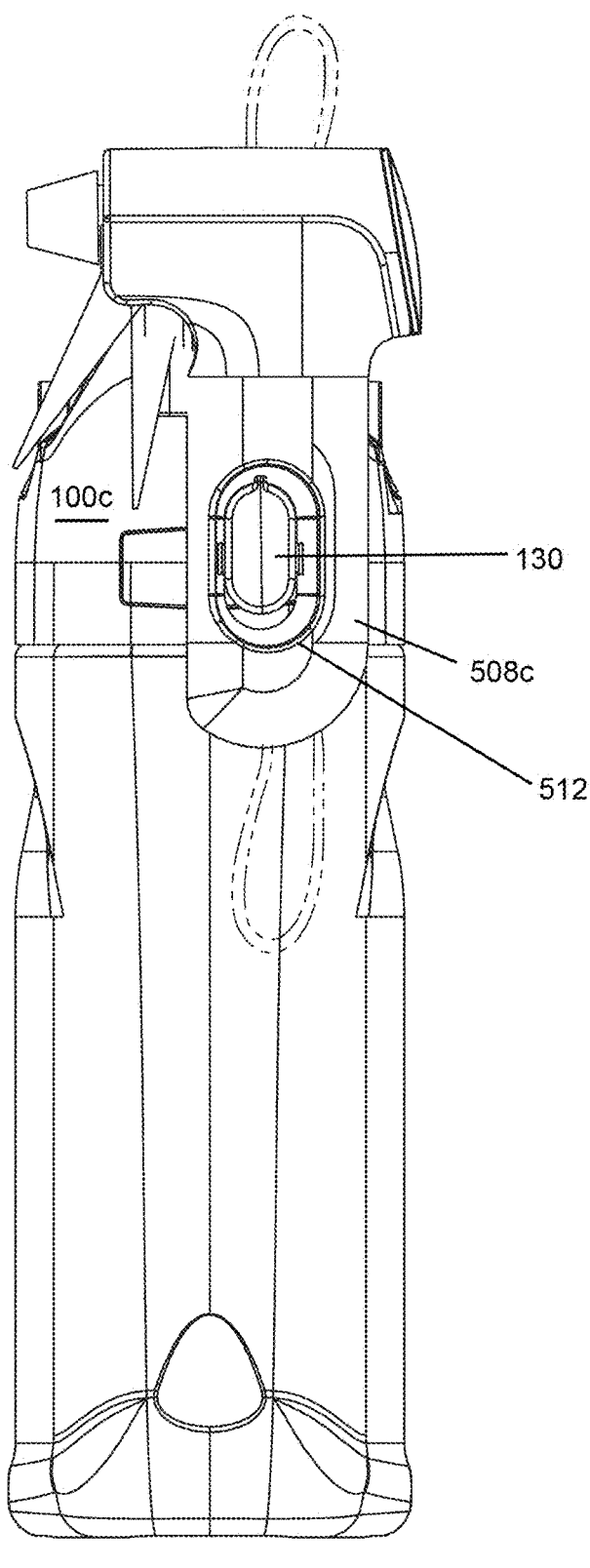
FIG. 34C is a side view of the liquid dispensing system of FIG. 34A.
Figure 34D:
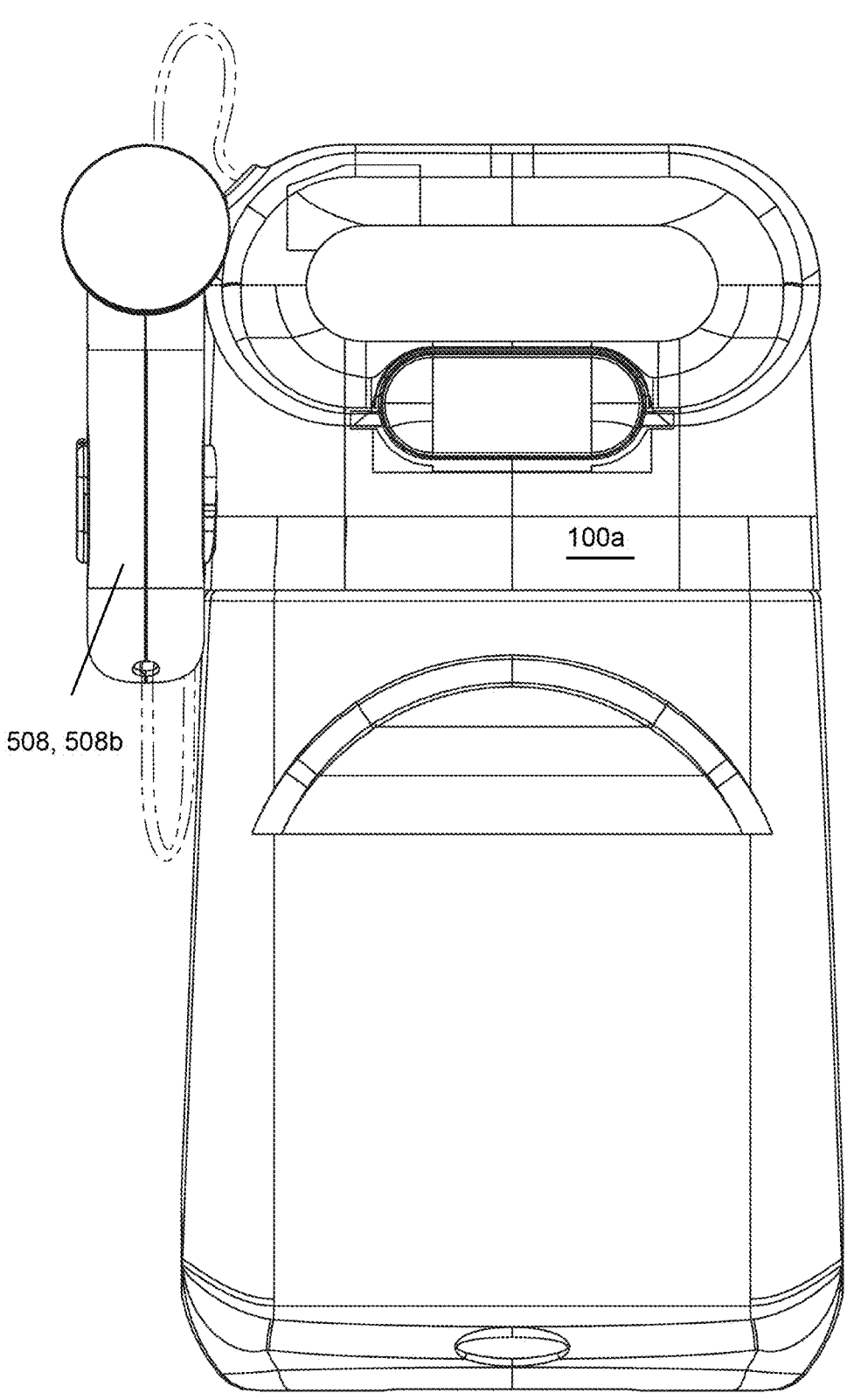
FIG. 34D is a rear view of the liquid dispensing system of FIG. 34A.
Figure 34E:
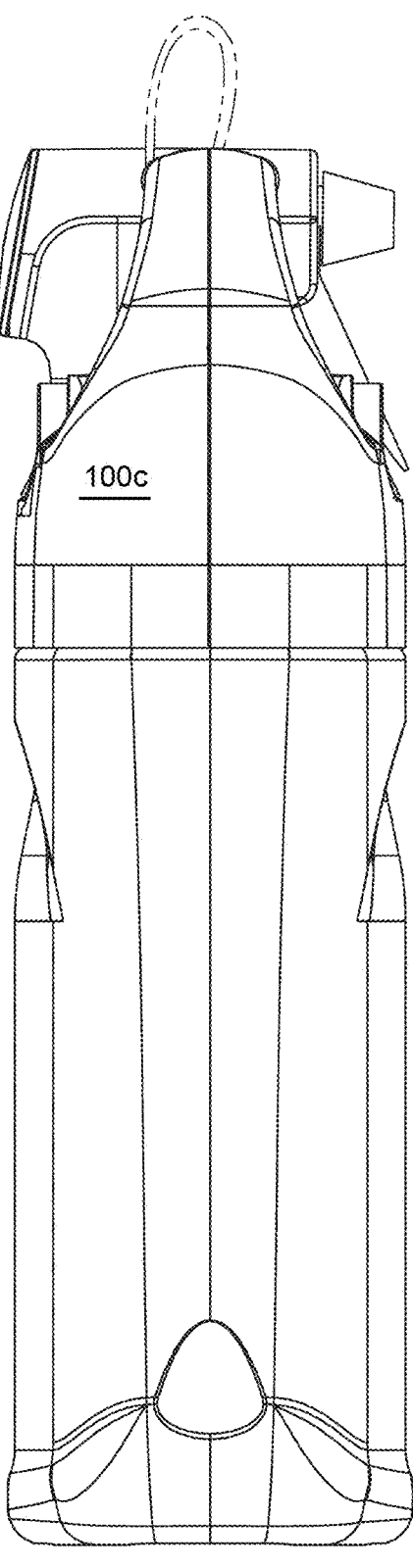
FIG. 34E is a side view of the liquid dispensing system of FIG. 34A, opposite the side view shown in FIG. 34C.
Figure 34F:
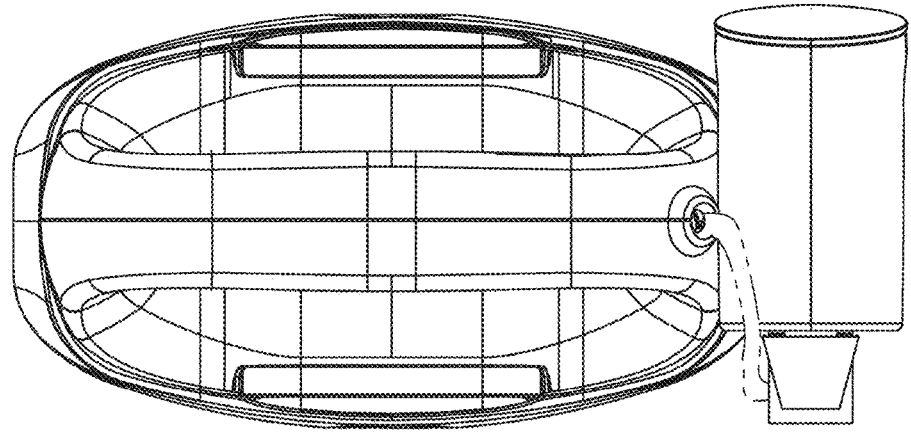
FIG. 34F is a top view of the liquid dispensing system of FIG. 34A.
Figure 34G:
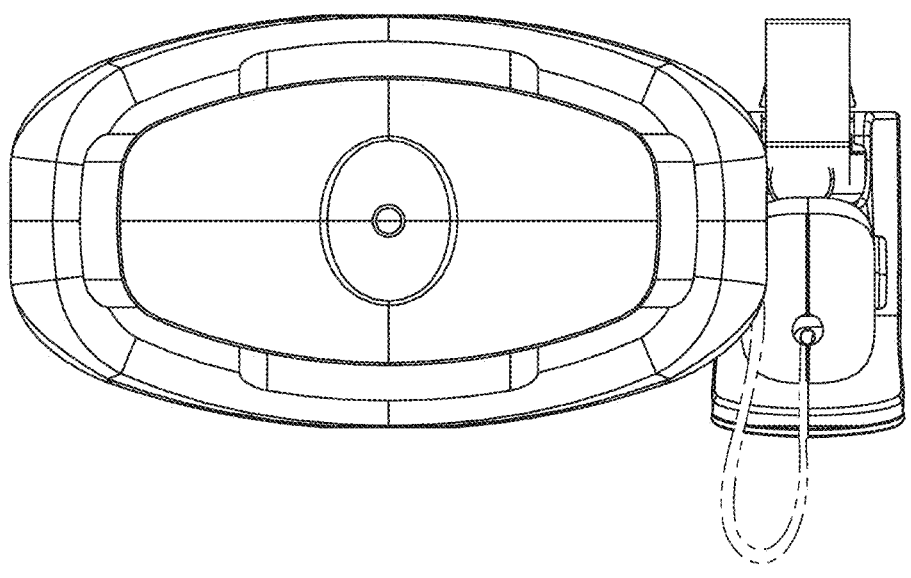
FIG. 34G is a bottom view of the liquid dispensing system of FIG. 34A.

Referring to FIG. 29, many current spray wands include a bullet-shaped, capsule-shaped or otherwise tapered-end nozzle 310 at the sprayer end 309, which users may perceive to be effective for "injecting" liquid product into or about weed stems or roots, or into the soil about the roots. Some nozzle designs may further encourage this behavior by having designs that emit a consolidated stream rather, or as an alternative option to, a dispersed spray.

To disincentivize and discourage this practice, and to convey an implied message that leaf surface application is required for designed efficacy of a liquid leaf surface active herbicide composition product provided with the system, the sprayer end 309 may be reconfigured.

A physical nozzle use guide may be included with the wand. Referring to FIGS. 30-32, a spray wand may terminate in a distal spray nozzle 310, which is configured to emit a dispersed spray of liquid product delivered under pressure through spray tube 305. For a liquid leaf surface active herbicide composition, it may be desired that the spray nozzle 310 not be configured to emit a consolidated stream. Spray tube 305 will have a largest dimension or outer diameter TD. It has been learned that if nozzle 310 is accompanied and surrounded by a nozzle end structure 311 having a largest radial dimension SD, proximate the distal end of the wand, that is at least 150 percent the spray tube outer diameter TD, more preferably at least 200 percent the spray tube outer diameter TD, and even more preferably at least 300 percent the spray tube outer diameter TD, the nozzle end structure 311 will be effective for discouraging attempts to force the nozzle into the soil or to attempt to "inject" liquid product. Further, the shape of the nozzle may be fashioned to implicitly suggest that a dispersed spray pattern suited to efficient application of liquid product over exposed broad (i.e., leaf) surfaces is intended by the manufacturer. To further these purposes, the nozzle end structure may be flared outwardly toward its distal end, as suggested in the figures. The nozzle end structure may have the form of a shroud, or a cage or guard structure, or any suitable structure configured to allow a dispersed spray to pass from the nozzle without obstruction from the distal end, but frustrate attempts to force the end structure into ground/soil.

Liquid Composition

The liquid dispensing system as contemplated herein may dispense a liquid composition that is intended to be sprayed onto a target surface and/or in a target area. Non-limiting examples of liquid compositions include home care compositions, such as hard floor cleaners and conditioners, carpet cleaners and conditioners, carpet deodorizers, carpet spot cleaners, window cleaners, fabric refreshing sprays (e.g., for clothing or furniture), hard surface cleaners (e.g., for dishware, sinks, countertops), and air fresheners; car care compositions, such as upholstery cleaners and conditioners, hard surface cleaners, leather cleaners, carpet cleaners, tire cleaners, and automotive glass cleaners; pest control compositions, such as herbicides, insecticides, insect barrier products, and garden insecticides. The liquid composition may be suitable for consumer, commercial, and/or institutional use. The liquid composition may be housed within the bottle 20. The bottle may store from about 800 g to about 2000 g, or from about 1000 g to about 2000 g, or from about 1400 g to about 1900 g, of the liquid composition.

The liquid composition may have a Brookfield viscosity from about 1 cps to about 300 cps, or from about 1 cps to about 200 cps, or from about 2 cps to about 100 cps, or from about 3 cps to about 50 cps, as measured according to the method described herein. The Brookfield viscosity may enable the liquid dispensing system to dispense the composition as droplets. For some products, such as pesticide products, droplets may be preferred, particularly versus a mist, a stream, or a foam. The liquid composition may have a surface tension from about 15 mN/m to about 50 mN/m, or from about 18 mN/m to about 40 mN/m, or from about 20 mN/m to about 30 mN/m, or from about 22 mN/m to about 28 mN/m, as measured according to the method described herein. It is believed that droplets may be preferred for delivering a targeted spray, while also sufficiently covering a target area.

The liquid composition may comprise particles having an intensity mean particle size of from about 2 nm to about 500 nm, alternatively from about 4 nm to about 400 nm, alternatively from about 5 nm to about 100 nm. The liquid composition may comprise particles having an intensity mean particle size of less than about 1 micron, preferably less than about 500 nm. Mean intensity particle size can be measured according to the Particle Size Test Method described hereafter.

The liquid composition may comprise particles having a volume mean particle size ranging from about 1 nm to about 100 nm, or from about 2 nm to about 50 nm, or from about 2 nm to about 25 nm, or from about 2 nm to about 10 nm. The liquid composition may comprise particles having a volume mean particle size of less than about 1 micron, preferably less than about 500 nm. Mean volume particle size can be measured according to the Particle Size Test Method described hereafter. Volume mean particle size may be selected to provide a transparent or translucent liquid composition, as well as to efficiently deliver an active agent to the target surface or area.

As detailed below, in the Spray Droplet Size Test Method spray droplet volume size distribution measurements comprising Spray D(50) Normalized, Spray D(90) Normalized, and Spray D(2,3) Normalized values are determined using a Malvern Spraytec 2000 laser diffraction spray droplet sizing instrument (supplied by Malvern Instruments, Worcestershire, UK). The liquid composition, when dispensed through the liquid dispensing system, may have a Spray D(90) ranging from about 100 microns to 900 microns, or from about 125 microns to about 800 microns, or from about 150 microns to about 700 microns. Spray D(90) may be selected to efficiently deliver an active agent to the target surface or area. Also, a Spray D(90) in the disclosed ranges may be perceived as capable of traveling a distance of one or more meters and depositing on a target surface or in a target area. Particles having a Spray D(90) less than 100 microns may create a spray that is too misty or a spray that does not have sufficient velocity to travel to a target surface or area.

The liquid composition may have a NTU value less than about 200, or less than about 100 or from about 0.5 to about 50, or from about 1 to about 25, as measured according to the Turbidity method described herein. A liquid composition having a NTU value in the disclosed ranges may be perceived by a consumer as being clear, transparent, or translucent, which may connote purity, quality, and/or that the composition is not likely to stain surfaces.

The liquid composition may have a b* value form about 0 to about 5, or from about 0.01 to about 4, or from about 0.05 to about 3.5, or from about 0.1 to about 3, as measured according to the method described herein. A liquid composition with a b* value according to the disclosed ranges may be perceived by a consumer as having a colorless appearance, while b* values outside the disclosed ranges, especially b* values greater than 5, may appear yellow to a consumer, which may connote that the composition contains impurities, has degraded, and/or is unsuitable for use.

The liquid dispensing system may have a spray rate ranging from about 0.5 g/s to about 5 g/s, or from about 0.75 g/s to about 4 g/s, or from about 1.25 g/s to about 3.5 g/s, or from about 1.5 g/s to about 3 g/s. The spray rate may be selected to enable targeted dispensing and delivery of the liquid composition from the liquid dispensing system, without over-spraying or spraying composition outside the target area.

Preferably, the liquid composition is a pest control composition. Pest control products and compositions may include products and compositions for managing a pest species inside and outside of a building, such as a dwelling or a business, including, but not limited to, areas such as garages, patios, balconies, screened porches, lawns, and/or gardens. Pest control products and compositions may include products and compositions for use in and/or on yards, lawns, bushes, trees, and/or outdoor plants, as well as for use on or around indoor plants. Pest control products and compositions may include selective and non-selective products and compositions, such as selective and non-selective herbicides, fungicides, and insecticides. Pest control products and compositions may also include products and compositions for topical application to humans to control or repel pest species, such as insects and other arthropods.

In particular, the market for weed control products and arthropod pest control products is growing, due to factors such as an increase in urban housing, changes in weather patterns, and an increase in home food gardening and the desire to keep lawns, flower beds, etc. looking neat and attractive. At the same time, there is increasing consumer demand for insecticide and herbicide products that are natural and non-toxic. Consumers also prefer herbicide and insecticide products that contain a limited number of ingredients and/or recognizable ingredients, as communicated by simpler ingredient statements. However, these products are still expected to be efficacious and efficiently control weeds and arthropods, comparable to traditional chemical pesticide products. Also, there are existing herbicide and insecticide products that contain natural ingredients, such as plant essential oils. However, these existing products have a number of disadvantages: some products are messy or difficult to use and some products have limited efficacy.

The liquid pest control composition may be oil-based and may comprise at least one carrier oil. The carrier oil may be a hydrocarbon oil, such as a hydrocarbon oil derived from petroleum, animal, or plant sources. An example of a suitable petroleum-derived oil is mineral oil. An example of a suitable animal-derived oil includes fish oil. Examples of suitable plant-derived oils include corn oil, soybean oil, palm oil, rapeseed oil, sesame oil, wheat oil, wheat germ oil, coconut oil, canola oil, sunflower oil, safflower oil, peanut oil, olive oil, and castor oil. The hydrocarbon oil may be paraffinic, naphthenic and/or aromatic. The liquid pest control composition may comprise a single carrier oil or a mixture of carrier oils. The liquid pest control composition may comprise greater than about 25 percent by weight of a carrier oil, or from about 30% by weight to about 99.5% by weight of a carrier oil, or from about 50% by weight to about 98% by weight of a carrier oil, or from about 80% by weight to about 95% by weight of a carrier oil or from about 85% by weight to about 95% by weight of a carrier oil. Liquid pest control compositions comprising carrier oils are described in US Pat. Pub. No. 2021/0169061A1, which is hereby incorporated by reference herein.

Alternatively, the liquid pest control compositions may be substantially free of a geologically derived (e.g., petroleum-based) carrier oils, such as mineral oil, as products containing a carrier oil may be messy to use and may leave a residue on a treated surface.

The liquid pest control compositions may comprise from about 40% to about 99% by weight of the composition of water. Such liquid pest control compositions comprising water are described in U.S. application Ser. No. 17/865,943, U.S. application Ser. No. 18/082,891, U.S. application Ser. No. 18/334,004, and U.S. Provisional App. Ser. Nos. 63/509,339 and 63/509,380, all of which are hereby incorporated by reference herein.

Suitable liquid herbicide compositions may also comprise from about 40% to about 99% by weight of the composition of water and are described in WO App. Ser. No. PCT/US23/68554 and U.S. Provisional App. Ser. No. 63/355,134, which are hereby incorporated by reference herein.

The pest control compositions of the present disclosure may comprise renewable components. The compositions disclosed herein may comprise from about 1%, or from about 5%, or from about 10%, or from about 20% or from about 30%, of from about 40% or from about 50%, to about 40%, or to about 50%, or to about 60% or to about 70% or to about 80% or to about 90%, or to about 100% by weight of renewable components. The compositions disclosed herein may be at least partially or fully bio-based, As such, the composition can comprise a bio-based carbon content of about 50% to about 100%, preferably about 70% to about 100%, more preferably about 75% to about 100%, even more preferably about 80% to about 100%, most preferably about 90% to about 100%. The percent bio-based carbon content can be calculated as the "percent Modern Carbon (pMC)" as derived using the methodology of ASTM D6866-16. The compositions of the present disclosure may be substantially free of petroleum-derived solvents or petroleum-derived surfactants.

The compositions disclosed herein may comprise less than about 15 ingredients, preferably less than about 10 ingredients, more preferably less than about 15 ingredients and greater than about 5 ingredients.

The compositions disclosed herein may comprise ingredients listed under section 25(b) of the Federal Insecticide, Fungicide, and Rodenticide Act (FIFRA), incorporated herein by reference in its entirety. The compositions disclosed herein may comprise naturally occurring compounds or extracts or derivatives thereof. The compositions disclosed herein may comprise at least one organic, certified organic, US Department of Agriculture ("USDA") National Organic Program compliant ("NOP-compliant") ingredient. The compositions disclosed herein may comprise at least one ingredient that is food grade or generally recognized as safe (GRAS). The GRAS ingredient may include any agent listed on the FDA's GRAS list, including direct food additives (see, e.g., US law (sections 201(s) and 409 of the Federal Food, Drug, and Cosmetic Act, November 2016). The GRAS ingredient may also include, but is not limited to, agents that are generally recognized, among experts qualified by scientific training and experience to evaluate their safety, as having been adequately shown through scientific procedures (or, in the case of a substance used in food prior to Jan. 1, 1958, through either scientific procedures or through experience based on common use in food) to be safe. The use of food grade or GRAS ingredients enables the compositions disclosed herein to be used by consumers without rinsing a treated surface after use. The compositions disclosed herein may comprise ingredients that have a tolerance or tolerance exemption for use on food contact surfaces under the Federal Food, Drug, and Cosmetic Act US law (see, e.g., 40 CFR 180, November 2016, December 2015 update).

Active Ingredients

The liquid pest control composition may comprise one or more active ingredients (also referred to herein as actives). The liquid pest control composition may comprise from about 0.005% to about 30%, or from about 0.05% to about 25%, or from about 0.15% to about 20%, or from about 0.5% to about 15%, or from about 1% to about 12%, or from about 2% to about 10%, by weight of the composition of one or more active ingredients.

Nonlimiting examples of active ingredients include aldehyde C16 (pure), almond oil, terpenes, alpha-terpineol, verbenone, alpha-cedrene, cinnamic aldehyde, amyl cinnamic aldehyde, cinnamyl acetate, amyl salicylate, anisic aldehyde, citric acid, cedrol, benzyl alcohol, benzyl acetate, cinnamaldehyde, cinnamic alcohol, carvacrol, caryophyllene, carveol, citral, citronellal, methylheptenone, citronellol, dimethyl salicylate, cucalyptol (also known as 1,8-cincole), thujopsene, 3-thujopsanone, alpha-thujone, beta-thujone, fenchone, eugenyl acetate (e.g., isocugenyl acetate), cugenol, iso-eugenol, methyl iso-eugenol, galaxolide, geraniol, guaiadiene, guaiacol, ionone, menthol (e.g., L-menthol), menthyl ester, menthone, carvone (e.g., L-carvone), camphor, camphene, p-cymene, borneol, bornyl esters, bornyl acetate, isobornyl acetate, terpinene (e.g., gamma-terpinene), methyl anthranilate, methyl ionone, methyl salicylate, nerol, phellandrene (e.g., alpha-phellandrene), pennyroyal oil, perillaldehyde, 1- or 2-phenyl ethyl alcohol, 1- or 2-phenyl ethyl propionate, piperonal, piperonyl acetate, piperonyl alcohol, D-pulegone, terpinen-4-ol, terpinyl acetate, 4-tert butylcyclohexyl acetate, myrcene, chavicol, acetaldehyde, safrole, terpinen-4-ol, cincole, dimethyl trisulfide, diallyl disulfide, diallyl sulfide, diallyl tetrasulfide, 3-vinyl-[4H]-1,2-dithiin, thyme oil, thyme oil white, thyme oil red, thymol, anethole (e.g., trans-anethole), vanillin, ethyl vanillin, castor oil, cedar oil, cedarwood oil, cinnamon, cinnamon oil, citronella, citronella oil, clove, clove oil, corn oil, corn mint oil, oregano oil, cottonseed oil, garlic, garlic oil, geranium oil, lemongrass oil, linseed oil, mint, mint oil, peppermint, peppermint oil, spearmint, rose oil, spearmint oil, rosemary, rosemary oil, sesame, sesame oil, soybean oil, white pepper, licorice oil, wintergreen oil, anise oil (e.g., star anise oil), lilac flower oil, black seed oil, bay oil, grapefruit seed oil, grapefruit, lemon oil, orange oil, orange flower oil, tea tree oil, cedar leaf oil, camphor oil, Tagete minuta oil, lavender oil, Lippia javancia oil, oil of bergamot, galbanum oil, eucalyptus oil, lovage oil, and mixtures thereof.

The liquid pest control composition may comprise about 0.005% to about 15%, preferably from about 0.05% to about 15%, more preferably from about 0.15% to about 12%, even more preferably from about 0.5% to about 10% of one or more active ingredients selected from the group consisting of eugenol, 2-phenylethyl propionate, menthol, menthone, amyl butyrate, geraniol, limonene (e.g., d-limonene), p-cymene, linalool, linalyl acetate, camphor, methyl salicylate, pinene (e.g., alpha-pinene, beta-pinene), cucalyptol, piperonal, piperonyl alcohol, tetrahydrolinalool, thymol, carvone (e.g., L-carvone), vanillin, ethyl vanillin, iso-eugenol, bornyl acetate, isobornyl acetate, terpinene (e.g., gamma-terpinene), cinnamyl acetate, cinnamic alcohol, cinnamaldehyde, ethyl cinnamate, pyrethrins, abamectin, azadirachtin, amitraz, rotenone, boric acid, spinosad, biopesticides, synthetic pesticides, and mixtures thereof.

The liquid pest control composition may comprise one or more synthetic pesticides. Nonlimiting examples of synthetic pesticides include pyrethroids, such as bifenthrin, esfenvalerate, fenpropathrin, permethrin, cypermethrin, cyfluthrin, deltamethrin, allethrin, lambda-cyhalothrin, or the like; syngergists, such as piperonyl butoxide, or the like; juvenile hormone analogues, such as methoprene, hydroprene, kinoprene, or the like; and neonicotinoids, such as imidacloprid, acetamiprid, thiamethoxam, or the like, and mixtures thereof. The liquid pest control composition may comprise less than about 10%, or less than about 5%, or less than about 2%, or less than about 1%, or less than about 0.5%, or less than about 0.1% by weight synthetic pesticide. Alternatively, the liquid pest control composition may be substantially free of synthetic pesticide.

The liquid pest control composition may comprise one or more biopesticides. Nonlimiting examples of biopesticides include pyrethrum, rotenone, neem oil, and mixtures thereof.

The liquid pest control composition may comprise from about 0.15% to about 15%, or from about 0.5% to about 15%, or from about 0.5% to about 15%, or from about 0.5% to about 10%, by weight of the composition of one or more active ingredients, where the active ingredient is an essential plant oil. The liquid pest control composition may comprise one or more essential plant oils selected from the group consisting of corn mint oil, peppermint oil, spearmint oil, rosemary oil, thyme oil, citronella oil, clove oil, cinnamon oil, cedarwood oil, garlic oil, geranium oil, lemongrass oil, and mixtures thereof, preferably selected from the group consisting of corn mint oil, spearmint oil, rosemary oil, thyme oil, and mixtures thereof, more preferably selected from the group consisting of corn mint oil, rosemary oil, and combinations thereof.

Surfactant

The liquid pest control composition disclosed herein may be formulated with one or more surfactants. The liquid pest control composition may comprise from about 0.01% to about 15%, or from about 0.1% to about 10%, or from about 1% to about 10%, or from about 1% to about 12.5%, or from about 1% to about 15%, or from about 1% to about 8% of one or more surfactants, preferably one or more anionic surfactants, more preferably sodium lauryl sulfate.

A sprayed drop of a liquid pesticidal composition comprising an active agent is preferably able to wet a target surface and spread out or cover a target area to perform its intended function. A surfactant generally reduces the surface tension of the water on the surface of the spray drop by reducing the interfacial tension between the spray drop and target surface, e.g., exoskeleton of an arthropod. Surfactants also wet and disperse particles of active ingredient(s) in the composition prior to spraying, thereby enabling more uniform coverage and wetting of the target upon spraying. Surfactants may also function to emulsify active agents that are not easily solubilized in water, such as oils. Surfactants thus include various agents known to function as emulsifiers or wetting agents. Suitable surfactants include anionic surfactants, amphoteric surfactants, zwitterionic surfactants, nonionic surfactants, cationic surfactants, or mixtures thereof.

Anionic surfactants are surfactant compounds that contain a long chain hydrocarbon hydrophobic group in their molecular structure and a hydrophilic group, including salts such as carboxylate, sulfonate, sulfate or phosphate groups. The salts may be sodium, potassium, calcium, magnesium, barium, iron, ammonium and amine salts of such surfactants. Anionic surfactants include the alkali metal, ammonium and alkanol ammonium salts of organic sulfuric reaction products having in their molecular structure an alkyl or alkaryl group containing from about 8 to about 22 carbon atoms and a sulfonic or sulfuric acid ester group. Examples of such anionic surfactants include water soluble salts and mixtures of salts of alkyl benzene sulfonates having from about 8 to about 22 carbon atoms in the allyl group (e.g., linear alkyl benzene sulfonates, such as dodecylbenzene sulfonate and salts thereof), alkyl sulfates and alkali metal salts thereof (preferably those having from about 8 to about 22 carbon atoms in the alkyl group, e.g., sodium dodecyl/lauryl sulfate), alkyl ether sulfates having from about 8 to about 22 carbon atoms in the alkyl group and about 2 to about 9 moles of ethylene oxide (e.g., sodium laureth sulfate). Aryl groups generally include one or two rings, alkyl groups generally include from about 8 to about 22 carbon atoms, and ether groups generally comprise from about 1 to about 9 moles of ethylene oxide (EO) and/or propylene oxide (PO), preferably EO. A preferred anionic surfactant is sodium lauryl sulfate or SLS (also known as sodium dodecyl sulfate). The liquid pest control composition may comprise from about 1% to about 10%, preferably from about 2% to about 8.5%, or from about 4% to about 8%, by weight of the composition of sodium lauryl sulfate.

Anionic surfactants also include fatty acids and salts thereof. Fatty acids and salts thereof are organic molecules comprising a single carboxylic acid moiety (carboxylate anion in salts) and at least 7 carbon atoms, or from about 11 to about 22 carbon atoms, or from about 12 to about 16 carbon atoms. The salts may be sodium, potassium, calcium, magnesium, barium, iron, ammonium and amine salts of fatty acids. The salts of fatty acids are also known as soaps. Fatty acid and the salts thereof may be linear, branched, saturated, unsaturated, cyclic, or mixtures thereof. Nonlimiting examples of fatty acids and salts thereof include octanoic acid, nonanoic acid, decanoic acid, lauric acid, myristic acid, palmitic acid, stearic acid, arachidic acid, behenic acid, lignoceric acid, myristoleic acid, palmitoleic acid, sapienic acid, oleic acid, elaidic acid, vaccenic acid, linoleic acid, linoclaidic acid, arachidonic acid, eicosapentaenoic acid, crucic acid, docosahexaenoic acid, the sodium, calcium, potassium or zinc salts thereof, or mixtures thereof.

Alternatively, the liquid pest control compositions may be substantially free of fatty acids, as a fatty acid may be difficult to solubilize in an aqueous composition. In particular, the liquid compositions may be substantially free of lauric acid, oleic acid, stearic acid, or a combination thereof.

Additional suitable anionic surfactants include alkyl sulfosuccinates, alkyl ether sulfosuccinates, olefin sulfonates, alkyl sarcosinates, alkyl monoglyceride sulfates and ether sulfates, alkyl ether carboxylates, paraffinic sulfonates, acyl methyl taurates, sulfoacetates, acyl lactates, and sulfosuccinamides.

Amphoteric surfactants are surface active agents containing at least one anionic group and at least one cationic group and may act as either acids or bases, depending on pH. Some of these compounds are aliphatic derivatives of heterocyclic secondary and tertiary amines, in which the aliphatic substituent(s) may be straight or branched, at least one of the aliphatic substituents contains from about 6 to about 20, or from about 8 to about 18, carbon atoms, and at least one of the aliphatic substituents contains an anionic water-solubilizing group, e.g., carboxy, phosphonate, phosphate, sulfonate, sulfate.

Zwitterionic surfactants are surface active agents having a positive and negative charge in the same molecule, where the molecule is zwitterionic at all pHs. Zwitterionic surfactants include betaines, sultaines, and lecithins. The zwitterionic surfactants generally contain a quaternary ammonium, quaternary phosphonium, or a tertiary sulfonium moiety. Zwitterionic surfactants contain at least one straight chain or branched aliphatic substituent, which contains from about 6 to 20, or from about 8 to about 18, carbon atoms, and at least one aliphatic substituent containing an anionic water-solubilizing group, e.g., carboxy, sulfonate, sulfate, phosphate or phosphonate.

Examples of suitable amphoteric and zwitterionic surfactants include the alkali metal, alkaline earth metal, ammonium or substituted ammonium salts of alkyl amphocarboxyglycinates and alkyl amphocarboxypropionates, alkyl amphodipropionates, alkyl monoacetate, alkyl diacetates, alkyl amphoglycinates, and alkyl amphopropionates, where the alkyl group has from 6 to about 20 carbon atoms. Other suitable amphoteric and zwitterionic surfactants include alkyliminomonoacetates, alkyliminidiacetates, alkyliminopropionates, alkyliminidipropionates, and alkylamphopropylsulfonates, where the alkyl group has from about 12 to about 18 carbon atoms, as well as alkyl betaines, alkylamidoalkylene betaines, alklyl sultaines, and alkylamidoalkylenchydroxy sulfonates.

The nonionic surfactant(s) may be any of the known nonionic surfactants, examples of which include condensates of ethylene oxide with a hydrophobic moiety. Nonionic surfactants include ethoxylated primary or secondary aliphatic alcohols having from about 8 to about 24 carbon atoms, in either straight or branch chain configuration, with from about 2 to about 40, or from about 2 and about 9 moles of ethylene oxide per mole of alcohol. Other suitable nonionic surfactants include the condensation products of alkyl phenols having from about 6 to about 12 carbon atoms with about 3 to about 100, or 3 to about 60, or 3 to about 30, or about 5 to about 14 moles of ethylene oxide. Nonionic surfactants also include ethoxylated castor oils and silicone surfactants, such as Silwet L-8610, Silwet L-8600, Silwet L-77, Silwet L-7657, Silwet L-7650, Silwet L-7607, Silwet L-7604, Silwet L-7600, and Silwet L-7280. Nonionic surfactants also include glyceryl esters, such as polyglyceryl oleate/stearate.

The liquid pest control compositions of the present disclosure may optionally comprise one or more cationic surfactants. Suitable cationic surfactants include quaternary ammonium surfactants and amino surfactants that are positively charged at the pH of the liquid pest control composition.

The weight ratio of surfactant, preferably anionic surfactant, more preferably sodium lauryl sulfate, to active ingredient may be from about 1:3 to about 30:1, or about 1:3 to about 20:1, or about 1:1 to about 20:1, or about 1:1 to about 10:1, or about 1:3 to about 3:1, or about 1:2 to about 2:1, or about 1:1.5 to about 1.5:1, or about 1:1.2 to about 1.2:1. The weight ratio of surfactant, preferably anionic surfactant, more preferably sodium lauryl sulfate, to lemongrass oil may be about 1:1 to about 30:1 or about 2:1 to about 30:1. The weight ratio of surfactant, preferably anionic surfactant, more preferably sodium lauryl sulfate, to active ingredient, preferably an essential oil or a constituent thereof, may be from about 1:1 to about 30:1 or about 1:1 to about 20:1.

28

Solvent

The liquid pest control compositions described herein may comprise from about 0.05% to about 45%, or from about 0.1% to about 30%, or from about 1% to about 25%, or from about 1% to about 15%, or from about 8% to about 20% by weight the composition of one or more solvents. Liquid pest control compositions may contain one or more solvents and water.

Suitable solvents include alcohols, such as monohydridic or polyhydridic alcohols. Preferred monohydridic alcohols are low molecular weight primary or secondary alcohols exemplified by ethanol, propanol, and isopropanol, preferably isopropanol. Polyhydridic alcohols, such as those containing from 2 to about 6 carbon atoms and from 2 to about 6 hydroxy groups (e.g., ethylene glycol, glycerine, and 1,2-propanediol (also referred to as propylene glycol)), may also be used.

Suitable solvents also include esters. The liquid pest control composition may comprise from about 0.005% to about 15%, or from about 0.05% to about 12%, or from about 0.5% to about 10%, or from about 1% to about 7% by weight of the composition of one or more esters. Examples of suitable esters include triethyl citrate, diethyl citrate, monoethyl citrate, isopropyl myristate, myristyl myristate, isopropyl palmitate, octyl palmitate, isopropyl isothermal, butyl lactate, ethyl lactate, butyl stearate, triethyl citrate, glycerol monooleate, glyceryl dicaprylate, glyceryl dimyristate, glyceryl dioleate, glyceryl distearate, glyceryl monomyristate, glyceryl monooctanoate, glyceryl monooleate, glyceryl monostearate, decyl oleate, glyceryl stearate, isocetyl stearate, octyl stearate, putty stearate, isostearyl neopentonate, PPG myristyl propionate, diglyceryl monooleate, and diglyceryl monostearate. The liquid pest control composition may comprise triethyl citrate, preferably from about 0.005% to about 15%, or from about 0.05% to about 12%, or from about 0.5% to about 10%, or from about 1% to about 7% by weight of the composition of triethyl citrate.

Additional solvents include lipophilic fluids, including siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, and mixtures thereof.

Suitable solvents listed under section 25(b) of the Federal Insecticide, Fungicide, and Rodenticide Act (FIFRA) include butyl lactate (including enantiomers thereof), vinegar, 1,2-propylene carbonate, isopropyl myristate, ethyl lactate (including enantiomers thereof), and glycerine.

Preferred solvents include isopropanol, triethyl citrate, ethanol, glycerine, ethyl lactate, renewable versions thereof, and mixtures thereof. The liquid pest control compositions described herein may comprise from about 1% to about 45%, or from about 1% to about 30%, or from about 1% to about 25%, or from about 1% to about 15% by weight the composition of a solvent selected from the group consisting of isopropanol, triethyl citrate, and mixtures thereof. The liquid pest control compositions described herein may comprise from about 8% to about 20% by weight the composition of isopropanol. The liquid pest control compositions described herein may comprise from about 0.3% to about 5%, preferably from about 0.3% to about 3% by weight the composition of glycerine.

pH Adjusting Agents

The liquid pest control compositions may comprise from about 0.00001% to about 1.5%, preferably from about 0.0001% to about 1%, more preferably from about 0.001% to about 0.8%, even more preferably from about 0.01% to about 0.6%, by weight of the composition of a pH adjusting agent, such as a carboxylic acid or a salt thereof selected from the group consisting of citric acid or a salt thereof, malic acid or a salt thereof, acetic acid or a salt thereof, fumaric acid or a salt thereof, humic acid or a salt thereof, and mixtures thereof, preferably citric acid or a salt thereof, more preferably citric acid anhydrous or citric acid monohydrate. The liquid pest control compositions described herein may comprise from about 0.00001% to about 1.5% by weight of the composition of citric acid or a salt thereof, such as sodium citrate, monosodium citrate, disodium citrate, trisodium citrate, trisodium citrate dihydrate, potassium citrate, monopotassium citrate, tripotassium citrate, tripotassium citrate monohydrate, or dipotassium citrate. Carboxylic acids, such as citric acid, or salts thereof may function to adjust the pH of the composition and/or as a chelant.

The liquid pest control compositions may be subject to fluctuating temperatures during shipping, storage, and/or use. The liquid pest control compositions is preferably stable at low temperatures (i.e., from about 5° C. to about 10° C.). "Stable" may refer to a liquid pest control composition that is substantially clear and free from phase separation or precipitation, where no agitation or mixing is required to use the composition for its application.

The liquid pest control compositions may have a Brookfield viscosity ranging from about 1 cps to about 500 cps, preferably about 1 cps to about 100 cps, as measured according to method described herein. The liquid pest control compositions may have a service tension ranging from about 10 mN/m to about 60 mN/m, as measured according to method described herein.

Without being bound by theory, it is believed that the liquid dispensing systems disclosed herein are particularly advantageous for the targeted spraying of liquid pest control compositions ((e.g., insecticide or herbicide) from a distance of about 0.3 m to about 6 m, preferably about 0.3 m to about 3 m, from the target pest or surface. The liquid pest control composition (including characteristics such as viscosity and surface tension), the dispensing pressure, and/or the nozzle design may be selected to provide optimal spray exit velocity and particle size distribution (PSD) for spraying a liquid pest control product on the target pest or surface at a distance of about 0.3 m to about 3 m, preferably about 0.3 m to about 2 m, from the target pest or surface.

The liquid pest control composition may comprise: (a) from about 0.5% to about 12%, preferably about 1% to about 10%, more preferably about 2% to about 8.5%, even more preferably about 3% to about 7.5%, by weight of the composition of sodium lauryl sulfate; (b) from about 0.5% to about 15%, preferably about 1% to about 10%, more preferably about 1.5% to about 8%, by weight of the composition of an active ingredient selected from the group consisting of corn mint oil, peppermint oil, spearmint oil, rosemary oil, thyme oil, citronella oil, clove oil, cinnamon oil, cedarwood oil, garlic oil, geranium oil, lemongrass oil, eugenol, geraniol, nerol, vanillin, 2-phenylethyl propionate, menthol, menthone, thymol, carvone, camphor, methyl salicylate, p-cymene, linalool, eucalyptol/1,8-cineole, alpha-pinene, bornyl acetate, gamma-terpinene, and mixtures thereof, preferably selected from the group consisting of geraniol, corn mint oil, peppermint oil, rosemary oil, lemongrass oil, and mixtures thereof; and (c) from about 60% to about 90%, preferably about 65% to about 85%, more preferably about 70% to about 80%, by weight of the composition of water.

The liquid pest control composition may optionally further comprise from about 0.5% to about 10%, preferably from about 1% to about 5%, by weight of the composition of by weight of the composition of urea. The liquid pest control composition may optionally further comprise from about 0.1% to about 45%, preferably from about 0.5% to about 35%, more preferably from about 1% to about 25%, even more preferably from about 2% to about 20%, by weight of the composition of a solvent selected from the group consisting of isopropyl alcohol, triethyl citrate, isopropyl myristate, ethyl lactate, butyl lactate, butyl stearate, glycerin, and mixtures thereof, preferably selected from the group consisting of isopropyl alcohol, triethyl citrate, and mixtures thereof. The liquid pest control composition may also optionally further comprise a pH adjusting agent, such as a carboxylic acid or salt thereof selected from the group consisting of citric acid or a salt thereof, malic acid or a salt thereof, acetic acid or a salt thereof, fumaric acid or a salt thereof, humic acid or a salt thereof, and mixtures thereof, preferably citric acid or a salt thereof. The liquid pest control composition may also optionally further comprise an ingredient selected from preservatives, thickeners, fatty acids or salts thereof, and combinations thereof.

The liquid pest control composition may be an oil-in-water emulsion. The liquid pest control composition may have a turbidity less than about 20 NTU, a b* value of about 0 to about 5, or a combination thereof. The liquid pest control composition may have a pH ranging from about 3.0 to about 11.0, or from about 4.0 to about 11.0, or from about 4.0 to about 9.0, or from about 5.0 to about 9.0, or from about 5.0 to about 8.0, or from about 6.0 to about 8.0, or from about 6.0 to about 7.0. The liquid pest control composition may be a "low VOC" composition and comprise about 3% volatile organic compounds (VOCs) by weight or less. Alternatively, the liquid pest control composition may comprise greater than 3% volatile organic compounds (VOCs) by weight. The liquid pest control composition may comprise greater than 3% to about 35% by weight of volatile organic compound (VOC). VOCs can be measured according to the California Air Resources Board (CARB) Method 310 for VOC determination (May 25, 2018).

Test Methods

Brookfield Viscosity

Brookfield viscosity is measured at 23° C.±2° C. using a Brookfield DV-E viscometer. The liquid is contained in a glass jar, where the width of the glass jar is from about 5.5 to 6.5 cm and the height of the glass jar is from about 9 to about 11 cm using spindle LV2 at 60 RPM. The test is conducted in accordance with the instrument's instructions.

pH Test Method pH can be using a standard pH meter such as, for example, a Beckman Coulter model PHI1410 PH meter equipped with a general-purpose probe (manufactured by Beckman Coulter, Brea, California, U.S.A.). The pH meter is calibrated according to the manufacturer's instructions. Measurements are performed after storing the compositions at room temperature (approximately 23° C.±2° C.) for approximately 24 hours.

Particle Size Test Method

Particle size is measured by light scattering data techniques. Particle size is determined with a Malvern Zetasizer Nano ZSP (Malvern Panalytical, Malvern, United Kingdom), or the like. The software used for control of the instrument and for data acquisition is the Malvern Zetasizer Software version 8.01.4906 (Malvern Panalytical). All samples are kept at 25° C., unless otherwise specified.

Samples are measured in BRAND® polystyrene dispos- able cuvettes (Cat. No. 759070D or equivalent). 1 mL of the sample is added into the cuvette using a disposable transfer pipette (VWR, Cat. No. 414004-004 or equivalent), swirled, and then discarded. Another 1 mL of the sample is added into the cuvette using a disposable transfer pipette. The cap is placed on the cuvette and all sides of the cuvette are wiped with lint-free lens paper. The cuvette is loaded into the instrument in accordance with the manufacture's specifica- tion to ensure light is passing correctly into the sample during the measurement, and the lid is closed.

The instrument is readied in accordance with manufac- ture's specification. The particle size measurements are made through the software with the following settings:

1) Under the 'Measure' section, the 'Manual' option is selected. 'Measurement Type' is then set to 'Size'.

2) The 'Sample' section is then selected. In the 'Material' subsection: 'Material' is chosen to be 'SDS'; the 'RI' is set to 1.461; and the 'Absorption' is set to 0.001. In the 'Dispersant' subsection: 'Dispersant' is selected as 'Water'; 'Temperature' is set to 25.0 deg C.; 'Viscosity' is set at 0.8872 cP; and 'RI' is set as 1.330. In the 'General options' subsection 'Mark-Houwink Parameters' is selected, 'A Parameter' is set to 0.428; and 'K Parameter (cm2/s)' is set to 7.67e-05. In the 'Temperature' subsection: 'Temperature' is set as 25.0 deg C.; 'Equilibration Time (second)' is set to 120. In the 'Cell' subsection: 'Cell Type' is selected to be 'Disposable cuvettes'; and the 'DTS0012' option is selected.

3) The 'Measurement' section is then selected. The 'Angle of Detection Measurement Angle' is selected as '1730 Backscatter (NIBS default)'; 'Measurement Duration' is selected as 'Automatic'; 'Number of Runs' is set to 11; 'Run duration (seconds)' is set to 10; 'Number of Measure- ments' is set as 3; 'Delay between Measurements (seconds)' is set to 0; 'Append Measurement Number to Sample Name' is selected; and 'Allow Results to be Saved Containing Correlation Data Only' is not selected. In the 'Advanced' subsection: 'Measurement duration, Extend Duration for Large Part' is set to 'No'; 'Measurement settings, Position- ing method' is set to 'Seek for Optimum Position'; and Automatic attenuation selection is set to 'Yes'.

4) The 'Data Processing' section is then selected, and the following options are selected: 'Analysis Model' is selected as 'General Purpose (Normal Resolution)'. The 'Size Analy- sis Parameters' are set to: 'Analysis Details'; 'Name' is set to 'Customized', 'Description' is set to 'Customized Analy- sis'; 'Display Range' is set with the 'Lower Limit' set to 0.6 and 'Upper Limit' set to 6000; 'Multimodal-analysis, Reso- lution' is selected to 'Normal'; 'Size classes, Number of size classes' is set as 70; 'Lower Size Limit' is set as 0.4; 'Upper Size Limit' is set as 10,000; 'Lower Threshold' is set as 0.05; and 'Upper Threshold' is set as 0.01. In the 'Reports' subsection: 'Print Report' is not selected and in the 'Export' subsection: 'Export' results is not selected.

Spray Droplet Size Test Method

The term "Dv10 value" describes the average particle size where 10 vol. % of the particles have a smaller size. Similarly, the term "Dv50 value" describes the average particle size where 50 vol. % of the particles have a smaller size, and the term "Dv90 value" describes the average particle size where 90 vol. % of the particles have a smaller size. The Sauter mean diameter (D[3, 2]) is the weighted average surface diameter, assuming spherical particles of the same surface area as the actual particles:

$$D[3,2] = \frac{\sum D_i^3 n_i}{\sum D_i^2 n_i}.$$

Spray droplet volume size distribution measurements comprising Spray D(50) Normalized, Spray D(90) Normal- ized, and Spray D(2,3) Normalized values are determined using a Malvern Spraytec 2000 laser diffraction spray drop- let sizing instrument (supplied by Malvern Instruments, Worcestershire, UK), equipped with a 300 mm lens possess- ing a focal length of the 150 mm, and an Air Purge System (not greater than 14.5 psi). The system is controlled with a computer and software accompanying the instrument, such as the Spraytec software version 3.20 or equivalent, utilizing Mie Theory and Fraunhofer Approximation optical theory. The system is placed in a fume hood for atmospheric control with care taken to place it directly opposite the actuation spray plume trajectory to prevent saturation, with an air flow rate of between 50-70 L/min (60 L/min was the target rate). The distance from the dispensing nozzle orifice to the laser during measurements is 30 cm. A new spray bottle is used for each sample replicate analyzed. Lighting conditions are not changed during or between the background control and test sample data collection periods. Light obscuration values below 95% are considered suitable to provide accurate results.

Samples analyzed included "example" samples, which are samples according to this disclosure, and comparative samples. All newly created example samples are tested within three hours of preparation and are measured at temperatures between 20-22° C. Deionized water is used as a standard reference spray and is labeled as the "control."

Spray measurements are conducted using the following spray SOP instrument configuration: Rapid SOP type is chosen, and the following settings are selected: Hardware Configuration is set to "Default", Measurement Type is set to "Rapid", Data Acquisition Rate is set to "250 Hz", and Lens Type is set to "300". Within the Measurement menu: Background is set to "3 seconds", Inspection is selected, the box under Output Trigger is Unchecked. Under the Mea- surement tab "Rapid" is selected, Events Number is set to "1", Duration Per Event is set to "4000.0", Units is set to "ms". Measurement Trigger where Trigger Type is set to "Transmission drops to level" and Transmission is set to "96", Data Collection where Start is set to "52", Units is set to "ms", and select "before the trigger" from the drop down menu. On the Advanced tab window, all boxes are Unchecked, and Grouping is "no grouping"; The Back- ground Alarms are set to "default values". On the Analysis Tab and under Optical Properties, Particle Set is set to "Water", Dispersant set to "Air", Multiple Scattering Analy- sis is set to "Enable". On the Data Handling tab and under Detector Range is set to "first: 1 and last: last", "No extinction analysis" box is selected, Scattering threshold is set to "1". On the Data Handling/Spray Profile the Path Length is set to "100.0", the Alarm is selected, and the "Use default values" box is checked. On the Additional Properties tab the Curve Fit is set to "no fit", User Size is set to "enable box", the drop down menu is set to "Default". On the Additional Properties/Advanced tab Particle Diameter is set to "0.10" for the minimum and to "900" for the maximum, and Result Type is set to "Volume Distribution". On the Output tab, Export Option is set to "not selected", the Derived Parameter is selected, the Use Averaging Period box is selected and set to "0.0" and "ms". On the Average menu "Average scatter data" is selected.

Spray measurements are conducted using the following Spray Procedure: The sample is first test sprayed from the spray bottle for 1-2 seconds, to ensure that the nozzle is free flowing and not clogged; the sample is loaded into the holding device in the front of the Spraytec 2000 system. The actuator is fully depressed. The spray droplet size data are viewed and saved as "Average Scatter Data".

a. The value obtained from each sample measurement is normalized to the control sample value in accordance with the following calculations:

$$\text{The value of Spray } D(50) \text{ Normalized} = D(50)_{Example}/D(50)_{Control};$$

$$\text{The value of Spray } D(90) \text{ Normalized} = D(90)_{Example}/D(90)_{Control};$$

$$\text{The value of Spray } D(3,2) \text{ Normalized} = D(3,2)_{Example}/D(3,2)_{Control};$$

wherein:

Spray D(50), Spray D(90), and Spray D(3,2) are values obtained from the instrument software for both the example samples and control samples separately.

Each of the Spray D(90) Normalized and Spray D(3,2) Normalized values reported for each of the samples is the average value calculated from five replicate spray plumes per sample.

Determination of the Hunter L.a.b. (CIE) b* Value

The formation of yellow color is measured using the Hunter L.a.b. (CIE) method. The b* value is determined using a HunterLab ColorFlex EZ® spectrophotometer (HunterLab, 11491 Sunset Hills Road, Reston, Virginia 20190). The methodology that is used is described in detail in the "User's Manual for ColorFlex EZ Version 2.2."

The HunterLab ColorFlex EZ® spectrophotometer uses a xenon flash lamp to illuminate a sample. The light reflected from the sample is then separated into its component wavelengths through a dispersion grating. The relative intensities of the light at different wavelengths along the visible spectrum (400-700 nm) are then analyzed to produce a number result indicative of the color of the sample.

Turbidity Method

A turbidimeter is used to measure the turbidity of the compositions. This instrument measures the turbidity of liquids in Nephelometric Turbidity Units (NTU). The method of measuring turbidity is described in detail in the following reference: Hach 2100Q and 2100Qis User Manual, Edition 6, August 2021, from the Hach Company. If a sample is not homogenous prior to analysis, the sample is inverted until it appears homogenous and is then poured into an analyte vile for measurement.

This method of measurement determines quantitative values of turbidity by evaluating the ratio of a primary nephelometric light scatter signal to a transmitted light scatter signal. This particular method of evaluation provides values between 0-1000 NTU, where increasing NTU values indicate more turbid compositions. In between each test sample, water controls may be measured to ensure proper equipment operation. For example, water may have a turbidity of about 1.11 NTU and isopropyl alcohol may have a turbidity of about 0.15 NTU. It is believed that improved emulsification of active ingredients, particularly hydrophobic active ingredients, yields lower NTU values.

Surface Tension Method

Surface tension is measured according to ASTM 1331-14 (Published January 2015) using an EZ-Pi tensiometer (Kibron, Parrish, Fla.), or equivalent. The instrument is calibrated according to the manufacturer instructions using DI water. Measurements are taken and values are reported in mN/m.

In view of the foregoing description, the following non-limiting examples of combinations of components and features are contemplated herein:

1. A liquid dispensing system comprising:
   a bottle (20) defining and enclosing an interior volume (22), having a neck (25) terminating in a rim (26) circumscribing and defining a main opening through the neck to the interior volume, the rim having a rim surface occupying a plane (26p);
   a fluid passage fitting (40) configured to fit over the rim (26) and/or within the main opening, the fluid passage fitting comprising structure defining a liquid dispensing passage (43) providing fluid communication between the interior volume (22) and an outside environment,
   wherein the liquid dispensing passage (43) is arranged in fluid communication with a pump (330) configured to draw liquid from the interior volume (22) and through the liquid dispensing passage (43);
   the bottle or the fluid passage fitting further comprising structure defining a vacuum relief port (41) providing fluid communication between the interior volume and the outside environment;
   the liquid dispensing system further comprising a check valve structure (31, 32) operably associated with the vacuum relief port (41) and configured to allow fluid to pass through the vacuum relief port into the interior volume, but to restrict or prevent fluid from flowing through the vacuum relief port out of the interior volume.

2. The liquid dispensing system of example 1, wherein the vacuum relief port (41) is within the fluid passage fitting (40).

3. The liquid dispensing system of either of the preceding examples, wherein the fluid passage fitting (40) is configured to fit at least partially over the rim (26).

4. The liquid dispensing system of example 3, further comprising a sealing gasket (30a) in sealing contact with the rim (26) and the fluid passage fitting (40).

5. The liquid dispensing system of example 4, wherein the sealing gasket (30a) has a first portion (31) disposed between the fluid passage fitting (40) and the rim (26), and a second portion (32) extending radially inwardly of the rim and configured to cover an interior port opening (42) of the vacuum relief port (41), whereby the sealing gasket provides a portion or all of the check valve structure via flexibility of material of which the sealing gasket is formed.

6. The liquid dispensing system of any of the preceding examples wherein the neck (25) comprises a rim lip (27) and the fluid passage fitting (40) comprises a rim attachment structure (45) effective to engage the rim lip and sealingly hold the fluid passage fitting directly or indirectly against the rim.

7. The liquid dispensing system of any of the preceding examples wherein the fluid passage fitting (40) is fluidly connected to a draw tube (47) inside the bottle (20), extending from proximity of the main opening down to proximity of a bottom extent of the interior volume (22).

8. A liquid dispensing system comprising:

a bottle (20) defining and enclosing an interior volume (22), and having a neck (25) having an outside neck profile (25o) and an internal neck profile (25i), and terminating in a rim (26) circumscribing and defining a main opening through the neck to the interior volume, the rim having a rim surface occupying a plane;

the neck comprising first and second retaining features (28, 29), each of the first and second retaining features being arranged about the outside neck profile or about the inside neck profile proximate or spaced from the rim surface, at least the second retaining feature (29) comprising a radially outward protrusion from, or a radially inward indentation in, the outside neck profile (25o); and a removable cap (50) configured to fit over the rim (26) and be in operable contact with one or both of the first and second retaining features (28, 29) so as to be effectively held on the neck, the cap being configured to effectively seal the bottle about the main opening when effectively held thereon, the cap having an outside cap profile (52) and a third retaining feature (51) comprising a radially outward protrusion from, or a radially inward indentation in, the outside cap profile (52).

9. The liquid dispensing system of example 8 wherein the first retaining feature (28) comprises one or more helical threads about the neck, and the cap (50) comprises cooperating cap threads.

10. The liquid dispensing system of either of examples 8 or 9 wherein the neck threads protrude radially outwardly from the outside neck profile (25o).

11. The liquid dispensing system of any of examples 8-10 wherein the bottle contains a liquid composition comprising any of an herbicide, a fungicide, an insect repellent, or an insecticide.

12. The liquid dispensing system of any of examples 8-11 wherein the bottle has a base and is configured to rest stably on the base, on a level horizontal surface, wherein the bottle has a horizontal outer profile cross section that is non-circular.

13. The liquid dispensing system of example 12 wherein the horizontal outer profile cross section has a shape that is one of a square, rounded square, rectangle, rounded-rectangle, stadium shape, triangle, rounded triangle, hexagon, rounded hexagon, oval, or elliptical; preferably square, rounded square, rectangle, rounded-rectangle, stadium shape, triangle, rounded triangle, hexagon or rounded hexagon, and more preferably square, rounded square, rectangle or rounded-rectangle.

14. The liquid dispensing system of any of examples 8-13 comprising a removable dispensing fixture (100) configured to be directly or indirectly, removably operably attached to the neck (25) and/or the cap (50) via operable cooperation therewith, the dispensing fixture comprising a housing (101).

15. The liquid dispensing system of example 14 wherein the dispensing fixture (100) is attachable to the neck or the cap by a mechanism other than screw threads.

16. The liquid dispensing system of example 15 wherein the dispensing fixture (100) includes at least one, more preferably at least two latching jaw(s) (105) included with the housing (101) and configured to latch about a retaining feature (28, 29, 51) on the neck and/or the cap, wherein the dispensing fixture is configured to allow the jaw(s) (105) to move between respective (a) latched and (b) unlatched positions relative the housing, in which, respectively, (a) the dispensing fixture is prevented from being non-destructively removed from the neck, and (b) the dispensing fixture may be non-destructively removed from the neck.

17. The liquid dispensing system of example 16 wherein one or more of the latching jaw(s) (105) are biased toward the latched positions.

18. The liquid dispensing system of example 17 wherein the biasing of the latching jaw(s) (105) is provided by one or more springs (107) acting directly or indirectly on the housing (101) and on the latching jaw(s).

19. The liquid dispensing system of any of examples 16-18 wherein the dispensing fixture (100) includes a pair of opposing latching jaws (105).

20. The liquid dispensing system of any of examples 16-19 wherein the latching jaw(s) (105) is/are operably joined or connected to one or more latch actuator(s) (106) that are user-accessible proximate an outside surface of the housing (101), the one or more latch actuator(s) (106) being configured to effect movement of the one or more latching jaw(s) (105), relative the housing (101), between latched and unlatched positions, via user engagement therewith.

21. The liquid dispensing system of any of examples 14-20 wherein the dispensing fixture (100) comprises a liquid outlet coupling (60) configured to fit within the neck (25) and/or over the rim (26).

22. The liquid dispensing system of example 21 wherein the liquid outlet coupling (60) is movable relative the housing (101) and biased toward a coupled position with respect to the bottle (20).

23. The liquid dispensing system of example 22 wherein the biasing of the liquid outlet coupling (60) is provided by one or more coupling springs (61 or 61a) directly or indirectly acting upon the housing (101) and the liquid outlet coupling (60).

24. The liquid dispensing system of example 23 wherein the coupling springs comprise one or more bending springs (61a) which extend from a main portion of the liquid outlet coupling (60).

25. The liquid dispensing system of example 24 wherein the bending springs (61a) are integrally formed with the liquid outlet coupling (60).

26. The liquid dispending system of either of examples 24 or 25 wherein the bending springs (61a) project radially outwardly from the liquid outlet coupling (60) and engage the housing (101).

27. The liquid dispensing system of any of examples 14-26, further comprising a removable spacer (120) disposed at least partially between the housing (101) and the bottle (20), wherein the spacer (120) is configured to operably locate the dispensing fixture in a suitable position to be attached to the cap (50).

28. The liquid dispensing system of any of examples 8-27 wherein a fluid passage fitting (40) is provided with the bottle (20) and configured to fit within the main opening and/or over the rim (26), the fluid passage fitting comprising structure (46) defining a liquid dispensing passage (43) providing fluid communication between the interior volume (22) and an outside environment, wherein the liquid dispensing passage (43) is arranged in fluid communication with a pump (330) configured to draw liquid from the interior volume and through the liquid dispensing passage (43).

29. The liquid dispensing system of any of examples 8-28 comprising a vacuum relief system operable to allow fluid to flow into but not out of the interior volume.

30. The liquid dispensing system of example 29 wherein the fluid passage fitting (40) includes a vacuum relief port (41).

31. The liquid dispensing system of example 30 wherein the vacuum relief port (41) is accompanied by a check valve structure configured to allow fluid to pass through the vacuum relief port (41) into the interior volume (22), but to restrict or prevent fluid from flowing through the vacuum relief port (41) out of the interior volume (22).

32. The liquid dispensing system of any of examples 28-31 wherein the fluid passage fitting (40) is fluidly connected to a draw tube (47) inside the bottle (20), extending from proximity of the main opening down to proximity of a bottom extent of the interior volume (22).

33. A liquid dispensing system comprising:

a bottle (20) defining and enclosing an interior volume (22), having a neck (25) terminating in a rim (26);

a dispensing fixture (100) attached to the neck over the rim, the dispensing fixture comprising one or more structures (40, 60) providing fluid communication from the interior volume, through an outflow tube (65) to a spray wand (300);

wherein the spray wand (300) comprises a housing (300a), the housing containing and/or holding in suitably configured positions:

a valve (335) having a valve inlet (335a), a valve actuator (336) movable between closed and open positions, and a valve outlet (335b);

a pump (330);

a power supply (342);

a power switch (340);

a trigger lock switch (321); and a spray trigger (320);

wherein the valve and the pump are configured in inline fluid communication between an inflow conduit (302a) and an outflow conduit (302b);

wherein the power switch (340) is configured along a power supply line (343) and has open and closed positions, whereby electrical connection and disconnection between the power supply (342) and the pump (330) may be affected;

wherein the spray trigger (320) is in mechanical communication with the valve actuator (336) and is movable between activating and deactivating positions, wherein when the spray trigger is moved to the activating position, the valve actuator is caused to be moved to the open position; and when the spray trigger is moved to the deactivating position, the valve actuator caused to be moved to the closed position;

wherein the power switch (340) is in mechanical communication with the spray trigger (320) and/or the valve actuator (340), such that when the spray trigger is moved to the activating position, the power switch (340) is placed in the closed position; and when the spray trigger (320) is moved to the deactivating position, the power switch (340) is placed in the open position;

wherein the trigger lock switch (321) is in mechanical communication with the valve actuator (336) and/or the spray trigger (320) and is movable between locked (322b) and unlocked (322a) positions, wherein when the lock switch (321) is disposed in the locked position:

the spray trigger (320) is prevented from moving to the activating position; and wherein when the lock switch (321) is disposed on the unlocked position:

the spray trigger (320) is permitted to be moved to the activating position.

34. The liquid dispensing system of example 33 wherein the valve actuator (336) is biased to the closed position, preferably by a spring.

35. The liquid dispensing system of either of examples 33 or 34 wherein the spray trigger (320) protrudes from the housing (300a) and is depressible into the housing, to the activating position.

36. The liquid dispensing system of any of examples 33-35 wherein the spray trigger (320) is biased to the deactivating position, preferably by a spring.

37. The liquid dispensing system of any of examples 33-36 wherein the power switch (340) is biased to the open position, preferably by a spring.

38. The liquid dispensing system of any of examples 33-37 wherein the trigger lock switch (321) slides within a lock switch track (322) formed in or on the housing (300a), between its locked (322b) and unlocked (322a) positions.

39. The liquid dispensing system of any of examples 33-38 wherein the power supply (342) is a battery.

40. The liquid dispensing system of any of examples 33-39 wherein the pump (330) is a gear pump driven by an electric motor.

41. The liquid dispensing system of any of examples 33-40, further comprising a wand stowing fixture (350) attached to the bottle (20) and/or the dispensing fixture (100), the wand stowing fixture being configured to receive and hold the wand (300) in a stowed position proximate the bottle, the wand stowing fixture preferably comprising a lock switch engagement feature (351) being configured to contact and effect movement of the trigger lock switch (321) to the locked position upon stowing of the wand (300) in or on the stowing fixture (350).

42. The liquid dispensing system of any of examples 33-41, wherein the outflow conduit (302b) is in fluid communication with exit bibb (303b), the exit bibb being pivotable about a pivot pin (304a) disposed in or on the housing (300a), between extended/deployed and folded/stowed positions.

43. The liquid dispensing system of any of examples 33-37 or 39-43 wherein the outflow conduit (302b) is in fluid communication with exit bibb (303b), the exit bibb being pivotable about a pivot pin (304a) disposed in or on the housing (300a), between extended/deployed and folded/stowed positions; and pivoting of the exit bibb (303b) effectively functions as, or effectuates, the trigger lock switch, wherein the extended/deployed position effectuates the unlocked position, and the folded/stowed position effectuates the locked position.

44. The liquid dispensing system of either of examples 42 or 43, wherein exit bibb (303b) is part of an exit fitting (303c) that pivots about a pivot pin (304a), the pivot pin being seated in the spray wand housing (300a), the exit bibb having a receiving end (303r) and a discharge end (303d), wherein the receiving end (303r) and exit fitting (303c) are configured such that a flexible outflow conduit (302b) fluidly connected to the receiving end (303r) may cross over and back across an axis of rotation (400) of the exit fitting.

45. A liquid dispensing system comprising:
a bottle (20) defining and enclosing an interior volume (22), having a neck (25) terminating in a rim (26);
a dispensing fixture (100) attached to the neck over the rim, the dispensing fixture comprising one or more structures (40, 60) providing fluid communication from the interior volume, through to an outflow tube (65) out to a spray wand (300);
wherein the spray wand (300) comprises a housing (300a), the housing containing and/or holding in suitably configured positions:
a pump (330);
an exit fitting (303c), comprising an exit bibb (303b) having a receiving end (303r) and a discharge end (303d);
wherein the pump is configured in inline fluid communication between an inflow conduit (302a) fluidly connected to the outflow tube (65), and a flexible outflow conduit (302b) fluidly connected to the receiving end (303r) of the exit bibb (303b);
wherein the exit fitting and exit bibb pivot about a pivot pin (304a) between folded/stowed and extended/deployed positions, the pivot pin being seated in the spray wand housing (300a),
wherein the receiving end (303r) and exit fitting (303c) are configured such that flexible outflow conduit (302b) may cross over and back across an axis of rotation (400) of the exit fitting, as the exit fitting pivots about the pivot pin (304a) between the folded/stowed and extended/deployed positions.

46. A liquid dispensing system comprising:
a bottle (20) defining and enclosing an interior volume (22), having a neck (25) terminating in a rim (26);
a dispensing fixture (100) attached to the neck over the rim, the dispensing fixture comprising one or more structures providing fluid communication from the interior volume, out through an outflow tube (65) to a spray wand (300);
wherein a liquid leaf surface active herbicide composition is disposed within the interior volume;
a spray wand fluidly connected to the dispensing fixture, wherein the spray wand (300) comprises a spray tube (305) which terminates at a spray nozzle (310) having a distal emitting tip, the spray tube having an outer diameter (TD), the nozzle having thereabout an end structure (311) having a largest radial dimension (SD) that is at least 150 percent the spray tube outer diameter (TD), more preferably at least 200 percent the spray tube outer diameter (TD), and even more preferably at least 300 percent the spray tube outer diameter (TD), and preferably having a distal end that is coterminous with or extends beyond the distal emitting tip of the spray nozzle.

47. The liquid dispensing system of example 46, wherein the end structure (311) is a shroud.

48. The liquid dispensing system of example 47, wherein the shroud is flared from a location proximate the spray tube, to a distal end of the end structure.

49. The liquid dispensing system of any of examples 46-48 wherein the spray nozzle (310) is configured to emit a dispersed spray of the composition upon supply of the composition under pressure to the nozzle through the spray tube.

50. The liquid dispensing system of any of examples 1-41, wherein a liquid leaf surface active herbicide composition is disposed within the interior volume, the liquid dispensing system further comprising a spray wand (300) fluidly connected to the bottle,
the spray wand (300) comprising a spray tube (305) which terminates at a spray nozzle (310) having a distal emitting tip, the spray tube having an outer diameter (TD), the nozzle having thereabout an end structure (311) having a largest radial dimension (SD) that is at least 150 percent the spray tube outer diameter (TD), more preferably at least 200 percent the spray tube outer diameter (TD), and even more preferably at least 300 percent the spray tube outer diameter (TD), and preferably having a distal end that is coterminous with or extends beyond the distal emitting tip of the spray nozzle.

51. The liquid dispensing system of example 50, wherein the end structure (311) is a shroud.

52. The liquid dispensing system of example 51, wherein the shroud is flared from a location proximate the spray tube, to a distal end of the end structure.

53. The liquid dispensing system of any of examples 50-52 wherein the spray nozzle (310) is configured to emit a dispersed spray of the composition upon supply of the composition under pressure to the nozzle through the spray tube.

54. A liquid dispensing system component comprising:
a bottle (20) defining and enclosing an interior volume (22), having a neck (25) terminating in a rim (26) circumscribing and defining a main opening through the neck to the interior volume, the rim having a rim surface occupying a plane (26p);
a fluid passage fitting (40) configured to fit over the rim (26) and/or within the main opening, the fluid passage fitting comprising structure defining a liquid dispensing passage (43) providing fluid communication between the interior volume (22) and an outside environment;
the bottle or the fluid passage fitting further comprising structure defining a vacuum relief port (41) providing fluid communication between the interior volume and the outside environment;
the liquid dispensing system further comprising a check valve structure (31, 32) operably associated with the vacuum relief port (41) and configured to allow fluid to pass through the vacuum relief port into the interior volume, but to restrict or prevent fluid from flowing through the vacuum relief port out of the interior volume; and
a removable cap (50) disposed over the main opening.

55. The liquid dispensing system component of example 54, wherein the vacuum relief port (41) is within the fluid passage fitting (40).

56. The liquid dispensing system component of either of examples 54 or 55, wherein the fluid passage fitting (40) is configured to fit over the rim (26).

57. The liquid dispensing system component of example 56, further comprising a sealing gasket (30a) in sealing contact with the rim (26) and the fluid passage fitting (40).

58. The liquid dispensing system component of example 57, wherein the sealing gasket (30a) has a first portion (31) disposed between the fluid passage fitting (40) and the rim (26), and a second portion (32) extending radially inwardly of the rim and configured to cover an interior port opening (42) of the vacuum relief port (41), whereby the sealing gasket provides a portion or all of the check valve structure via flexibility of material of which the sealing gasket is formed.

59. The liquid dispensing system component of any of examples 54-58 wherein the neck (25) comprises a rim lip (27) and the fluid passage fitting (40) comprises a rim attachment structure (45) effective to engage the rim lip and sealingly hold the fluid passage fitting against the rim.

60. The liquid dispensing system component of any of examples 54-59 wherein the fluid passage fitting (40) is fluidly connected to a draw tube (47) disposed inside the bottle (20), extending from proximity of the main opening down to proximity of a bottom extent of the interior volume (22).

61. A liquid dispensing system component comprising:
    a bottle (20) defining and enclosing an interior volume (22), and having a neck (25) having an outside neck profile (25o) and an internal neck profile (25i), and terminating in a rim (26) circumscribing and defining a main opening through the neck to the interior volume, the rim having a rim surface occupying a plane;
    the neck comprising discrete first (28) and second (29) distinct retaining features, each of the first and second retaining features being arranged about the outside neck profile or about the inside neck profile proximate or spaced from the rim surface, at least the second retaining feature (29) comprising a radially outward protrusion from, or a radially inward indentation in, the outside neck profile (25o); and
    a removable cap (50) configured to fit over the rim (26) and be in operable contact with one or both of the first and second retaining features (28, 29) so as to be effectively held on the neck, the cap being configured to effectively seal the bottle about the rim when effectively held thereon;
    a draw tube (47) disposed within the interior volume;
    a structure defining a vacuum relief port (41) providing fluid communication between the interior volume and an outside environment; and
    a check valve structure (31, 32) operably associated with the vacuum relief port (41) and configured to allow fluid to pass through the vacuum relief port into the interior volume, but to restrict or prevent fluid from flowing through the vacuum relief port out of the interior volume.

62. A liquid dispensing system component comprising:
    a bottle (20) defining and enclosing an interior volume (22), and having a neck (25) having an outside neck profile (25o) and an internal neck profile (25i), and terminating in a rim (26) circumscribing and defining a main opening through the neck to the interior volume, the rim having a rim surface occupying a plane;
    the neck comprising discrete first (28) and second (29) distinct retaining features, each of the first and second retaining features being arranged about the outside neck profile or about the inside neck profile proximate or spaced from the rim surface, at least the second retaining feature (29) comprising a radially outward protrusion from, or a radially inward indentation in, the outside neck profile (25o);
    a fluid passage fitting (40) configured to fit over the rim (26) and/or within the main opening, the fluid passage fitting comprising structure defining a liquid dispensing passage (43) providing fluid communication between the interior volume (22) and an outside environment;
    a removable cap (50) configured to fit over the rim (26) and be in operable contact with one or both of the first and second retaining features (28, 29) so as to be effectively held on the neck, the cap being configured to effectively seal the bottle about the rim when effectively held thereon;
    a structure defining a vacuum relief port (41) providing fluid communication between the interior volume and the outside environment; and
    a check valve structure (31, 32) operably associated with the vacuum relief port (41) and configured to allow fluid to pass through the vacuum relief port into the interior volume, but to restrict or prevent fluid from flowing through the vacuum relief port out of the interior volume.

63. The liquid dispensing system component of either of examples 61 or 62 wherein the first retaining feature (28) comprises one or more helical threads about the neck, and the cap (50) comprises cooperating cap threads.

64. The liquid dispensing system component of any of examples 61-63 wherein the neck threads protrude radially outwardly from the outside neck profile (25o).

65. The liquid dispensing system component of any of examples 61-64 wherein the bottle contains a liquid composition comprising any of an herbicide, a fungicide, an insect repellent, or an insecticide.

66. The liquid dispensing system component of any of examples 61-65 wherein the bottle has a base and is configured to rest stably on the base, on a level horizontal surface, wherein the bottle has a horizontal cross section that is non-circular.

67. The liquid dispensing system component of example 66 wherein the horizontal cross section of a shape that is one of a square, rounded-square, rectangle, rounded-rectangle, stadium shape, triangle, rounded-triangle, hexagon, rounded-hexagon, oval, or elliptical; preferably square, rounded-square, rectangle, rounded-rectangle, triangle, rounded-triangle, hexagon or rounded-hexagon.

68. A method of using a liquid dispensing system to apply a liquid product to an application site, comprising the steps of:
    providing a liquid dispensing system comprising a bottle (20) containing the liquid product, a cap (50) affixed to a neck (25) of the bottle, a dispensing fixture (100) latched to the cap, and a spacer (120) disposed between the dispensing fixture and the bottle;
    unlatching the dispensing fixture from the cap, and moving it away from proximity with the cap and the bottle;
    removing the spacer from proximity with the bottle;
    removing the cap from the neck;
    placing the dispensing fixture over the neck, and latching it to the neck and/or bottle; and
    dispensing the liquid product.

69. A method of using a liquid dispensing system to apply a liquid product to an application site, comprising the steps of:
    providing a liquid dispensing system comprising a first bottle (20) having a first neck (25), and a dispensing fixture (100) latched to the first neck and/or the first bottle;

unlatching the dispensing fixture from the first neck and/or first bottle, and moving the first bottle away from proximity with the dispensing fixture;

providing a second bottle (20) having a second neck (25), and containing liquid product and having a cap (50) installed thereon;

removing the cap from the second bottle;

placing the dispensing fixture over the second neck, and latching it to the second neck and/or the second bottle; and dispensing the liquid product.

70. The method of either of examples 68 or 69 wherein the dispensing fixture (100) includes a housing (101) and at least one, more preferably at least two latching jaws (105) included with the housing (101) and configured to latch about the necks (25) of the first and second bottles (20), wherein the dispensing fixture is configured to allow the jaws (105) to move between respective (a) latched and (b) unlatched positions relative the housing (101), in which, respectively, (a) the dispensing fixture is prevented from being non-destructively removed from the necks of the bottles, and (b) the dispensing fixture may be non-destructively removed from the necks of the bottles.

71. The method of example 70 wherein one or more of the latching jaw(s) (105) is/are biased toward the latched position.

72. The method of example 71 wherein the biasing of the latching jaws (105) is provided by one or more springs (107) acting directly or indirectly on the housing (101) and on the latching jaw(s).

73. The method of any of examples 70-72 wherein the dispensing fixture (100) includes a pair of opposing latching jaws (105).

74. The method of any of examples 70-73 wherein the latching jaw(s) (105) is/are operably joined or connected to one or more latch actuator(s) (106) that is/are user-accessible at location(s) proximate an outside surface of the housing (101), the one or more latch actuator(s) (106) being configured to effect movement of the one or more latching jaw(s) (105), relative the housing (101), to unlatched positions, via user engagement therewith.

75. A liquid dispensing system comprising:

a bottle (20) defining and enclosing an interior volume (22), having a neck (25) terminating in a rim (26);

a dispensing fixture (100) attached to the neck over the rim, the dispensing fixture comprising one or more structures (40, 60) providing fluid communication from the interior volume, through an outflow tube (65) to a spray dispenser, preferably a trigger spray dispenser (500);

wherein the dispensing fixture (100) comprises a front wall (100a), a rear wall (100b) opposite the front wall, and side walls (100c) extending between the front wall (100a) and the rear wall (100b), wherein at least one of the side walls (100c) comprises a protrusion (130), wherein the spray dispenser comprises a housing (502), a nozzle (504), a spray actuator, preferably a trigger spray actuator (506), and a handle (508) comprising a front wall (508a), a rear wall (508b) opposite the front wall, and side walls (508c) extending between the front wall (508a) and the rear wall (508b), wherein at least one of the side walls (508c) comprises a recess (512) complementary to the protrusion (130) in at least one of the side walls (100c) of the dispensing fixture (100).

76. The liquid dispensing system of example 75, wherein the recess (512) of the spray dispenser, preferably a trigger spray dispenser (500), is configured to receive the protrusion (130) of the dispensing fixture (100) in more than one orientation.

77. The liquid dispensing system of any of examples 75-76 wherein the spray actuator of the spray dispenser is selected from the group consisting of a trigger actuator, a lever actuator, a toggle actuator, a knob actuator, or a button actuator, preferably a trigger actuator (506).

78. The liquid dispensing system of any of examples 75-77 wherein the spray actuator, preferably a trigger actuator (506), protrudes from the spray dispenser housing (502) and is depressible into the spray dispenser housing (502).

79. The liquid dispensing system of any of examples 75-78, wherein the protrusion (130) in at least one of the side walls (100c) of the dispensing fixture (100) is configured to hold and store the spray dispenser proximate the bottle (20).

80. The liquid dispensing system of any of examples 75-79, wherein the spray dispenser is removably attached to the dispensing fixture (100).

81. The liquid dispensing system of any of examples 75-80, wherein the liquid dispensing system further comprises a removable spacer (120) disposed at least partially between a housing (101) of the dispensing fixture (100) and the bottle (20).

82. The liquid dispensing system of example 81, wherein the spacer (120) is configured to operably locate the dispensing fixture (100) in a suitable position to be attached to a cap (50) on the bottle (20).

83. The liquid dispensing system of any of examples 81-82, wherein the outflow tube (65) is stored in or on the spacer (120).

84. The liquid dispensing system of any of examples 75-83, wherein the cross section of the recess 512 taken parallel to the side walls (508c) is circular, elliptical, oval, or polygonal in shape.

85. The liquid dispensing system of any of examples 75-84, wherein the cross section of the recess (512) taken parallel to the side walls (508c) is symmetrical in shape.

86. The liquid dispensing system of any of examples 75-85, wherein the cross section of the recess (512) taken parallel to the side walls (508c) is elliptical in shape.

87. The liquid dispensing system of any of examples 75-86, wherein the cross section of the recess (512) taken parallel to the side walls (508c), the cross section of the protrusion taken parallel to the side walls (100c), and the handle of the dispensing fixture have substantially the same shape.

88. The liquid dispensing system of any of examples 75-87, wherein the recess is a through opening extending through the handle 508.

89. The liquid dispensing system of any of examples 75-88, wherein the surface of the recess and the surface of the protrusion are provided with cooperating mating features.

90. A liquid dispensing system comprising:

a bottle (20) defining and enclosing an interior volume (22), having a neck (25) terminating in a rim (26) circumscribing and defining a main opening through the neck to the interior volume, the rim having a rim surface occupying a plane (26p);

a fluid passage fitting (40) configured to fit over the rim (26) and/or within the main opening, the fluid passage fitting comprising structure defining a liquid dispensing passage (43) providing fluid communication between the interior volume (22) and an outside environment;

the liquid dispensing system further comprising a structure defining a vacuum relief port (41) providing fluid communication between the interior volume and the outside environment;

the liquid dispensing system further comprising a check valve structure (31, 32) operably associated with the vacuum relief port (41) and configured to allow fluid to pass through the vacuum relief port into the interior volume, but to restrict or prevent fluid from flowing through the vacuum relief port out of the interior volume; and a removable cap (50) disposed over the main opening.

91. The liquid dispensing system of example 90, wherein the bottle or the fluid passage fitting further comprises the structure defining a vacuum relief port (41).

92. The liquid dispensing system of example 90, wherein the liquid dispensing system comprises a removable dispensing fixture (100) configured to be directly or indirectly, removably operably attached to the neck (25) and/or the cap (50) via operable cooperation therewith.

93. The liquid dispensing system of example 92, wherein the removable dispensing fixture (100) comprises the structure defining a vacuum relief port (41) providing fluid communication between the interior volume and the outside environment and a check valve structure (30) operably associated with the vacuum relief port (41) and configured to allow fluid to pass through the vacuum relief port into the interior volume, but to restrict or prevent fluid from flowing through the vacuum relief port out of the interior volume.

94. The liquid dispensing system of any one of examples 90-93, wherein the fluid passage fitting (40) is configured to fit over the rim (26).

95. The liquid dispensing system of any one of examples 90-94, further comprising a sealing gasket (30a) in sealing contact with the rim (26) and the fluid passage fitting (40).

96. The liquid dispensing system of any one of examples 90-95, wherein the sealing gasket (30a) has a first portion (31) disposed between the fluid passage fitting (40) and the rim (26), and a second portion (32) extending radially inwardly of the rim and configured to cover an interior port opening (42) of the vacuum relief port (41), whereby the sealing gasket provides a portion or all of the check valve structure via flexibility of material of which the sealing gasket is formed.

97. The liquid dispensing system of any one of examples 90-96, wherein the neck (25) comprises a rim lip (27) and the fluid passage fitting (40) comprises a rim attachment structure (45) effective to engage the rim lip and scalingly hold the fluid passage fitting against the rim.

98. The liquid dispensing system of any one of examples 90-97, wherein the fluid passage fitting (40) is fluidly connected to a draw tube (47) disposed inside the bottle (20), extending from proximity of the main opening down to proximity of a bottom extent of the interior volume (22).

99. The liquid dispensing system of any one of examples 90-98, wherein the dispensing fixture (100) comprises a liquid outlet coupling (60) configured to fit within the neck (25) and/or over the rim (26) of the bottle (20).

100. The liquid dispensing system of any one of examples 90-99, wherein a main body 101 of the dispensing fixture 100 is formed with a coupling cavity 112 to accommodate and retain in position the liquid outlet coupling 60.

101. The liquid dispensing system of any one of examples 90-100, wherein the liquid outlet coupling 60 and fluid passage fitting 40 are formed and adapted to cooperatively fit together upon assembly of the dispensing fixture 100 onto the bottle 20.

102. The liquid dispensing system of any one of examples 90-101, wherein the fluid passage fitting (40) is configured to fit within the main opening.

103. A liquid dispensing system component comprising:

a bottle (20) defining and enclosing an interior volume (22), and having a neck (25) having an outside neck profile (250) and an internal neck profile (25i), and terminating in a rim (26) circumscribing and defining a main opening through the neck to the interior volume, the rim having a rim surface occupying a plane;

the neck comprising discrete first (28) and second (29) distinct retaining features, each of the first and second retaining features being arranged about the outside neck profile or about the inside neck profile proximate or spaced from the rim surface, at least the second retaining feature (29) comprising a radially outward protrusion from, or a radially inward indentation in, the outside neck profile (250); and a removable cap (50) configured to fit over the rim (26) and be in operable contact with one or both of the first and second retaining features (28, 29) so as to be effectively held on the neck, the cap being configured to effectively seal the bottle about the rim when effectively held thereon;

a draw tube (47) disposed within the interior volume;

a structure defining a vacuum relief port (41) providing fluid communication between the interior volume and an outside environment; and a check valve structure (31, 32) operably associated with the vacuum relief port (41) and configured to allow fluid to pass through the vacuum relief port into the interior volume, but to restrict or prevent fluid from flowing through the vacuum relief port out of the interior volume.

104. A liquid dispensing system component comprising:

a bottle (20) defining and enclosing an interior volume (22), and having a neck (25) having an outside neck profile (25o) and an internal neck profile (25i), and terminating in a rim (26) circumscribing and defining a main opening through the neck to the interior volume, the rim having a rim surface occupying a plane;

the neck comprising discrete first (28) and second (29) distinct retaining features, each of the first and second retaining features being arranged about the outside neck profile or about the inside neck profile proximate or spaced from the rim surface, at least the second retaining feature (29) comprising a radially outward protrusion from, or a radially inward indentation in, the outside neck profile (25o);

a fluid passage fitting (40) configured to fit over the rim (26) and/or within the main opening, the fluid passage fitting comprising structure defining a liquid dispensing passage (43) providing fluid communication between the interior volume (22) and an outside environment;

a removable cap (50) configured to fit over the rim (26) and be in operable contact with one or both of the first and second retaining features (28, 29) so as to be effectively held on the neck, the cap being configured to effectively seal the bottle about the rim when effectively held thereon;

a structure defining a vacuum relief port (41) providing fluid communication between the interior volume and the outside environment; and a check valve structure (31, 32) operably associated with the vacuum relief port (41) and configured to allow fluid to pass through the vacuum relief port into the interior volume, but to restrict or prevent fluid from flowing through the vacuum relief port out of the interior volume.

105. The liquid dispensing system component of any one of examples 103-104, wherein the first retaining feature (28) comprises one or more helical threads about the neck, and the cap (50) comprises cooperating cap threads.

106. The liquid dispensing system component of any one of examples 103-105, wherein the neck threads protrude radially outwardly from the outside neck profile (25*o*).

107. The liquid dispensing system component of any one of examples 103-106, wherein the bottle contains a liquid pest control composition, preferably an herbicide, a fungicide, an insect repellent, or an insecticide.

108. The liquid dispensing system component of any one of examples 103-107, wherein the bottle has a base and is configured to rest stably on the base, on a level horizontal surface, wherein the bottle has a horizontal cross section that is non-circular.

109. The liquid dispensing system component of any one of examples 103-108, wherein the horizontal cross section of a shape that is one of a square, rounded-square, rectangle, rounded-rectangle, stadium shape, triangle, rounded-triangle, hexagon, rounded-hexagon, oval, or elliptical; preferably square, rounded-square, rectangle, rounded-rectangle, triangle, rounded-triangle, hexagon or rounded-hexagon.

110. The liquid dispensing system component of any one of examples 103-109, wherein the liquid pest control composition comprises from about 45% to about 99% by weight of the pest control composition of water.

111. The liquid dispensing system component of any one of examples 103-110, wherein the liquid pest control composition comprises from about 0.15% to about 10% by weight of the composition at least one active ingredient selected from the group consisting of corn mint oil, peppermint oil, spearmint oil, rosemary oil, thyme oil, citronella oil, clove oil, cinnamon oil, cedarwood oil, garlic oil, geranium oil, lemongrass oil, eugenol, geraniol, nerol, vanillin, 2-phenylethyl propionate, menthol, menthone, thymol, carvone, camphor, methyl salicylate, p-cymene, linalool, cucalyptol/1,8-cincole, alpha-pinene, bornyl acetate, gamma-terpinene, and mixtures thereof, preferably selected from the group consisting of geraniol, corn mint oil, peppermint oil, rosemary oil, lemongrass oil, and mixtures thereof.

112. The liquid dispensing system component of any one of examples 103-111, wherein the pest control composition comprises from about 1% to about 15% by weight of the composition of a surfactant selected from the group consisting of anionic surfactants, nonionic surfactants, amphoteric surfactants, zwitterionic surfactants, cationic surfactants, and mixtures thereof, preferably an anionic surfactant, more preferably sodium lauryl sulfate.

113. The liquid dispensing system component of any one of examples 103-112, wherein the pest control composition comprises from about 0.1% to about 30% by weight of the composition of a solvent selected from the group consisting of isopropyl alcohol, triethyl citrate, isopropyl myristate, propylene carbonate, ethyl lactate, butyl lactate, butyl stearate, glycerin, and mixtures thereof, preferably a solvent selected from the group consisting of isopropyl alcohol, triethyl citrate, and mixtures thereof.

114. The liquid dispensing system component of any one of examples 103-113, wherein the pest control composition has a viscosity of from about 1 cps to about 500 cps.

115. The liquid dispensing system component of any one of examples 103-114, wherein the pest control composition has a service tension ranging from about 10 mN/m to about 60 mN/m.

116. A method of controlling a pest comprising the steps of:

a. providing a liquid dispensing system comprising a bottle (20) containing a liquid pesticide composition, a cap (50) affixed to a neck (25) of the bottle, a dispensing fixture (100) latched to the cap, and a spacer (120) disposed between the dispensing fixture and the bottle;

b. unlatching and removing the dispensing fixture from the cap;

c. removing the spacer;

d. removing the cap from the neck;

e. placing the dispensing fixture over the neck, and latching it to the neck and/or bottle; and f. dispensing the liquid product from the dispensing system.

117. A method of controlling a pest comprising the steps of:

a. providing a liquid dispensing system comprising a first bottle (20) having a first neck (25), and a dispensing fixture (100) latched to the first neck and/or the first bottle;

b. unlatching and removing the dispensing fixture from the first neck and/or first bottle;

c. providing a second bottle (20) having a second neck (25), and containing a liquid pesticide composition and having a cap (50) installed thereon;

d. removing the cap from the second bottle;

e. placing the dispensing fixture over the second neck, and latching it to the second neck and/or the second bottle; and f. dispensing the liquid product.

118. The method of example 116 or example 117, wherein the dispensing fixture (100) includes a housing (101) and at least one, more preferably at least two, latching jaws (105) included with the housing (101) and configured to latch about the necks (25) of the first and second bottles (20), wherein the dispensing fixture is configured to allow the jaws (105) to move between respective (a) latched and (b) unlatched positions relative the housing (101), in which, respectively, (a) the dispensing fixture is prevented from being non-destructively removed from the necks of the bottles, and (b)

the dispensing fixture may be non-destructively removed from the necks of the bottles.

119. The method of example 118 wherein one or more of the latching jaw(s) (105) is/are biased toward the latched position.

120. The method of example 119 wherein the biasing of the latching jaws (105) is provided by one or more springs (107) acting directly or indirectly on the housing (101) and on the latching jaw(s).

121. The method of any one of examples 116-120 wherein the dispensing fixture (100) includes a pair of opposing latching jaws (105).

122. The method of any one of examples 116-121 wherein the latching jaw(s) (105) is/are operably joined or connected to one or more latch actuator(s) (106) that is/are user-accessible at location(s) proximate an outside surface of the housing (101), the one or more latch actuator(s) (106) being configured to effect movement of the one or more latching jaw(s) (105), relative the housing (101), to unlatched positions, via user engagement therewith.

123. The method of any one of examples 116-122, wherein the liquid pest control composition is selected from the group consisting of an insecticide, a herbicide, and combinations thereof.

124. The method of any one of examples 116-123, wherein the liquid pest control composition comprises from about 45% to about 99% by weight of the composition of water, from about 0.1% to about 10% by weight of the composition of at least one active ingredient selected from the group consisting of peppermint oil, corn mint oil, spearmint oil, rosemary oil, thyme oil, citronella oil, clove oil, cinnamon oil, cedarwood oil, garlic oil, geranium oil, lemongrass oil, geraniol, eugenol, nerol, vanillin, 2-phenylethyl propionate, menthol, menthone, thymol, carvone, camphor, methyl salicylate, p-cymene, linalool, cucalyptol/1,8-cincole, alpha-pinene, bornyl acetate, gamma-terpinene, and mixtures thereof, preferably selected from the group consisting of peppermint oil, corn mint oil, spearmint oil, citronella oil, geraniol, and mixtures thereof, and from about 1% to about 15% by weight of the composition of an anionic surfactant, preferably sodium lauryl sulfate.

125. The method of any one of examples 116-124, wherein the liquid pest control composition comprises from about 0.5% to about 10%, preferably from about 1% to about 5%, by weight of the composition of urea.

126. The method of any one of examples 116-125, wherein the liquid pest control composition comprises from about 0.1% to about 30% by weight of the composition of a solvent selected from the group consisting of isopropyl alcohol, triethyl citrate, isopropyl myristate, propylene carbonate, ethyl lactate, butyl lactate, butyl stearate, glycerin, and mixtures thereof, preferably a solvent selected from the group consisting of isopropyl alcohol, triethyl citrate, and mixtures thereof.

127. The method of any one of examples 116-126, wherein the liquid pest control composition has a viscosity of from about 1 cps to about 500 cps.

128. The method of any one of examples 116-127, wherein the liquid pest control composition has a surface tension ranging from about 10 mN/m to about 60 mN/m.

129. The method of any one of examples 116-128, wherein the liquid pest control composition has a turbidity less than about 20 NTU and greater than about 0 NTU, preferably less than about 10 NTU and greater than about 0 NTU.

130. The method of any one of examples 116-129, wherein the liquid pest control composition is an oil-in-water emulsion.

131. The method of any one of examples 116-130, wherein the liquid pest control composition has a b* value of about 0 to about 5.

132. The method of any one of examples 116-131, wherein the liquid pest control composition comprises about 3% volatile organic compounds (VOCs) by weight or less.

133. The method of any one of examples 116-132, wherein the liquid pest control composition comprises from about 3% to about 35% by weight of volatile organic compound (VOC).

134. The method of any one of examples 116-133, wherein the liquid pest control composition is substantially free of synthetic pesticides, mineral oil, colorants, or a combination thereof.

135. The method of any one of examples 116-134, wherein the liquid pest control composition is packaged in a transparent or translucent container.

136. The method of any one of examples 116-135, wherein the liquid pest control composition comprises food grade ingredients.

137. The method of any one of examples 116-136, wherein the liquid pest control composition has a pH of about 5.0 to about 8.0.

138. The method of any one of examples 116-137, wherein the liquid pest control composition comprises from about 0.5% to about 7%, preferably from about 1% to about 6%, by weight of the composition of geraniol.

139. The method of any one of examples 116-138, wherein the liquid pest control composition comprises from about 0.005% to about 7% by weight of the composition of peppermint oil, spearmint oil, rosemary oil, thyme oil, citronella oil, clove oil, cinnamon oil, cedarwood oil, garlic oil, geranium oil, lemongrass oil, eugenol, nerol, vanillin, 2-phenylethyl propionate, menthol, menthone, thymol, carvone, camphor, methyl salicylate, p-cymene, linalool, cucalyptol/1,8-cincole, alpha-pinene, bornyl acetate, gamma-terpinene, and mixtures thereof, preferably selected from the group consisting of peppermint oil, spearmint oil, corn mint, citronella, or a mixture thereof.

140. The method of any one of examples 116-139, wherein the liquid pest control composition further comprises a pH adjusting agent selected from the group consisting of citric acid or a salt thereof, malic acid or a salt thereof, acetic acid or a salt thereof, fumaric acid or a salt thereof, humic acid or a salt thereof, and mixtures thereof, preferably citric acid or a salt thereof.

Any and all combinations and/or sub-combinations of features and steps described herein or recited in any of the claims, are contemplated, for a liquid dispensing system and the use thereof.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A pesticide product comprising:
a liquid dispensing system comprising:
a bottle comprising an interior volume and a neck terminating in a rim circumscribing and defining a main opening through the neck to the interior volume, wherein the neck comprises a first retaining feature; and
a liquid dispensing fixture comprising:
a housing,
a carry handle,
an electric motor configured to drive a pump,
a dispensing nozzle in fluid communication with the pump, and
a spray actuator operatively connected to the pump,
wherein the liquid dispensing fixture is configured to engage the first retaining feature of the bottle; and
a pesticidal composition contained within the bottle, the pesticidal composition comprising:
from about 0.5% to about 10% by weight of the pesticide composition of clove oil;
from about 0.01% to about 1.5% by weight of the pesticidal composition of citric acid;
an anionic surfactant, wherein the anionic surfactant is a soap comprising a salt of a C7-C22 fatty acid; and from about 45% to about 99%, by weight of the composition, of water; and
a thickener;
wherein the pesticidal composition is an oil-in-water emulsion.

2. The pesticide product of claim 1, wherein the interior volume of the bottle is configured to hold from about 1,000 g to about 2,500 g of the pesticidal composition.

3. The pesticide product of claim 1, wherein the pesticidal composition comprises from about 0.01% to about 15%, by weight of the composition, of the anionic surfactant.

4. The pesticide product of claim 1, wherein the bottle is made of a plastic chosen from a high density polyethylene, polyethylene terephthalate, polypropylene, or combinations thereof.

5. The pesticide product of claim 1, wherein the pesticidal composition has a Brookfield viscosity from about 2 cps to about 500 cps.

6. The pesticide product of claim 1, wherein the pesticidal composition has a surface tension ranging from about 10 mN/m to about 60 mN/m.

7. The pesticide product of claim 1, wherein the pesticidal composition comprises from about 3% to about 35% by weight of volatile organic compound (VOC).

8. The pesticide product of claim 1, wherein the liquid dispensing system further comprises a fluid passage fitting configured to fit over the rim and/or within the main opening of the bottle, the fluid passage fitting comprising a structure defining a liquid dispensing passage providing fluid communication between the interior volume of the bottle and an outside environment.

9. The pesticide product of claim 1, wherein the bottle is non-pressurized.

10. The pesticide product of claim 1, wherein the pesticidal composition has a Spray D(90) of from about 100 microns to 900 microns, as measured according to the Spray Droplet Size Test Method.

11. The pesticide product of claim 1, wherein the first retaining feature comprises one or more outwardly projecting helical screw threads.

12. The pesticide product of claim 1, wherein the salt is sodium.

13. The pesticide product of claim 1, wherein the salt is potassium.

14. The pesticide product of claim 1, wherein the thickener comprises xanthan gum.

15. The pesticide product of claim 1, wherein the pesticidal composition is substantially free of synthetic pesticides, mineral oil, colorants, or a combination thereof.

* * * * *